(12) United States Patent
Jung et al.

(10) Patent No.: US 12,248,149 B2
(45) Date of Patent: Mar. 11, 2025

(54) OPTICAL APPARATUS

(71) Applicant: Samsung Display Co., LTD., Yongin-si (KR)

(72) Inventors: Su Bin Jung, Incheon (KR); Soo Min Baek, Hwaseong-si (KR); Ju Hwa Ha, Seoul (KR); Jae Joong Kwon, Suwon-si (KR); Yong Seok Kim, Seoul (KR); Jeong Woo Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 526 days.

(21) Appl. No.: 17/631,092

(22) PCT Filed: Jul. 17, 2020

(86) PCT No.: PCT/KR2020/009449
§ 371 (c)(1),
(2) Date: Jan. 28, 2022

(87) PCT Pub. No.: WO2021/020782
PCT Pub. Date: Feb. 4, 2021

(65) Prior Publication Data
US 2022/0252886 A1 Aug. 11, 2022

(30) Foreign Application Priority Data
Jul. 30, 2019 (KR) .................... 10-2019-0092497

(51) Int. Cl.
*G02B 27/01* (2006.01)
*G02B 26/08* (2006.01)

(52) U.S. Cl.
CPC ..... *G02B 27/0172* (2013.01); *G02B 26/0816* (2013.01); *G02B 2027/0178* (2013.01)

(58) Field of Classification Search
CPC ............ G02B 27/0172; G02B 26/0816; G02B 2027/0123
See application file for complete search history.

(56) References Cited

U.S. PATENT DOCUMENTS

| 9,761,051 | B2 | 9/2017 | Bromer |
| 10,571,694 | B2 | 2/2020 | Ha |
| (Continued) | | | |

FOREIGN PATENT DOCUMENTS

| CN | 1320223 | 10/2001 |
| CN | 103649816 | 3/2014 |
| (Continued) | | |

OTHER PUBLICATIONS

Extended European Search Report for European Application No. 20846110.3, dated Aug. 8, 2023.
(Continued)

*Primary Examiner* — Joseph L Williams
(74) *Attorney, Agent, or Firm* — KILE PARK REED & HOUTTEMAN PLLC

(57) ABSTRACT

An optical apparatus includes a lens including a first surface and a plurality of side surfaces, a display device disposed on a first side surface among the plurality of side surfaces of the lens and providing light to the first side surface of the lens, an optical path control device disposed between the first side surface of the lens and the display device and selectively changing an optical path of a virtual image of the display device, and a plurality of reflecting members disposed in the lens and reflecting light of the display device to the first surface.

24 Claims, 39 Drawing Sheets

(56) References Cited

U.S. PATENT DOCUMENTS

| | | |
|---|---|---|
| 11,079,601 B2 | 8/2021 | Greenberg |
| 2010/0149073 A1 | 6/2010 | Chaum et al. |
| 2013/0016413 A1 | 1/2013 | Saeedi et al. |
| 2018/0182174 A1 | 6/2018 | Choi |
| 2019/0204600 A1 | 7/2019 | Ha et al. |

FOREIGN PATENT DOCUMENTS

| | | |
|---|---|---|
| CN | 105934902 | 9/2016 |
| EP | 1 105 771 | 3/2004 |
| JP | 2004-4167 | 1/2004 |
| KR | 10-2016-0091402 | 8/2016 |
| KR | 10-1660519 | 9/2016 |
| KR | 10-1815732 | 1/2018 |
| KR | 10-1830364 | 2/2018 |
| KR | 10-2018-0028339 | 3/2018 |
| KR | 10-2018-0043072 | 4/2018 |
| KR | 10-2018-0048868 | 5/2018 |
| KR | 10-2018-0052356 | 5/2018 |
| KR | 10-2018-0088249 | 8/2018 |
| KR | 10-1968276 | 4/2019 |
| KR | 10-2020-0010695 | 1/2020 |
| WO | 2015/081313 | 6/2015 |

OTHER PUBLICATIONS

International Search Report, with English translation, corresponding to International Application No. PCT/KR2020/009449 dated Oct. 28, 2020.

Written Opinion, with English translation, corresponding to International Application No. PCT/KR2020/009449, dated Oct. 28, 2020.

410: 411, 412
420: 421, 422

OPTICAL APPARATUS

CROSS-REFERENCE TO RELATED APPLICATION(S)

This application is a national entry of International Application No. PCT/KR2020/009449, filed on Jul. 17, 2020, which claims under 35 U.S.C. §§ 119(a) and 365(b) priority to and benefits of Korean Patent Application No. 10-2019-0092497, filed on Jul. 30, 2019, in the Korean Intellectual Property Office (KIPO), the entire contents of which are incorporated herein by reference.

BACKGROUND

1. Technical Field

The disclosure relates to an optical apparatus.

2. Description of Related Art

Augmented reality is a technique of superimposing a virtual image on a real image viewed by a user's eyes and displaying them as a single image. The virtual image may be an image in the form of text or graphics, and the real image may be information about an actual object observed in the field of view of a device. The augmented reality may be realized using a head mounted display (HMD), a head-up display (HUD), or the like.

Recently, there is a demand to widen a field of view (FOV) of a virtual image viewed by a user by augmented reality. In this case, however, the size of an optical apparatus for implementing augmented reality may be increased. Further, in order to adjust the depth of the virtual image viewed by the user by the augmented reality, it is required to use a virtual image to which binocular disparity is applied. That is, it is difficult to adjust the depth of the virtual image viewed by a user's one eye by the augmented reality.

SUMMARY

Aspects of the disclosure provide an optical apparatus capable of widening a field of view (FOV) of a virtual image viewed by a user by augmented reality without increasing the size of the optical apparatus.

Aspects of the disclosure also provide an optical apparatus capable of adjusting the depth of a virtual image viewed by a user's one eye by augmented reality.

It should be noted that aspects of the disclosure are not limited to the above-mentioned aspects, and other unmentioned aspects of the disclosure will be clearly understood by those skilled in the art from the following description.

An optical apparatus according to an embodiment for solving the above problem may include a lens including a first surface and a plurality of side surfaces, a display device disposed on a first side surface among the plurality of side surfaces of the lens and providing light to the first side surface of the lens, an optical path control device disposed between the first side surface of the lens and the display device and selectively changing an optical path of a virtual image of the display device, and a plurality of reflecting members disposed in the lens and reflecting light of the display device to the first surface.

The optical path control device may output a first virtual image of the display device without change in its optical path during a first period, and the optical path control device may output an optical path of a second virtual image of the display device in a first direction during a second period.

The plurality of reflecting members may include a first reflecting member reflecting the first virtual image to the first surface during the first period, and a second reflecting member reflecting the second virtual image to the first surface during the second period.

The second reflecting member may reflect the second virtual image reflected from a second side surface among the plurality of side surfaces to the first surface.

The first side surface and the second side surface may face each other.

The optical apparatus may further include a first reflecting sheet disposed on the second side surface of the lens.

The second virtual image may be reflected from the first surface of the lens or a second surface opposite to the first surface and travels to the second side surface.

The second virtual image may be reflected from a third side surface among the plurality of side surfaces and travels to the second side surface.

The optical apparatus may further include a second reflecting sheet disposed on the third side surface of the lens.

The optical path control device may output a third virtual image of the display device in a second direction during a third period, and the optical path control device may output a fourth virtual image of the display device in a third direction during a fourth period.

The plurality of reflecting members may include a third reflecting member reflecting the third virtual image to the first surface during the third period, and a fourth reflecting member reflecting the fourth virtual image to the first surface during the fourth period.

The third reflecting member may reflect the third virtual image reflected from the first surface to the first surface. The fourth reflecting member may reflect the fourth virtual image from a second surface opposite to the first surface to the first surface.

The fourth virtual image may be reflected from the first surface of the lens and travels to the second side surface, and the fourth virtual image may be reflected from the second side surface and travels to a second surface opposite to the first surface.

The optical path control device may include a first optical path control device having a first electrode disposed on the first substrate, a second electrode disposed on a second substrate facing the first substrate, a first liquid crystal layer disposed between the first electrode and the second electrode, and a first single refractive index layer disposed on the first liquid crystal layer.

A boundary between the first liquid crystal layer and the first single refractive index layer may be inclined at a first angle with respect to a thickness direction of the lens.

A boundary between the first liquid crystal layer and the first single refractive index layer may have a prism mountain shape.

The optical apparatus may further include a polarizer plate disposed on the second substrate of the first optical path control device and transmitting light vibrating in a horizontal direction.

In case that a first driving voltage is applied to the first electrode and a second driving voltage is applied to the second electrode, liquid crystals of the first liquid crystal layer may be arranged in a vertical direction. In case that the first driving voltage is not applied to the first electrode and the second driving voltage is not applied to the second electrode, the liquid crystals of the first liquid crystal layer may be arranged in a horizontal direction.

A refractive index of the first single refractive index layer may be equal to an extraordinary refractive index of the liquid crystals of the first liquid crystal layer.

The optical path control device may include a second optical path control device having a third electrode disposed on a third substrate, a fourth electrode disposed on a fourth substrate facing the third substrate, a second liquid crystal layer disposed between the third electrode and the fourth electrode, and a second single refractive index layer disposed on the second liquid crystal layer.

A boundary between the second liquid crystal layer and the second single refractive index layer may be inclined at a second angle different from the first angle with respect to a thickness direction of the lens.

A boundary between the first liquid crystal layer and the first single refractive index layer may have a first prism mountain shape. A boundary between the second liquid crystal layer and the second single refractive index layer may have a second prism mountain shape. A pitch of the first prism mountain and a pitch of the second prism mountain may be different.

The optical apparatus may further include a convex lens disposed between the display device and the optical path control device.

An optical apparatus according to an embodiment for solving the above problem includes a lens including a first lens part, a second lens part, and a third lens part disposed between the first lens part and the second lens part, a first display device disposed on a first side surface of the first lens part and providing a virtual image to the first side surface of the first lens part, a second display device disposed on a first side surface of the second lens part and providing the virtual image to the first side surface of the second lens part, a first optical path control device disposed between a first side surface of the first lens part and the first display device and selectively changing an optical path of the virtual image of the first display device, a second optical path control device disposed between a first side surface of the second lens part and the second display device and selectively changing an optical path of the virtual image of the second display device, and reflecting members disposed in the first lens part. One of the reflecting members of the first lens part may reflect and output the virtual image of the first display device to a first surface of the first lens part, and another one may reflect and output the virtual image of the second display device to the first surface of the first lens part.

The optical apparatus may further include reflecting members disposed in the second lens part. One of the reflecting members of the second lens part may reflect and output the virtual image of the second display device to a first surface of the second lens part. Another one may reflect and output the virtual image of the first display device to the first surface of the second lens part.

In accordance with the optical apparatus according to one embodiment, a user can view a virtual image in which a first virtual image displayed on a display panel during a first period and a second virtual image displayed on the display panel during a second period are combined through a user's one eye. As a result, the user can view a virtual image IM in an area wider than the field of view (FOV) of an originally viewed virtual image. Accordingly, it is possible to widen the field of view (FOV) of the virtual image IM viewed by the user by the augmented reality without increasing the size of the optical apparatus.

In accordance with the optical apparatus according to one embodiment, light incident on an optical path control device may be outputted or refracted by controlling liquid crystals of a liquid crystal layer. That is, it is possible to selectively change the path of light outputted from a display panel using the optical path control device. As a result, the distance from the display panel from which a first virtual image is emitted to the retina of a user's one eye to which the first virtual image is provided and the distance from a first display panel from which a first virtual image is emitted to the retina of the user's one eye to which the first virtual image is provided may be different. Accordingly, the depth of the first virtual image and the depth of the second virtual image viewed by the user may be different. That is, the user can view a plurality of virtual images having different depths.

Advantageous effects according to the disclosure are not limited to those mentioned above, and various other advantageous effects are included herein.

BRIEF DESCRIPTION OF THE DRAWINGS

An additional appreciation according to the embodiments of the disclosure will become more apparent by describing in detail the embodiments thereof with reference to the accompanying drawings, wherein.

DETAILED DESCRIPTION OF THE EMBODIMENTS

Figure 1:
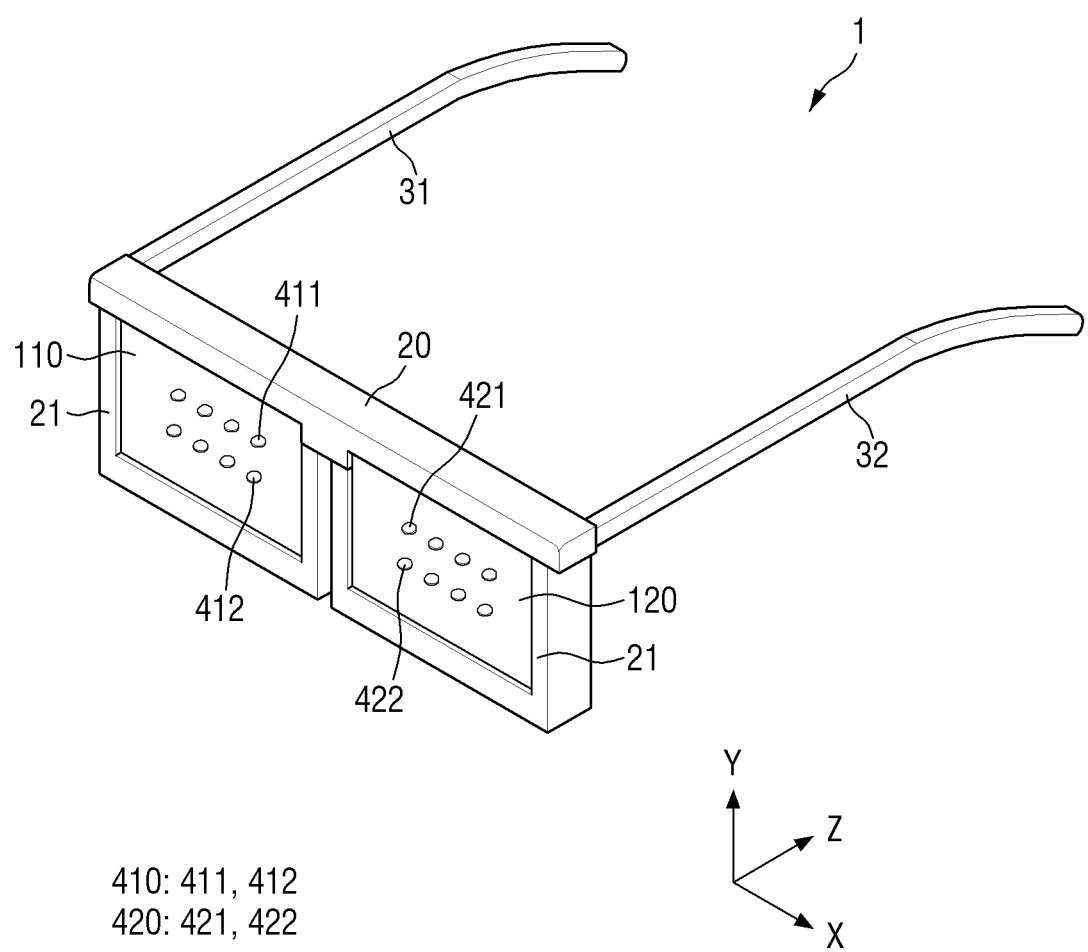
FIG. 1 is a schematic perspective view illustrating an optical apparatus according to an embodiment.

Advantages and features of the disclosure and methods of achieving them will become apparent with reference to the embodiments described below in detail in conjunction with the accompanying drawings. However, the disclosure is not limited to the embodiments disclosed below, but will be embodied in various different forms, only these embodiments allow the disclosure to be complete, and common knowledge in the technical field to which the disclosure belongs It is provided to inform the possessor of the scope of the disclosure, and the claimed invention is only defined by the scope of the claims.

Reference to an element or layer "on" of another element or layer includes any intervening layer or other element directly on or in the middle of the other element or layer. Like reference numerals refer to like elements throughout. The shapes, sizes, proportions, angles, numbers, etc. disclosed in the drawings for explaining the embodiments are exemplary, and thus the disclosure is not limited to the illustrated matters.

Although the first, second, etc. are used to describe various elements, these elements are not limited by these terms, of course. These terms are only used to distinguish one component from another. Accordingly, it goes without saying that the first component mentioned below may be the second component within the spirit of the disclosure.

Each feature of the various embodiments of the disclosure may be partially or wholly combined or combined with each other, technically various interlocking and driving are possible, and each of the embodiments may be implemented independently of each other or may be implemented together in a related relationship.

The terms "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Figure 2:
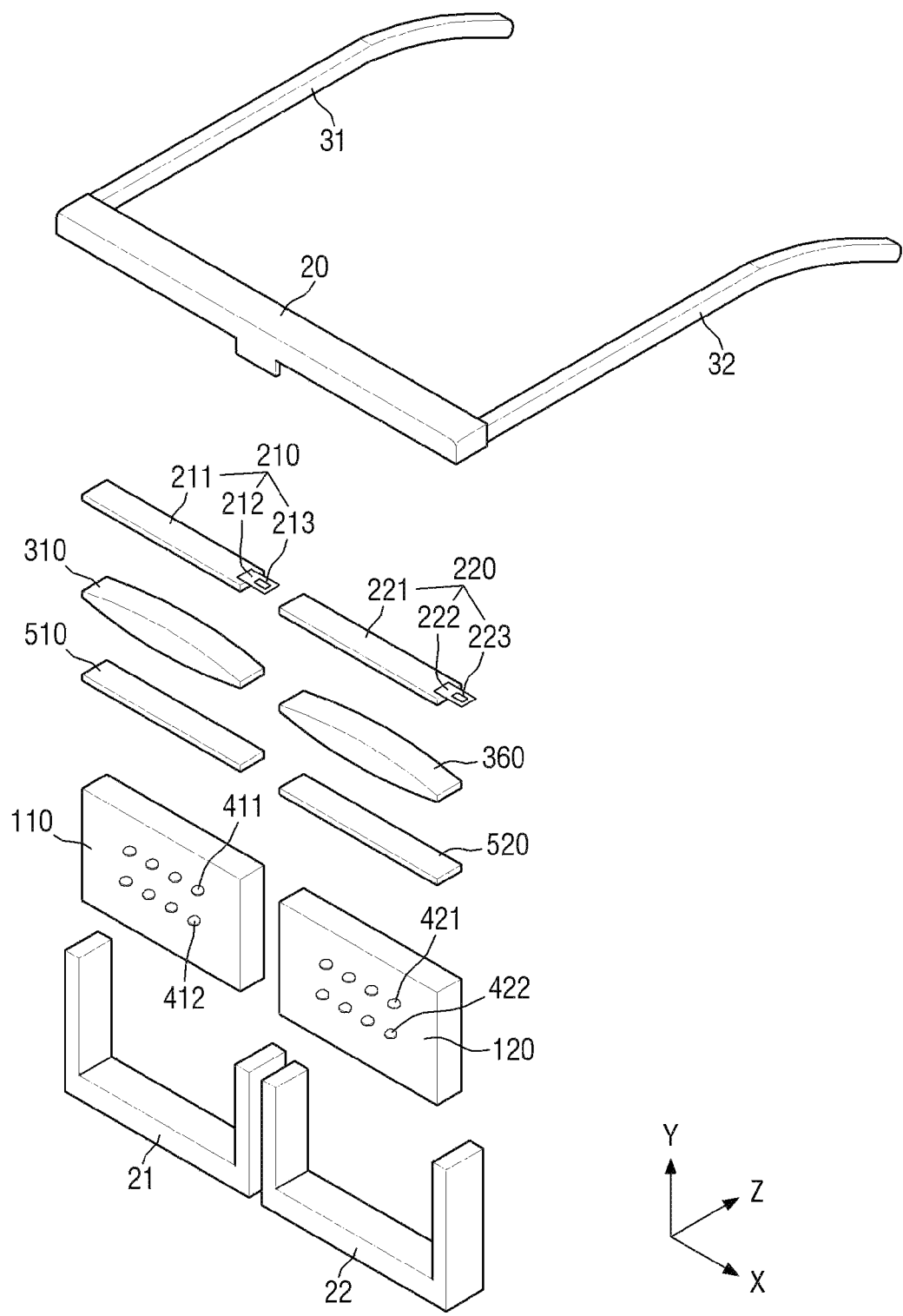
FIG. 2 is a schematic exploded perspective view illustrating an optical apparatus according to an embodiment.

FIG. 1 is a schematic perspective view illustrating an optical apparatus according to an embodiment. FIG. 2 is a schematic exploded perspective view illustrating an optical apparatus according to an embodiment.

Referring to FIGS. 1 and 2, an augmented reality providing apparatus 1 according to an embodiment includes a support frame 20, a right eye lens frame 21, a left eye lens frame 22, a first temple 31, a second temple 32, a right eye lens 110, a left eye lens 120, a first display device 210, a second display device 220, a first convex lens 310, a second convex lens 360, a first optical path control device 510, a second optical path control device 520, and reflecting members 411, 412, 421, and 422.

The terms "above," "top," and "upper surface" as used herein refer to a Z-axis direction, and the terms "below," "bottom," and "lower surface" as used herein refer to a direction opposite to the Z-axis direction. Further, the term "left" as used herein refers to a direction opposite to an X-axis direction, the term "right" as used herein refers to the X-axis direction, the term "upper" as used herein refers to a Y-axis direction, and the term "lower" as used herein refers to a direction opposite to the Y-axis direction. The X-axis direction may be the width direction of each of the right eye lens 110 and the left eye lens 120, the Y-axis direction may be the height direction of each of the right eye lens 110 and the left eye lens 120, and the Z-axis direction may be the thickness direction of each of the right eye lens 110 and the left eye lens 120.

The support frame 20 serves to support the right eye lens 110 and the left eye lens 120 in cooperation with the right eye lens frame 21 and the left eye lens frame 22. The right eye lens 110 may be surrounded by the support frame 20 and the right eye lens frame 21. The left eye lens 120 may be surrounded by the support frame 20 and the left eye lens frame 22.

The support frame 20 may be disposed on the upper side surface of the right eye lens 110 and the upper side surface of the left eye lens 120. The support frame 20 may be elongated in a width direction (e.g., X-axis direction) of the right eye lens 110.

The right eye lens frame 21 may be disposed on the left side surface, the lower side surface, and the right side surface of the right eye lens 110. The right eye lens frame 21 may be coupled (or connected) to the support frame 20. The left eye lens frame 22 may be disposed on the left side surface, the lower side surface, and the right side surface of the left eye lens 120. The left eye lens frame 22 may be coupled to the support frame 20. Each of the right eye lens frame 21 and the left eye lens frame 22 may include a nose pad.

FIG. 2 illustrates that the support frame 20, the right eye lens frame 21, and the left eye lens frame 22 are separately formed and coupled, but the disclosure is not limited thereto. The support frame 20, the right eye lens frame 21 and the left eye lens frame 22 may be formed integrally with (or may be integral with) each other.

The first temple 31 may be fixed to the left end of the lower side surface of the support frame 20. The second temple 32 may be fixed to the right end of the lower side surface of the support frame 20. Each of the first temple 31 and the second temple 32 may be fixed to the support frame 20 by a fixing member such as a screw.

Each of the support frame 20, the right eye lens frame 21, the left eye lens frame 22, the first temple 31, and the second temple 32 may include plastic, metal, or both plastic and metal. The right eye lens frame 21 and the left eye lens frame 22 may be omitted.

Each of the right eye lens 110 and the left eye lens 120 may be formed of glass or plastic in a transparent or translucent manner. Thus, the user can view a real image through the right eye lens 110 and the left eye lens 120. The right eye lens 110 and the left eye lens 120 may have a refractive power in consideration of the visual acuity of the user.

Each of the right eye lens 110 and the left eye lens 120 may be formed as a hexahedron having a first surface, a second surface, and first to fourth side surfaces which are quadrangular. The first surface of the right eye lens 110, which is a surface facing a user's right eye RE, may be an exit surface from which the light of the first display device 210 is emitted by the reflecting members 410 of the right eye lens 110. The second surface of the right eye lens 110 may be the outer surface of the right eye lens 110. The first surface of the left eye lens 120, which is a surface facing a user's left eye, may be an exit surface from which the light of the second display device 220 is emitted by the reflecting members 420 of the left eye lens 120. The second surface of the left eye lens 120 may be the outer surface of the left eye lens 120.

Each of the right eye lens 110 and the left eye lens 120 is not limited to that shown in FIGS. 1 and 2, and may be formed as a polyhedron having a first surface, a second surface, and side surfaces which are formed in a polygonal shape other than a quadrangular shape. In addition to the polyhedron, each of the right eye lens 110 and the left eye lens 120 may be formed in other shapes such as a cylinder, an elliptic cylinder, a semicircular cylinder, a semi-elliptic cylinder, a distorted cylinder, or a distorted semicircular cylinder. The distorted cylinder and semicircular cylinder refer to a cylinder and a semicircular cylinder having a non-constant diameter.

The reflecting members 411 and 412 are disposed in the right eye lens 110, and the reflecting members 421 and 422 are disposed in the left eye lens 120. Each of the reflecting members 411, 412, 421, and 422 may be a small mirror such as a pin mirror. Each of the reflecting members 411, 412, 421, and 422 may be formed to have a smaller size than the pupil of the right eye RE or the left eye. For example, the maximum width of each of the reflecting members 411, 412, 421, and 422 may be several tens to several hundreds of μm. Since the user's pupil focuses on a real image, it is difficult to recognize the reflecting members 411, 412, 421, and 422. Although FIGS. 1 and 2 illustrate that each of the reflecting members 411, 412, 421, and 422 has a circular shape in a plan view, they may have an elliptical or polygonal shape other than a circular shape in a plan view.

The reflecting members 411 and 412 of the right eye lens 110 may reflect the image displayed on the first display device 210 and provide it to the user's right eye RE. The reflecting members 421 and 422 of the left eye lens 120 may reflect the image displayed on the second display device 220 and provide it to the user's left eye.

Although FIGS. 1 and 2 illustrate that eight reflecting members 411 and 412 are disposed in the right eye lens 110, and eight reflecting members 421 and 422 are disposed in the left eye lens 120, the number of the reflecting members 411 and 412 disposed in the right eye lens 110 and the number of the reflecting members 421 and 422 disposed in the left eye lens 120 are not limited thereto.

The first optical path control device 510 may be disposed on a side surface of the right eye lens 110, and the second optical path control device 520 may be disposed on a side surface of the left eye lens 120. For example, as shown in FIG. 2, the first optical path control device 510 may be disposed on the upper side surface of the right eye lens 110, and the second optical path control device 520 may be disposed on the upper side surface of the left eye lens 120.

Each of the first optical path control device 510 and the second optical path control device 520 may selectively change the path of incident light. For example, each of the first optical path control device 510 and the second optical path control device 520 may output the incident light without changing the path of the incident light. Further, each of the first optical path control device 510 and the second optical path control device 520 may change the path of the incident light.

The first convex lens 310 may be disposed on the first optical path control device 510, and the second convex lens 360 may be disposed on the second optical path control device 520. Each of the first convex lens 310 and the second convex lens 360 may be formed as a planoconvex lens or a biconvex lens.

The first display device 210 may be disposed on the first convex lens 310, and the second display device 220 may be disposed on the second convex lens 360. Each of the first display device 210 and the second display device 220 displays a virtual image for realizing an augmented reality. The first display device 210 may include a first display panel 211, a first circuit board 212, and a first driving circuit 213. The second display device 220 may include a second display panel 221, a second circuit board 222 and a second driving circuit 223.

The first display panel 211 may be disposed on the first convex lens 310. The second display panel 221 may be disposed on the second convex lens 360. Each of the first display panel 211 and the second display panel 221 may be a flexible display panel with flexibility, which can be warped, curved, or bent. For example, each of the first display panel 211 and the second display panel 221 may be an organic light emitting display panel or an organic light emitting display panel including quantum dots. In this specification, the case in which each of the first display panel 211 and the second display panel 221 is an organic light emitting display panel will be mainly described.

The first circuit board 212 may be attached to an end and another end of the first display panel 211. The second circuit board 222 may be attached to an end of the second display panel 221. The first circuit board 212 and the second circuit board 222 may be flexible printed circuit boards, which can be warped, curved, or bent.

A power supply part (or power supply unit) for supplying power to the first display device 210 and the second display device 220 may be embedded in any of the first temple 31 and the second temple 32. In this case, a first cable for electrically connecting the first circuit board 212 to the power supply part and a second cable for electrically connecting the second circuit board 222 to the power supply part may be additionally disposed. In case that the power supply part is embedded in the second temple 32, the first cable may be extended to the second temple 32. The length of the first cable may be longer than the length of the second cable.

Figure 3:
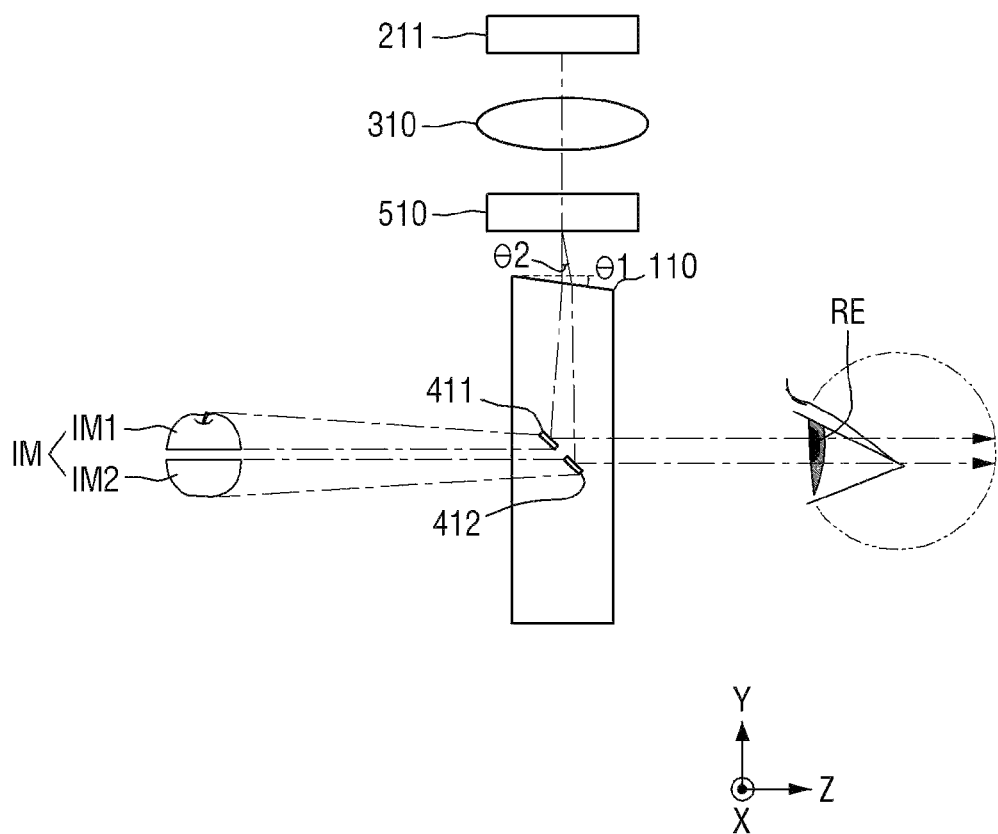
FIG. 3 schematically illustrates an example of a method for providing augmented reality using an optical apparatus according to an embodiment.

FIG. 3 illustrates an example of a method for providing augmented reality using an optical apparatus according to an embodiment.

Referring to FIG. 3, the first display panel 211 may display a first virtual image IM1 during a first period and display a second virtual image IM2 during a second period. The first period and the second period may be alternately arranged. For example, the first display panel 211 may display the first virtual image IM1 during odd frame periods and display the second virtual image IM2 during even frame periods.

First, during the first period, the first virtual image IM1 displayed on the first display panel 211 is focused by the first convex lens 310 and incident on the first optical path control device 510. During the first period, the first virtual image IM1 displayed on the first display panel 211 may be outputted without a change in the optical path by the first optical path control device 510.

The upper side surface of the right eye lens 110 may be inclined at a first angle θ1 with respect to the thickness direction (e.g., Z-axis direction) of the right eye lens 110. Therefore, during the first period, the first virtual image IM1 outputted without a change in the optical path by the first optical path control device 510 may be refracted on the upper side surface of the right eye lens 110 and travel toward the first reflecting members 411. During the first period, the first virtual image IM1 may be reflected by the first reflecting members 411 and emitted to the exit surface of the right eye lens 110 where the user's right eye RE is disposed. Accordingly, the first virtual image IM1 may be focused on the retina of the user's right eye RE. Therefore, during the first period, the user can view the first virtual image IM1 together with the real image without moving the focus set on the real image.

Second, during the second period, the second virtual image IM2 displayed on the first display panel 211 is focused by the first convex lens 310 and incident on the first optical path control device 510. During the second period, the second virtual image IM2 displayed on the first display panel 211 may be outputted after the optical path is changed to a first direction by the first optical path control device 510. When it is assumed that the second virtual image IM2 is incident in the height direction (e.g., Y-axis direction) of the right eye lens 110, the first direction may be inclined at a second angle θ2 with respect to the height direction (e.g., Y-axis direction) of the right eye lens 110.

The upper side surface of the right eye lens 110 may be inclined at the first angle θ1 with respect to the thickness direction (e.g., Z-axis direction) of the right eye lens. Further, the first reflecting members 411 and the second reflecting members 412 may be disposed without overlapping each other in the height direction (e.g., Y-axis direction) of the right eye lens 110. Therefore, during the second period, the second virtual image IM2 for which the optical path has been changed to the first direction by the first optical path control device 510 may be refracted on the upper side surface of the right eye lens 110 and travel in the direction in which the second reflecting members 412 are disposed. During the second period, the second virtual image IM2 may be reflected by the second reflecting members 412 and emitted to the exit surface of the right eye lens 110 where the user's right eye RE is disposed. Accordingly, the second virtual image IM2 may be focused on the retina of the user's right eye RE. Therefore, during the second period, the user can view the second virtual image IM2 together with the real image without moving the focus set on the real image.

The user can view a virtual image IM in which the first virtual image IM1 displayed on the first display panel 211 during the first period and the second virtual image IM2 displayed on the first display panel 211 during the second period are combined with each other through the right eye RE. For example, as shown in FIG. 3, in case that the first virtual image IM1 is the upper portion of an apple and the second virtual image IM2 is the lower portion of the apple, the user can view an apple image in which the upper portion of the apple and the lower portion of the apple are combined with each other. For example, the user can view the virtual image IM in an area wider than the field of view (FOV) of an originally viewed virtual image. Therefore, it is possible to widen the field of view (FOV) of the virtual image IM viewed by the user by the augmented reality without increasing the size of the optical apparatus.

Although FIG. 3 illustrates that the upper side surface of the right eye lens 110 is inclined at the first angle θ1 with respect to the thickness direction (e.g., Z-axis direction) of the right eye lens 100, the disclosure is not limited thereto. The upper side surface of the right eye lens 110 may be parallel to the thickness direction (e.g., Z-axis direction) of the right eye lens 110 without being inclined at the first angle θ1 with respect to the thickness direction (e.g., Z-axis direction) of the right eye lens. However, in case that the upper side surface of the right eye lens 110 is inclined at the first angle θ1 with respect to the thickness direction (e.g., Z-axis direction) of the right eye lens 110, it is possible to further widen the field of view (FOV) of the virtual image IM compared to when the upper side surface of the right eye lens 110 is parallel to the thickness direction (e.g., Z-axis direction).

Similar to FIG. 3, the user can view the virtual image IM in which the first virtual image IM1 displayed on the second display panel 221 during the first period and the second virtual image IM2 displayed on the second display panel 221 during the second period are combined with each other through the left eye.

Figure 4:
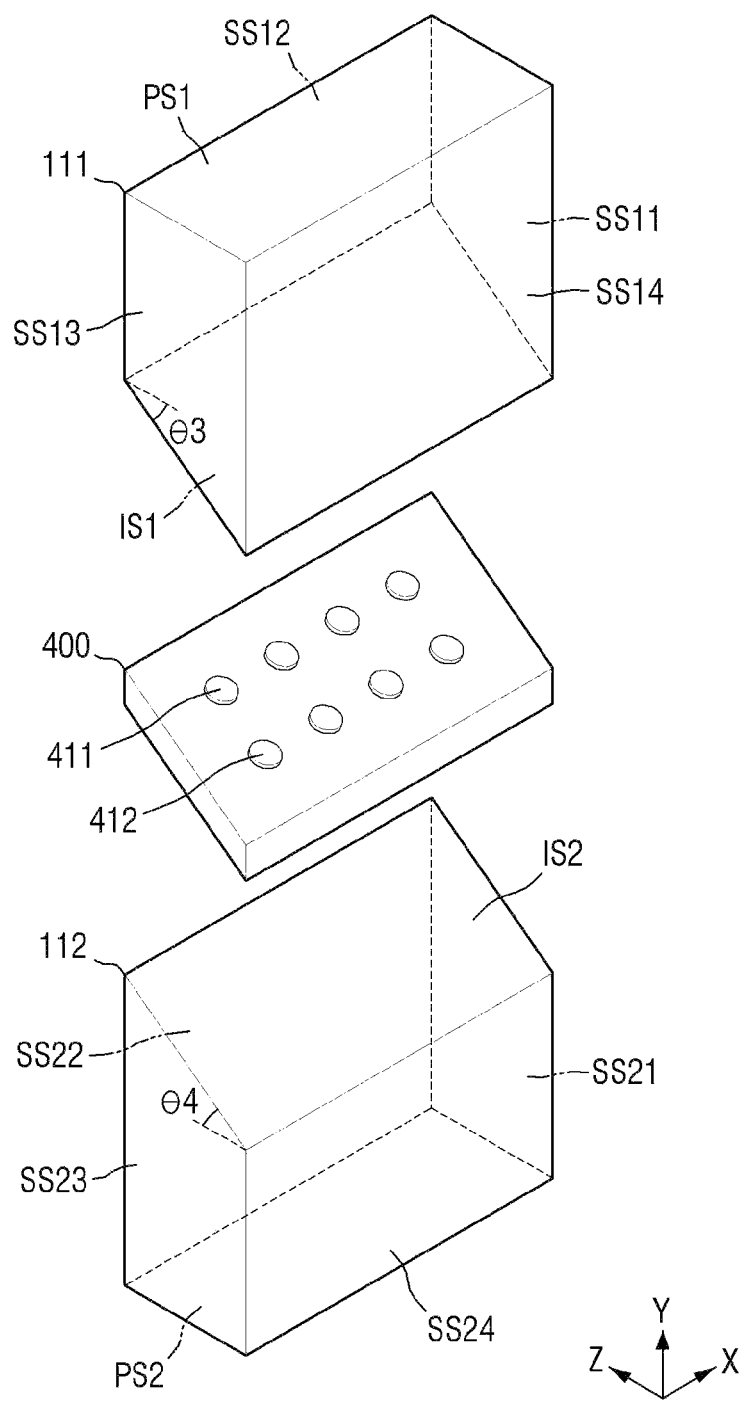
FIG. 4 is a schematic exploded perspective view illustrating an example of the right eye lens and the reflecting members of FIG. 1.
Figure 5:
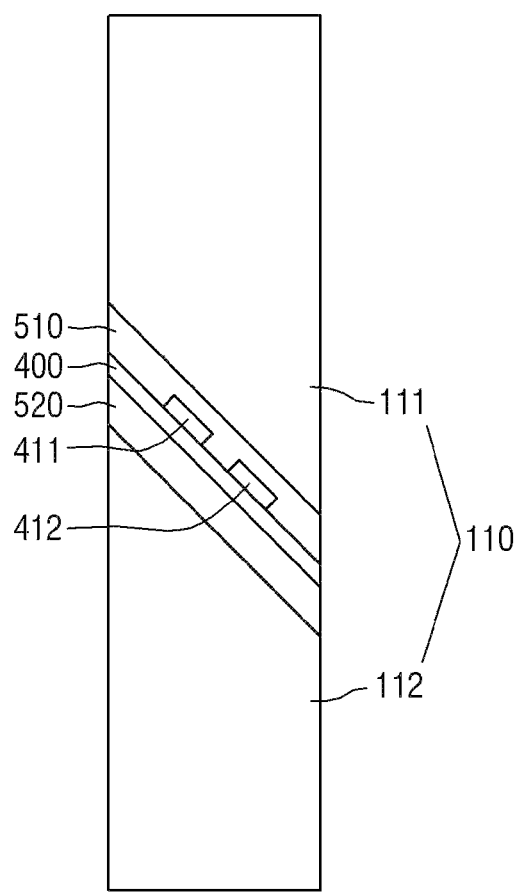
FIG. 5 is a schematic side view illustrating an example of the right eye lens and the reflecting members of FIG. 4.

FIG. 4 is a schematic exploded perspective view illustrating an example of the right eye lens and the reflecting members of FIG. 1. FIG. 5 is a schematic side view illustrating an example of the right eye lens and the reflecting members of FIG. 4.

Referring to FIGS. 4 and 5, the right eye lens 110 may include a first lens part 111, a second lens part 112, a reflecting member substrate 400, and the reflecting members 411 and 412.

The first lens part 111 may have a first inclined surface IS1, a first surface PS1, a second side surface SS12, and a fourth side surface SS14 which have a rectangular shape, and a first side surface SS11 and a third side surface SS13 which have a trapezoidal shape. The first inclined surface IS1 may be the bottom surface of the first lens part 111, and the first surface PS1 may be the top surface of the first lens part 111. The first side surface SS11 of the first lens part 111 may be a left side surface, the second side surface SS12 may be an upper side surface, the third side surface SS13 may be a right side surface, and the fourth side surface SS14 may be a lower side surface. The first inclined surface IS1, the first surface PS1, the first side surface SS11, the second side surface SS12, the third side surface SS13, and the fourth side surface SS14 of the first lens part 111 may be flat surfaces.

The second lens part 112 may have a second inclined surface IS2, a second surface PS2, a second side surface SS22, and a fourth side surface SS24 which have a rectangular shape, and a first side surface SS21 and a third side surface SS23 which have a trapezoidal shape. The second inclined surface IS2 may be the top surface of the second lens part 112, and the second surface PS2 may be the bottom surface of the second lens part 112. The first side surface SS21 of the second lens part 112 may be a left side surface, the second side surface SS22 thereof may be an upper side surface, the third side surface SS23 thereof may be a right side surface, and the fourth side surface SS24 thereof may be a lower side surface. The second inclined surface IS2, the second surface PS2, the first side surface SS21, the second side surface SS22, the third side surface SS23, and the fourth side surface SS24 of the second lens part 112 may be flat surfaces.

The first inclined surface IS1 of the first lens part 111 may be disposed to face the second inclined surface IS2 of the second lens part 112. An inclination angle θ3 of the first inclined surface IS1 with respect to the second side surface SS12 of the first lens part 111 may be substantially equal to an inclination angle θ4 of the second inclined surface IS2 with respect to the fourth side surface SS24 of the second lens part 112. The first inclined surface IS1 of the first lens part 111 may be disposed in parallel to the second inclined surface IS2 of the second lens part 112.

The reflecting member substrate 400 may be disposed between the first inclined surface IS1 of the first lens part 111 and the second inclined surface IS2 of the second lens part 112. The reflecting member substrate 400 may be formed of glass or plastic in a transparent or translucent manner. For example, the reflecting member substrate 400 may be formed of ultra-thin glass (or tempered glass) having a thickness of about 0.1 mm or less, or as a flexible film such as a polyimide film.

The reflecting members 410 may be disposed on the first surface of the reflecting member substrate 400. The first surface of the reflecting member substrate 400 may be a surface facing the first inclined surface IS1 of the first lens part 111. The second surface opposite to the first surface of the reflecting member substrate 400 may be a surface facing the second inclined surface IS2 of the second lens part 112.

Each of the reflecting members 411 and 412 may be formed on the first surface of the reflecting member substrate 400 by depositing a metal having high reflectivity, such as silver (Ag). Each of the reflecting members 411 and 412 may have a thickness of several to several tens of μm. The first reflecting members 411 and the second reflecting members 412 may be disposed without overlapping each other in the height direction (e.g., Y-axis direction) of the right eye lens 110.

A first adhesive layer 510 is disposed between the first inclined surface IS1 of the first lens part 111 and the first surface of the reflecting member substrate 400 to adhere or attach the first surface of the reflecting member substrate 400 to the first inclined surface IS1 of the first lens part 111. A second adhesive layer 520 is disposed between the second inclined surface IS2 of the second lens part 112 and the second surface of the reflecting member substrate 400 to adhere the second surface of the reflecting member substrate 400 to the second inclined surface IS2 of the second lens part 112. The first adhesive layer 510 and the second adhesive layer 520 may be an optically clear resin (OCR) or an optically clear adhesive (OCA).

The refractive index of the first lens part 111 may be substantially equal to the refractive index of the second lens part 112. In order to minimize an influence of the first adhesive layer 510 and the second adhesive layer 520 causing refraction and reflection of the light of the first display device 210 provided to the first spectacle lens 110, it may be designed to match the refractive index of the first adhesive layer 510 with the refractive index of the first lens part 111 and the refractive index of the second lens part 112. In this case, the refractive index of the first adhesive layer 510 and the refractive index of the second adhesive layer 520 may be substantially equal to the refractive index of the first lens part 111 and the refractive index of the second lens part 112, respectively. As another example, the difference between the refractive index of the first adhesive layer 510 and the refractive index of the first lens part 111, the difference between the refractive index of the first adhesive layer 510 and the refractive index of the second lens part 112, the difference between the refractive index of the second adhesive layer 520 and the refractive index of the first lens part 111, and the difference between the refractive index of the second adhesive layer 520 and the refractive index of the second lens part 112 may be about 0.1 or less.

In accordance with the embodiment shown in FIGS. 4 and 5, the reflecting member substrate 400 on which the reflecting members 411 and 412 are deposited is attached to the first inclined surface IS1 of the first lens part 111 of the right eye lens 110 using the first adhesive layer 510, and is attached to the second inclined surface IS2 of the second lens part 112 of the right eye lens 110 using the second adhesive layer 520. Therefore, it is possible to easily manufacture the right eye lens 110 including the reflecting members 411 and 412 inclined at the third angle θ3 in the height direction (e.g., Y-axis direction) with respect to the width direction (e.g., Z-axis direction) of the right eye lens 110.

Since the formation of the left eye lens 120 may be substantially identical or similar to the formation of the right eye lens 110 illustrated in FIGS. 4 and 5, detailed descriptions of the left eye lens 120 will be omitted.

Figure 6:
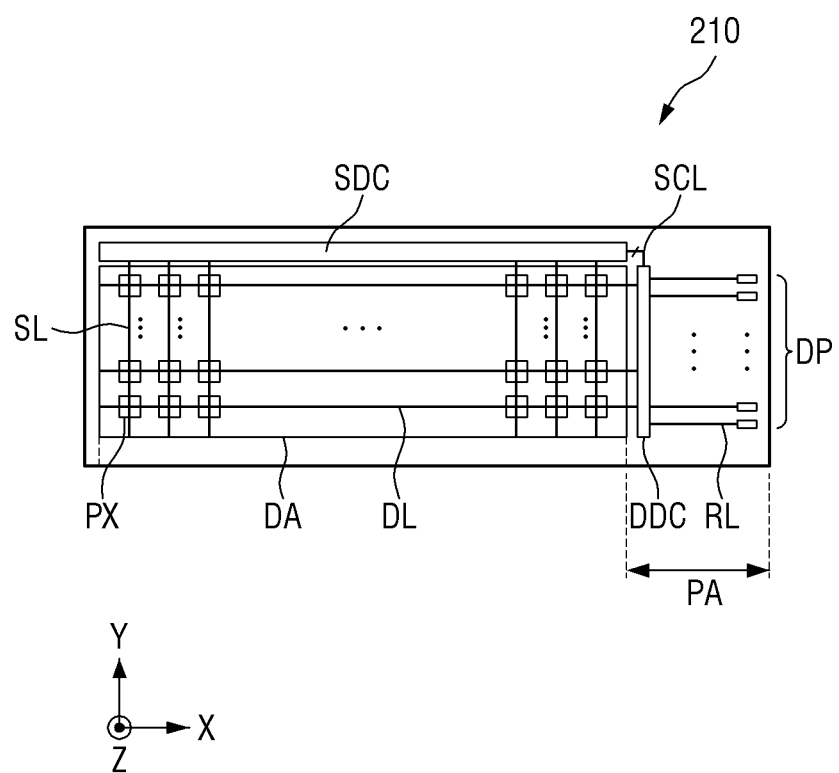
FIG. 6 is a schematic plan view illustrating an example of the first display device of FIG. 1.

FIG. 6 is a schematic plan view illustrating an example of the first display device of FIG. 1.

Referring to FIG. 6, the first display panel 211 of the first display device 210 may include a display area DA, a pad area PA, a scan driving circuit portion SDC, and an integrated driving circuit portion DDC.

The display area DA may include data lines DL, scan lines SL, and pixels PX. As shown in FIG. 6, the data lines DL may be arranged in the width direction (e.g., X-axis direction) of the first lens 110, and the scan lines SL may be arranged in the thickness direction (e.g., Z-axis direction) of the first lens 110. The pixels PX may be arranged in regions defined by the data lines DL and the scan lines SL. For example, the pixels PX may be arranged in intersection regions of the data lines DL and the scan lines SL. A detailed description of the pixels PX of the display area DA will be given below with reference to FIG. 7.

The pad area PA includes routing lines RL electrically connected to the integrated driving circuit portion DDC and pads DP electrically connected to the routing lines RL. The pads DP may be electrically connected to the first circuit board 212. The first circuit board 212 may be attached onto the pads DP using an anisotropic conductive film.

The scan driving circuit portion SDC may be disposed on the first side of the display area DA. The scan driving circuit portion SDC may be disposed adjacent to the long side of the display area DA. The scan driving circuit portion SDC is electrically connected to the scan lines SL of the display area DA. The scan driving circuit portion SDC may receive a scan control signal through scan control signal lines SCL connected to the integrated driving circuit portion DDC, generate scan signals according to a scan control signal, and sequentially apply the scan signals to the scan lines SL.

The scan driving circuit portion SDC may include thin film transistors as switch elements. In this case, the thin film transistors of the scan driving circuit portion SDC may be formed simultaneously with the thin film transistors of the pixels PX of the display area DA.

The integrated driving circuit portion DDC may be disposed on the second side of the display area DA. The integrated driving circuit portion DDC may be disposed adjacent to the short side of the display area DA. The integrated driving circuit portion DDC may be disposed in the pad area PA. As another example, the integrated driving circuit portion DDC may be disposed on the first circuit board 212. The integrated driving circuit portion DDC may be formed as an integrated circuit.

The integrated driving circuit portion DDC receives timing signals and video data through the routing lines RL. The integrated driving circuit portion DDC may generate a scan control signal from the timing signals and output a scan control signal to the scan driving circuit portion SDC. The integrated driving circuit portion DDC may generate a data control signal from the timing signals. The integrated driving circuit portion DDC may generate and apply data voltages to the data lines DL during a period in which the scan signals are applied according to the data control signal and the video data.

Figure 7:
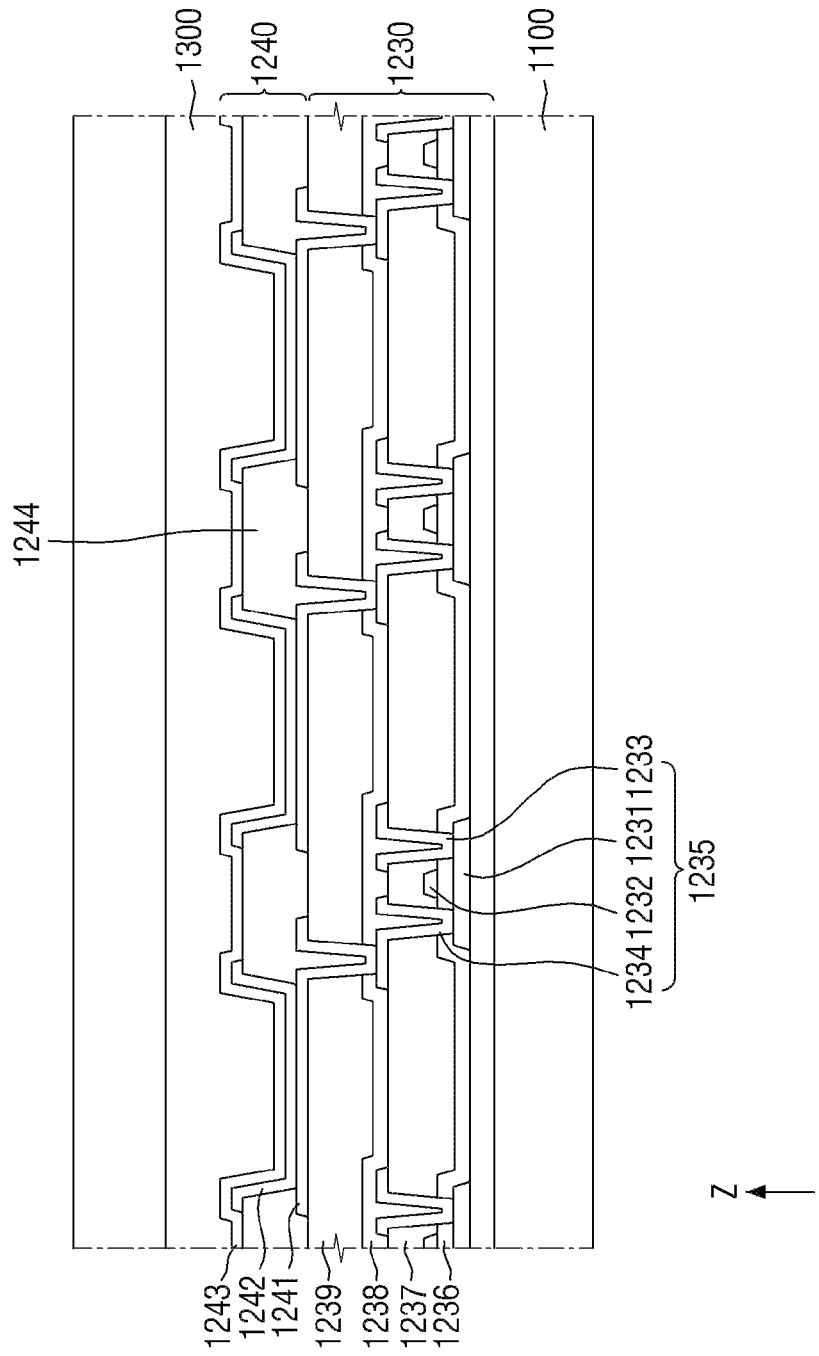
FIG. 7 is a schematic cross-sectional view illustrating a part of the first display area of FIG. 6.

FIG. 7 is a schematic cross-sectional view illustrating a part of the first display area of FIG. 6.

Referring to FIG. 7, the display area DA of the first display device 210 may include a substrate 1100, a thin film transistor layer 1230, a light emitting element layer 1240, and a thin film encapsulation layer 1300.

The thin film transistor layer 1230 is formed on the substrate 1100. The thin film transistor layer 1230 includes thin film transistors 1235, a gate insulating film 1236, an interlayer insulating film 1237, a protective film 1238, and a planarization film 1239.

A buffer film may be formed on the substrate 1100. The buffer film may be formed on the substrate 1100 to protect the thin film transistors 1235 and light emitting elements from moisture penetrating through the substrate 1100 susceptible to moisture permeation. The buffer film may include a plurality of alternately stacked inorganic films. For example, the buffer film may be formed of a multilayer in which one or more inorganic layers of a silicon oxide ($SiO_x$) layer, a silicon nitride ($SiN_x$) layer and a silicon oxynitride (SiON) layer are alternately stacked. The buffer film may be omitted.

The thin film transistors 1235 are formed on the buffer film. Each of the thin film transistors 1235 includes an active layer 1231, a gate electrode 1232, a source electrode 1233, and a drain electrode 1234. Although FIG. 7 illustrates as an example that each of the thin film transistors 1235 is configured to be of a top gate type in which the gate electrode 1232 is located on top of the active layer 1231, it should be noted that the disclosure is not limited thereto. For example, each of the thin film transistors 1235 may be configured to be of a bottom gate type in which the gate electrode 1232 is located under the active layer 1231, or a double gate type in which the gate electrode 1232 is located on and under the active layer 1231.

The active layer 1231 is formed on the buffer film. The active layer 1231 may be formed of a silicon-based semiconductor material or an oxide-based semiconductor material. A light shielding layer for shielding external light incident on the active layer 1231 may be formed between the buffer film and the active layer 1231.

The gate insulating film 1236 may be formed on the active layer 1231. The gate insulating film 1216 may be formed of an inorganic layer such as a silicon oxide ($SiO_x$) layer and a silicon nitride ($SiN_x$) layer, or a multilayer thereof.

The gate electrode 1232 and a gate line may be formed on the gate insulating film 1216. The gate electrode 1232 and the gate line may be formed as a single layer or multiple layers made of (or include) at least one of molybdenum (Mo), aluminum (Al), chromium (Cr), gold (Au), titanium (Ti), nickel (Ni), neodymium (Nd), and copper (Cu), or an alloy thereof.

The interlayer insulating film 1237 may be formed on the gate electrode 1232 and the gate line. The interlayer insulating film 1237 may be formed of an inorganic layer such as a silicon oxide ($SiO_x$) layer and a silicon nitride ($SiN_x$) layer, or a multilayer thereof.

The source electrode 1233, the drain electrode 1234, and a data line may be formed on the interlayer insulating film 1237. Each of the source electrode 1233 and the drain electrode 1234 may be electrically connected to the active layer 1231 via a contact hole passing through the gate insulating film 1236 and the interlayer insulating film 1237. The source electrode 1233, the drain electrode 1234, and the data line may be formed as a single layer or multiple layers made of at least one of molybdenum (Mo), aluminum (Al), chromium (Cr), gold (Au), titanium (Ti), nickel (Ni), neodymium (Nd), and copper (Cu), or an alloy thereof.

The protective film 1238 for insulating the thin film transistor 1235 may be formed on the source electrode 1233, the drain electrode 1234, and the data line. The protective film 1238 may be formed of an inorganic layer such as a silicon oxide ($SiO_x$) layer and a silicon nitride ($SiN_x$) layer, or a multilayer thereof.

The planarization film 1239 may be formed on the protective film 1238 to flatten a step due to the thin film transistors 1235. The planarization film 1239 may be formed of an organic film such as acryl resin, epoxy resin, phenolic resin, polyamide resin, polyimide resin and the like.

The light emitting element layer 1240 is formed on the thin film transistor layer 1230. The light emitting element layer 1240 includes light emitting elements and a pixel defining layer 1244.

The light emitting elements and the pixel defining layer 1244 are formed on the planarization film 1239. The light emitting element may be an organic light emitting element. In this case, the light emitting element may include an anode electrode 1241, light emitting layers 1242, and a cathode electrode 1243.

The anode electrode 1241 may be formed on the planarization film 1239. The anode electrode 1241 may be electrically connected to the source electrode 1233 of the thin film transistor 1235 via the contact hole passing through the protective film 1238 and the planarization film 1239.

The pixel defining layer 1244 may be formed on the planarization film 1239 to cover (or overlap) the edge of the anode electrode 1241 and partition the pixels. For example, the pixel defining layer 1244 serves as a pixel defining layer for defining pixels. Each of the pixels represents a region where the anode electrode 1241, the light emitting layer 1242, and the cathode electrode 1243 are stacked sequentially and holes from the anode electrode 1241 and electrons from the cathode electrode 1243 are coupled to each other in the light emitting layer 1242 to emit light.

The light emitting layer 1242 is formed on the anode electrode 1241 and the pixel defining layer 1244. The light emitting layer 1242 may be an organic light emitting layer. The light emitting layer 1242 may emit one of red light, green light, and blue light. The peak wavelength range of red light may be about 620 nm to about 750 nm, and the peak wavelength range of green light may be about 495 nm to about 570 nm. Further, the peak wavelength range of blue light may be about 450 nm to about 495 nm. As another example, the light emitting layer 1242 may be a white light emitting layer that emits white light. In this case, the light emitting layer 1242 may have a structure in which a red light emitting layer, a green light emitting layer, and a blue light emitting layer are stacked, and may be a common layer formed commonly to the pixels PX1. In this case, the display device 200 may further include a separate color filter for displaying a red, green, or blue color.

The light emitting layer 1242 may include a hole transporting layer, a light emitting layer, and an electron transporting layer. The light emitting layer 1242 may be formed in a tandem structure of two or more stacks, in which case a charge generating layer may be formed between the stacks.

The cathode electrode 1243 is formed on the light emitting layer 1242. The cathode electrode 1243 may be formed to cover the light emitting layer 1242. The cathode electrode 1243 may be a common layer formed commonly to the pixels.

herein case that the light emitting element layer 1240 is formed by a top emission method in which light is emitted upward, the anode electrode 1241 may be formed of a metal material having high reflectivity to have a stacked structure (Ti/Al/Ti) of aluminum and titanium, a stacked structure (ITO/Al/ITO) of aluminum and ITO, an APC (Ag—Pd—Cu) alloy, and a stacked structure (ITO/APC/ITO) of an APC alloy and ITO. The APC alloy is an alloy of silver (Ag), palladium (Pd), and copper (Cu). Further, the cathode electrode 1243 may be formed of a transparent conductive material (TCO) such as ITO or IZO that can transmit light or a semi-transmissive conductive material such as magnesium (Mg), silver (Ag), or an alloy of magnesium (Mg) and silver (Ag). herein case that the cathode electrode 1243 is formed of a semi-transmissive conductive material, the light emission efficiency may be increased due to a micro-cavity effect.

herein case that the light emitting element layer 1240 is formed by a bottom emission method in which light is emitted downward, the anode electrode 1241 may be formed of a transparent conductive material (TCO) such as ITO or IZO or a semi-transmissive conductive material such as magnesium (Mg), silver (Ag), or an alloy of magnesium (Mg) and silver (Ag). The second electrode 1243 may be formed of a metal material having high reflectivity, such as a stacked structure (Ti/Al/Ti) of aluminum (Al) and titanium (Ti), a stacked structure (ITO/Al/ITO) of Al and ITO, an APC alloy, a stacked structure (ITO/APC/ITO) of an APC alloy and ITO, or the like. herein case that the anode electrode 1241 is formed of a semi-transmissive conductive material, the emission efficiency of the light emitting element layer 1240 may be improved due to a micro-cavity effect.

The thin film encapsulation layer 1300 is formed on the light emitting element layer 1240. The thin film encapsulation layer 1300 prevents oxygen or moisture from permeating the light emitting layer 1242 and the cathode electrode 1243. To this end, the thin film encapsulation layer 1300 may comprise at least one inorganic film. The inorganic film may be formed of silicon nitride, aluminum nitride, zirconium nitride, titanium nitride, hafnium nitride, tantalum nitride, silicon oxide, aluminum oxide, or titanium oxide. Further, the thin film encapsulation layer 1300 may further include at least one organic film. The organic film may be formed to have a thickness sufficient to prevent particles from penetrating the thin film encapsulation layer 1300 and being injected into the light emitting layer 1242 and the cathode electrode 1243. The organic film may include at least one of epoxy, acrylate, and urethane acrylate. Instead of the thin film encapsulation layer 1300, an encapsulation substrate may be disposed on the light emitting element layer 1240.

Figure 8:
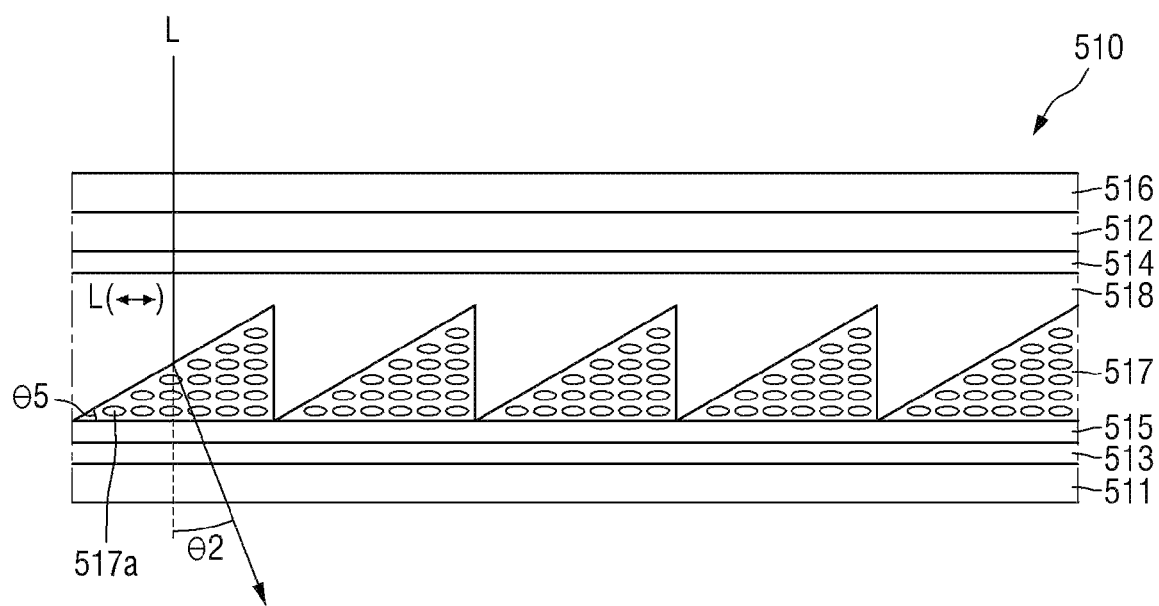
FIGS. 8 and 9 schematically illustrates an example of the first optical path control device of FIG. 2.
Figure 9:
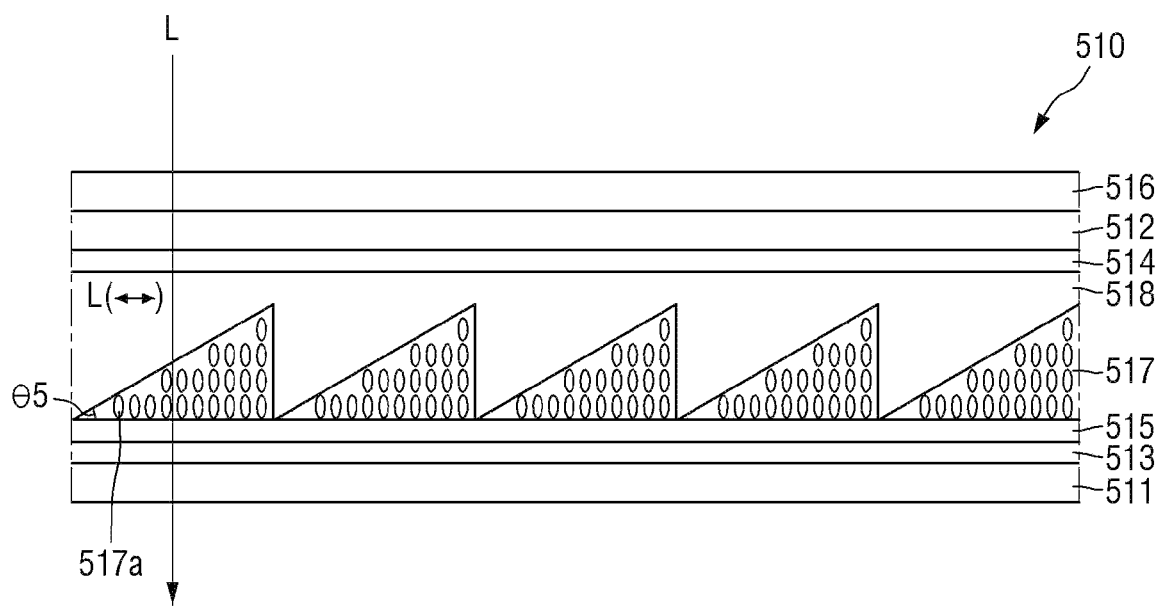

FIGS. 8 and 9 illustrates an example of the first optical path control device of FIG. 1.

Referring to FIGS. 8 and 9, the first optical path control device 510 may include a first optical path control device 510 having a first substrate 511, a second substrate 512, a first electrode 513, a second electrode 514, a first alignment layer 515, a first liquid crystal layer 517, a first single refractive index layer 518, and a polarizing film 516.

The first substrate 511 and the second substrate 512 may be formed of glass or plastic in a transparent manner. For example, the first substrate 511 and the second substrate 512 may be formed of ultra-thin glass having a thickness of about 0.1 mm or less, or a flexible film such as a polyethylene terephthalate (PET) film or a polyimide film.

The first electrode 513 may be formed on a surface of the first substrate 511 facing the second substrate 512, and the second electrode 514 may be formed on a surface of the second substrate 512 facing the first substrate 511. A first driving voltage may be applied to the first electrode 513, and a second driving voltage may be applied to the second electrode 514. The first driving voltage and the second driving voltage may be applied as an AC voltage. The first electrode 513 and the second electrode 514 may be formed of a transparent metal material such as indium tin oxide (ITO) or indium zinc oxide (IZO).

The first liquid crystal layer 517 may be disposed between the first electrode 513 and the second electrode 514, and may include liquid crystals 517a. In case that the first driving voltage is applied to the first electrode 513 and the second driving voltage is applied to the second electrode 514, a vertical electric field may be applied to the liquid crystals 517a of the first liquid crystal layer 517. In case that the vertical electric field is not formed, the liquid crystals 517a of the first liquid crystal layer 517 may be arranged in a horizontal direction (e.g., Z-axis direction or X-axis direction) by the first alignment layer 515.

Although FIGS. 8 and 9 illustrate only the first alignment layer 515 disposed under the first liquid crystal layer 517, an additional alignment layer may be disposed above the first liquid crystal layer 517. In this case, the additional alignment layer may be disposed between the first liquid crystal layer 517 and the first single refractive index layer 518.

The first single refractive index layer 518 may be formed of glass or plastic such as a polyethylene terephthalate (PET) film in a transparent manner. The refractive index of the first single refractive index layer 518 may be substantially equal to an ordinary refractive index $n_o$ of the liquid crystals 517a of the first liquid crystal layer 517.

The boundary between the first liquid crystal layer 517 and the first single refractive index layer 518 may be formed in the form of a prism mountain as shown in FIG. 8. For example, the boundary between the first liquid crystal layer 517 and the first single refractive index layer 518 may have a triangular shape. Although FIGS. 8 and 9 illustrate that the boundary between the first liquid crystal layer 517 and the first single refractive index layer 518 has a right-angled triangular shape, the disclosure is not limited thereto. The boundary between the first liquid crystal layer 517 and the first single refractive index layer 518 may be inclined at a fifth angle θ5 with respect to the horizontal direction (e.g., Z-axis direction).

The polarizing film 516 may be disposed on the second substrate 512. The polarizing film 516 may include a phase retardation film such as a linear polarizer plate and a quarter-wave (λ/4) plate. In this case, the linear polarizer plate may be disposed on the second substrate 512, and the phase retardation film may be disposed on the linear polarizer plate. Accordingly, the polarizing film 516 allows light L(↔) of the first display panel 211 vibrating in the horizontal direction to travel to the second substrate 512. Further, it is possible to prevent light from the second substrate 512 from passing through the polarizing film 516, being reflected by the first display panel 211, and being outputted through the polarizing film 516.

Although FIGS. 8 and 9 illustrate that the polarizing film 516 is disposed on the second substrate 512, the disclosure is not limited thereto. The polarizing film 516 may be disposed between the first convex lens 310 and the first display panel 211.

As shown in FIG. 8, in case that the liquid crystals 517a of the first liquid crystal layer 517 are arranged in the vertical direction (e.g., Y-axis direction) and the light L(↔) of the first display panel 211 vibrating in the horizontal direction (e.g., Z-axis direction) is incident thereon, the liquid crystals 517a of the first liquid crystal layer 517 may have the ordinary refractive index $n_o$. In this case, the refractive index of the first single refractive index layer 518 and the refractive index of the liquid crystals 517a of the first liquid crystal layer 517 may be substantially the same. Therefore, the light L(↔) of the first display panel 211 vibrating in the horizontal direction (e.g., Z-axis direction) may be outputted without being refracted at the boundary between the first single refractive index layer 518 and the first liquid crystal layer 517.

As shown in FIG. 9, in case that the liquid crystals 517a of the first liquid crystal layer 517 are arranged in the horizontal direction (e.g., Z-axis direction), and the light L(↔) of the first display panel 211 vibrating in the horizontal direction (e.g., Z-axis direction) is incident thereon, the liquid crystals 517a of the first liquid crystal layer 517 may have an extraordinary refractive index $n_e$. In this case, the refractive index of the first single refractive index layer 518 and the refractive index of the liquid crystals 517a of the first liquid crystal layer 517 may be different. Therefore, the light L(↔) of the first display panel 211 vibrating in the horizontal direction (e.g., Z-axis direction) may be refracted at the boundary between the first single refractive index layer 518 and the first liquid crystal layer 517. For example, the path of the light L(↔) of the first display panel 211 incident on the first optical path control device 510 may be changed. For example, the light L(↔) of the first display panel 211 traveling in the vertical direction (e.g., Y-axis direction) may be refracted by a second angle θ2 with respect to the vertical direction (e.g., Y-axis direction).

In accordance with the embodiment illustrated in FIGS. 8 and 9, the light incident on the first optical path control device 510 may be outputted or refracted by controlling the liquid crystals 517a of the first liquid crystal layer 517. For example, the path of the light outputted from the first display panel 211 may be selectively changed by the first optical path control device 510.

Since the second optical path control device 520 may be substantially the same as the first optical path control device 510, descriptions of the second optical path control device 520 will be omitted.

Figure 10:
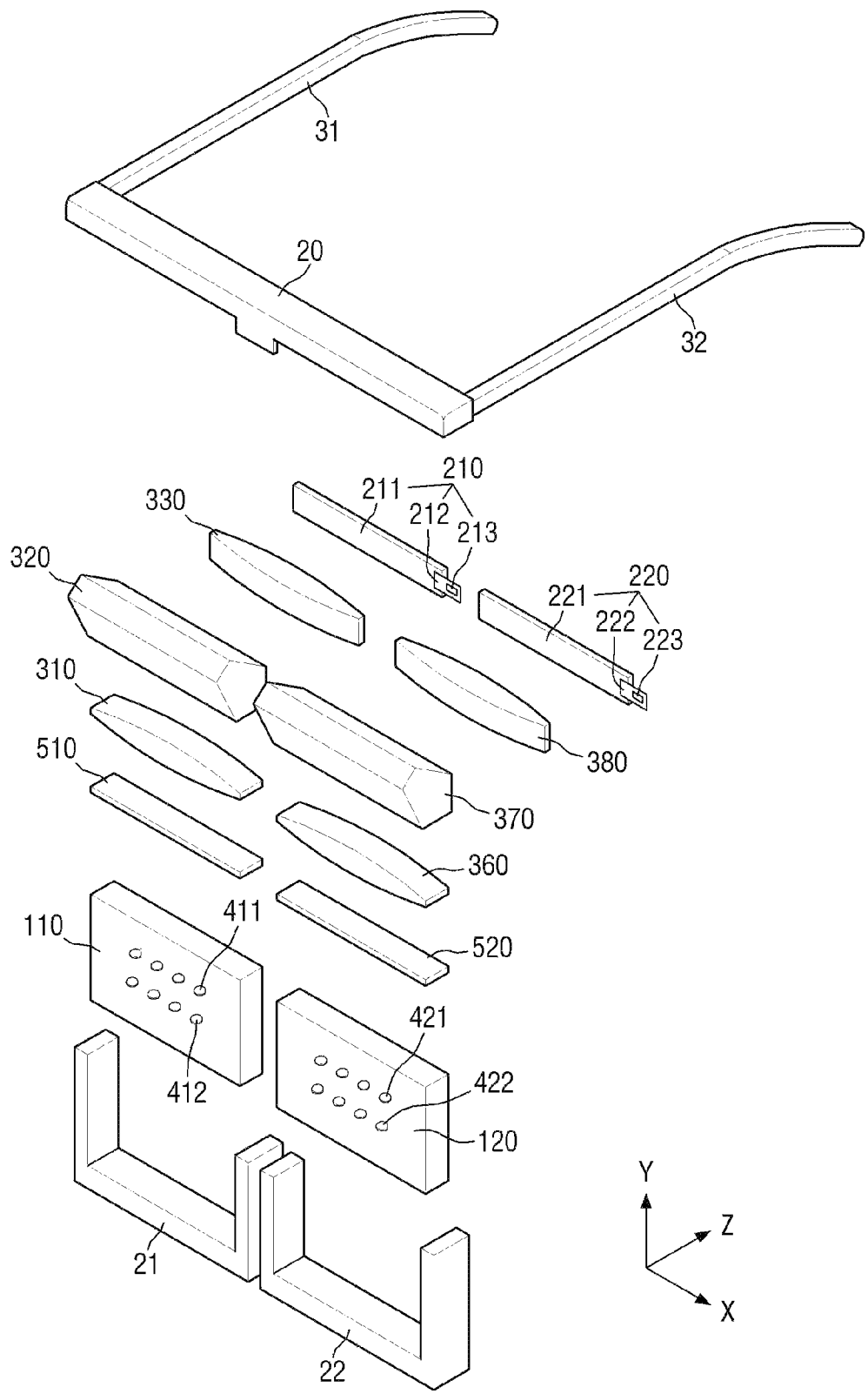
FIG. 10 is a schematic exploded perspective view illustrating an optical apparatus according to an embodiment.
Figure 11:
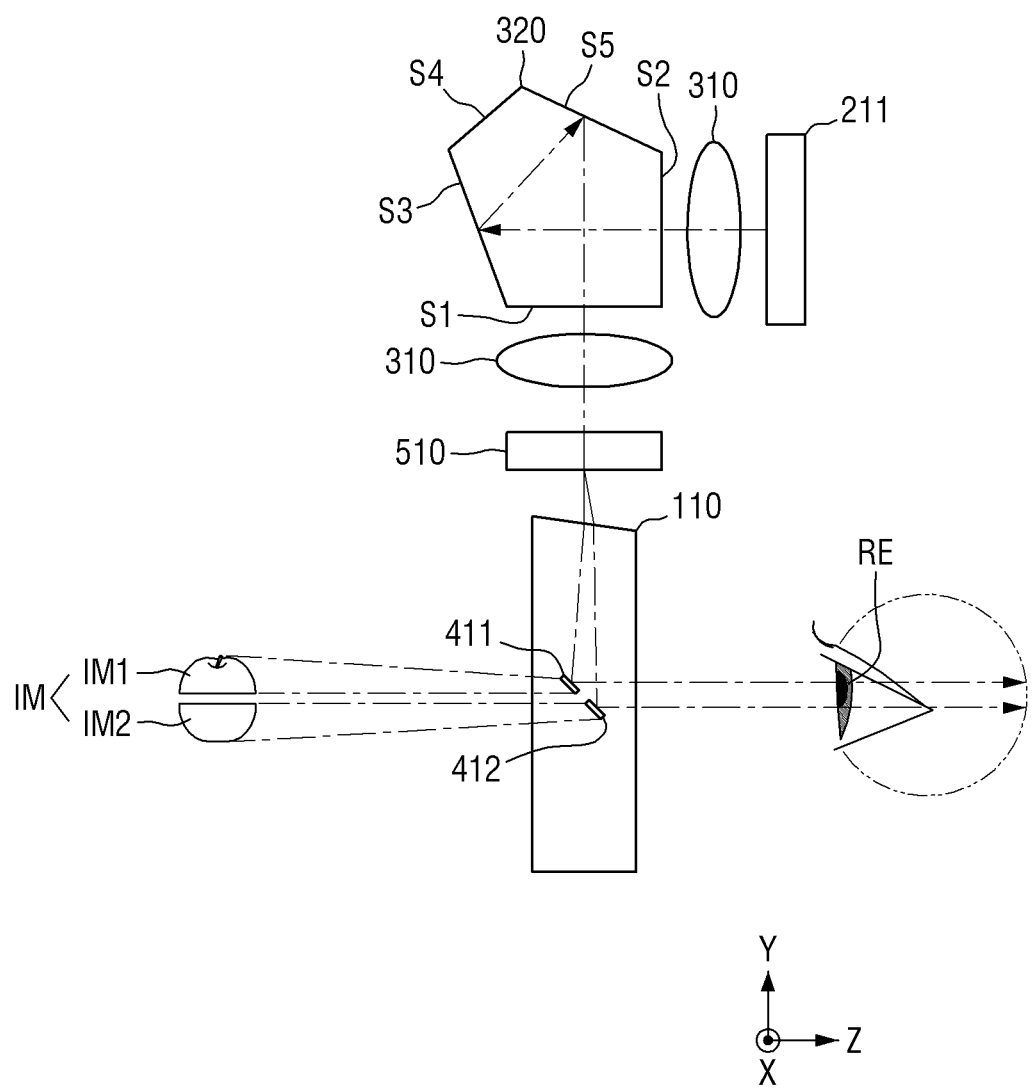
FIG. 11 schematically illustrates an example of a method for providing augmented reality using an optical apparatus according to an embodiment.

FIG. 10 is a schematic exploded perspective view illustrating an optical apparatus according to an embodiment. FIG. 11 illustrates an example of a method for providing augmented reality using an optical apparatus according to an embodiment.

The embodiment illustrated in FIGS. 10 and 11 is different from the embodiment illustrated in FIGS. 2 and 3 at least in that the optical apparatus 1 further includes a third convex lens 330, a fourth convex lens 380, a first optical path adjusting part 320, and a second optical path adjusting part 370. With regard to FIGS. 10 and 11, the differences from the embodiment illustrated in FIGS. 2 and 3 will be mainly described.

Referring to FIGS. 10 and 11, the first optical path adjusting part 320 may be disposed on the first convex lens 310, and the second optical path adjusting part 370 may be disposed on the second convex lens 360. Each of the first optical path adjusting part 320 and the second optical path adjusting part 370 may be a polyhedron having a polygonal top surface and a polygonal bottom surface. Although FIG. 10 illustrates that each of the first optical path adjusting part 320 and the second optical path adjusting part 370 is a pentaprism having the shape of a heptahedron having pentagonal top and bottom surfaces, the disclosure is not limited thereto.

The third convex lens 330 may be disposed on a side surface of the first optical path adjusting part 320, and the fourth convex lens 380 may be disposed on a side surface of the second optical path adjusting part 370. For example, as shown in FIG. 10, the third convex lens 330 may be disposed on a side surface of the first optical path adjusting part 320 in the thickness direction (e.g., Z-axis direction) of the right eye lens 110. The fourth convex lens 380 may be disposed on a side surface of the second optical path adjusting part 370 in the thickness direction (e.g., Z-axis direction) of the left eye lens 120. In contrast, the first convex lens 310 may be disposed on another side surface of the first optical path adjusting part 320 in the height direction (e.g., Y-axis direction) of the right eye lens 110. The second convex lens 360 may be disposed on another side surface of the second optical path adjusting part 370 in the height direction (e.g., Y-axis direction) of the left eye lens 120. Each of the third convex lens 330 and the fourth convex lens 380 may be formed as a planoconvex lens or a biconvex lens.

As shown in FIG. 11, in case that the first optical path adjusting part 320 is formed as a pentaprism, the first optical path adjusting part 320 may have first to fifth side surfaces S1 to S5. The first convex lens 310 may be disposed on a first side surface S1 of the first optical path adjusting part 320, and the third convex lens 330 may be disposed on a second side surface S2 thereof. The angle between the first side surface S1 and the second side surface S2 of the first optical path adjusting part 320 may be a right angle. A third side surface S3 of the first optical path adjusting part 320 may be a side surface that shares a side with the first side surface S1, the fourth side surface S4 thereof may be a side surface that shares a side with the third side surface S3, and the fifth side surface S5 thereof may be a side surface that shares a side with the second side surface S2.

The first virtual image IM1 or the second virtual image IM2 displayed on the first display panel 211 is focused by the second convex lens 330 and incident on the first optical path adjusting part 320. The first virtual image IM1 or the second virtual image IM2 displayed on the first display panel 211 may be reflected by at least two side surfaces among the side surfaces of the first optical path adjusting part 320. Due to the first optical path adjusting unit 320, the optical path of the first virtual image IM1 or the second virtual image IM2 displayed on the first display panel 211 may be increased. For example, as shown in FIG. 3, the first virtual image IM1 or the second virtual image IM2 displayed on the first display panel 211 may be incident on the second side surface S2 of the first optical path adjusting part 320, reflected by the third side surface S3 of the first optical path adjusting part 320, reflected by the fifth side surface S5 of the first optical path adjusting part 320, and emitted to the first side surface S1 of the first optical path adjusting part 320. The first virtual image IM1 or the second virtual image IM2 displayed on the first display panel 211 may be focused by the first convex lens 310 and incident on a side surface, e.g., the upper side surface, of the right eye lens 110.

Figure 12:
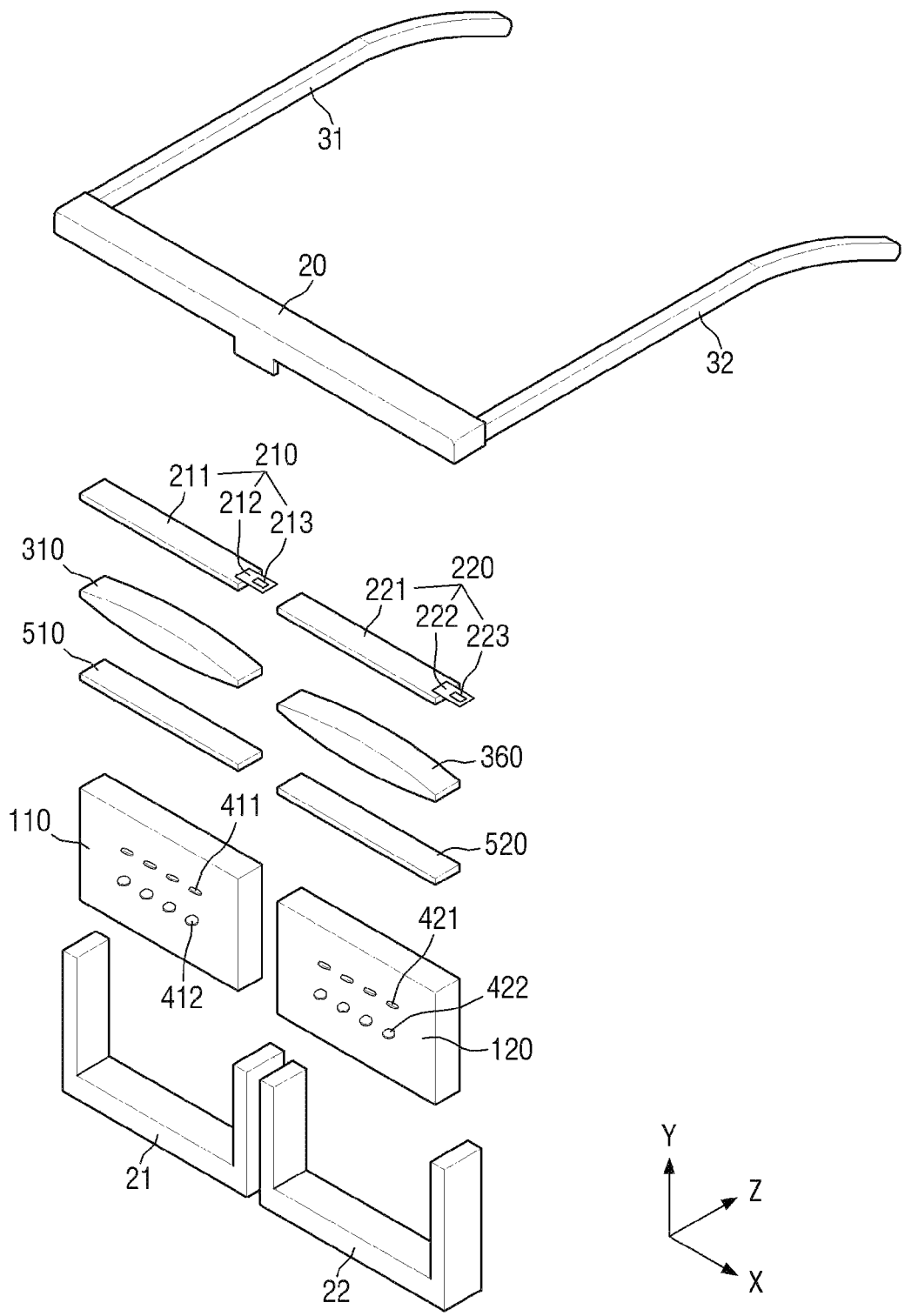
FIG. 12 is a schematic exploded perspective view illustrating an optical apparatus according to an embodiment.
Figure 13:
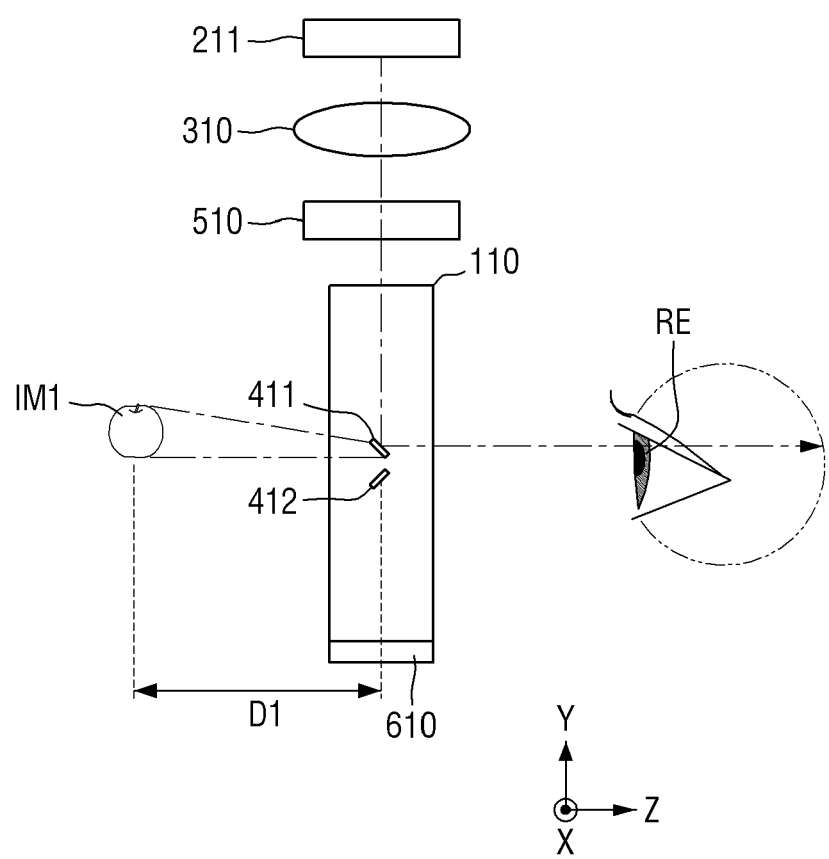
FIGS. 13 and 14 schematically illustrate an example of a method for providing augmented reality using an optical apparatus according to an embodiment.
Figure 14:
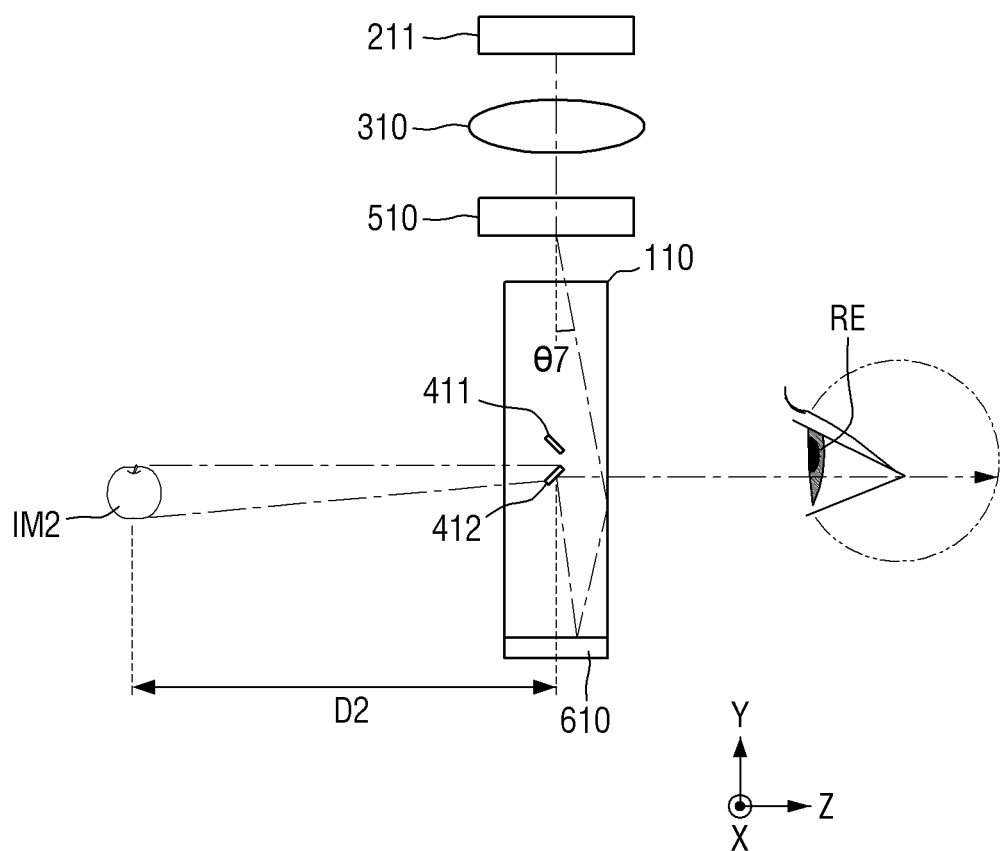

FIG. 12 is a schematic exploded perspective view illustrating an optical apparatus according to an embodiment. FIGS. 13 and 14 illustrate an example of a method for providing augmented reality using an optical apparatus according to an embodiment. FIG. 13 illustrates the first virtual image IM1 viewed by the user during the first period, and FIG. 14 illustrates the second virtual image IM2 viewed by the user during the second period.

The embodiment illustrated in FIGS. 12 to 14 is different from the embodiment illustrated in FIGS. 2 and 3 at least in that a depth D1 of the first virtual image IM1 and a depth D2 of the second virtual image IM2 are different.

Referring to FIGS. 12 to 14, the first display panel 211 may display the first virtual image IM1 during the first period and display the second virtual image IM2 during the second period. The first period and the second period may be alternately arranged. For example, the first display panel 211 may display the first virtual image IM1 during odd frame periods and display the second virtual image IM2 during even frame periods. The first virtual image IM1 and the second virtual image IM2 may be different from each other or may be the same.

First, during the first period, the first virtual image IM1 displayed on the first display panel 211 is focused by the first convex lens 310 and incident on the first optical path control device 510. During the first period, the first virtual image IM1 displayed on the first display panel 211 may be outputted without a change in the optical path by the first optical path control device 510.

During the first period, the first virtual image IM1 outputted without a change in the optical path by the first optical path control device 510 may be incident on the upper side surface of the right eye lens 110 and travel to the first reflecting members 411. During the first period, the first virtual image IM1 may be reflected by the first reflecting members 411 and emitted to the exit surface of the right eye lens 110 where the user's right eye RE is disposed. Accordingly, the first virtual image IM1 may be focused on the retina of the user's right eye RE. Therefore, during the first period, the user can view the first virtual image IM1 together with the real image without moving the focus set on the real image.

Second, during the second period, the second virtual image IM2 displayed on the first display panel 211 is focused by the first convex lens 310 and be incident on the first optical path control device 510. During the second period, the second virtual image IM2 displayed on the first display panel 211 may be outputted after the optical path is changed to the first direction by the first optical path control device 510. When it is assumed that the second virtual image IM2 is incident in the height direction (e.g., Y-axis direction) of the right eye lens 110, the first direction may be inclined at a seventh angle θ7 with respect to the height direction (e.g., Y-axis direction) of the right eye lens 110.

During the second period, the second virtual image IM2 for which the optical path has been changed to the first direction by the first optical path control device 510 may be incident on the upper side surface of the right eye lens 110 and travel to the exit surface of the right eye lens 110. The second virtual image IM2 may be totally reflected by the exit surface of the right eye lens 110 and travel to the lower side surface of the right eye lens 110. The second virtual image IM2 may be reflected by a first reflecting sheet 610 disposed on the lower side surface of the right eye lens 110 and travel to the second reflecting members 411. During the second period, the second virtual image IM2 may be reflected by the second reflecting members 412 and emitted to the exit surface of the right eye lens 110 where the user's right eye RE is disposed. Accordingly, the second virtual image IM2 may be focused on the retina of the user's right eye RE. Therefore, during the second period, the user can view the second virtual image IM2 together with the real image without moving the focus set on the real image.

The distance from the first display panel 211, from which the second virtual image IM2 is emitted, to the retina of the user's right eye RE, to which the second virtual image IM2 is provided, may be longer than the distance from the first display panel 211, from which the first virtual image IM1 is emitted, to the retina of the user's right eye RE, to which the first virtual image IM1 is provided. Accordingly, the depth D2 of the second virtual image IM2 viewed by the user may be greater than the depth D1 of the first virtual image IM1. For example, the user can view of the virtual images IM1 and IM2 having different depths. For example, as shown in FIGS. 13 and 14, in case that both the first virtual image IM1 and the second virtual image IM2 are apples, the user can view the first virtual image (or apple image) IM1 viewed at the first depth D1 and the second virtual image (or apple image) IM2 viewed at the second depth D2.

In order to increase the optical path between the first display panel 211 and the user's right eye RE, the first optical path adjusting part 320 and the third convex lens 330 may be additionally disposed between the first display panel 211 and the first convex lens 310 as shown in FIGS. 10 and 11.

Similar to FIGS. 12 to 14, the user can view virtual images IM1 and IM2 having different depths through the left eye.

Figure 15:
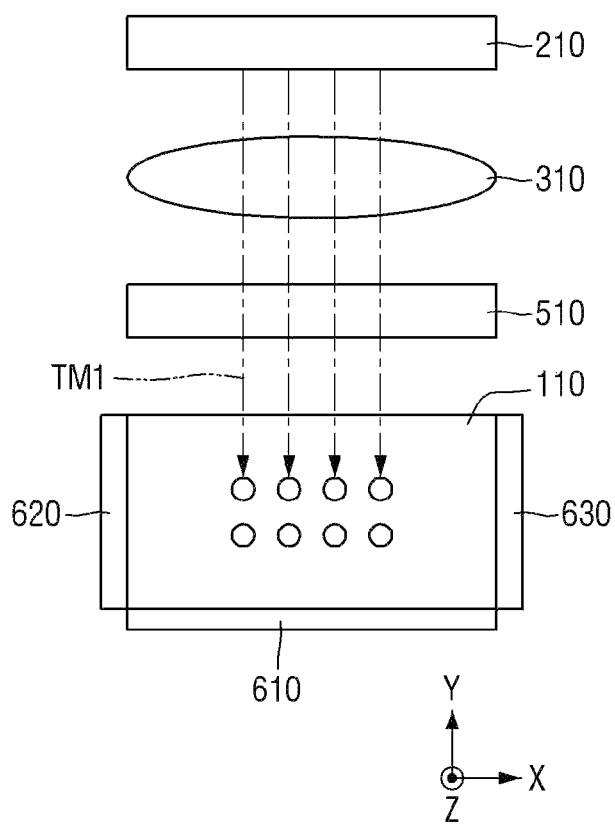
FIGS. 15 and 16 schematically illustrate an example of a method for providing augmented reality using an optical apparatus according to an embodiment.
Figure 16:
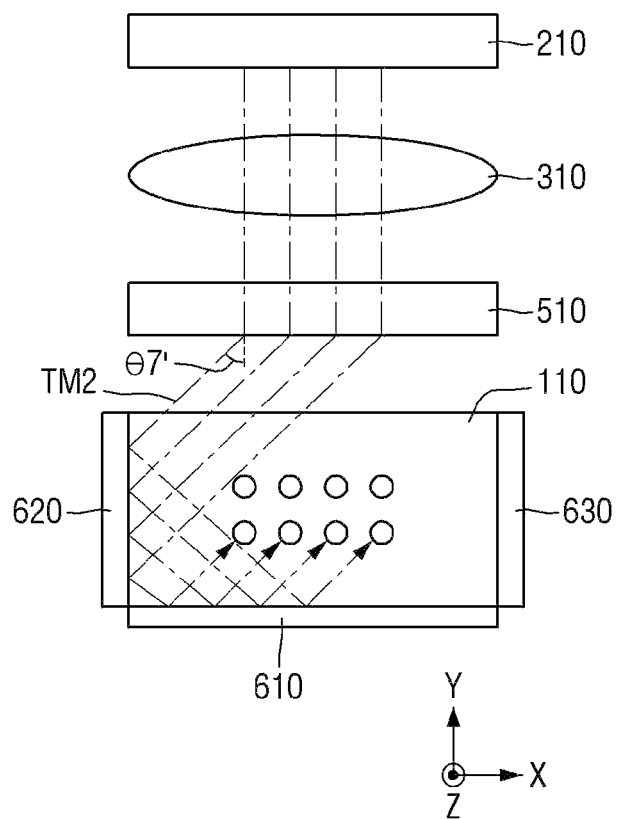

FIGS. 15 and 16 illustrate an example of a method for providing augmented reality using an optical apparatus according to an embodiment. FIG. 15 illustrates the optical path of the first virtual image IM1 viewed by the user during the first period, and FIG. 16 illustrates the optical path of the second virtual image IM2 viewed by the user during the second period.

The embodiment illustrated in FIGS. 15 and 16 is different from the embodiment illustrated in FIGS. 13 and 14 at least in that the second virtual image IM2 is reflected by a second reflecting sheet 620 disposed on the right side surface of the right eye lens 110 or a third reflecting sheet 630 disposed on the left side surface of the right eye lens 110 without being totally reflected by the exit surface of the right eye lens 110 during the second period.

Referring to FIGS. 12, 15, and 16, during the second period, the second virtual image IM2 in which the optical path has been changed to the first direction by the first optical path control device 510 may be incident on the upper side surface of the right eye lens 110 and travel to the right side surface or the left side surface of the right eye lens 110. When it is assumed that the second virtual image IM2 is incident in the height direction (e.g., Y axis direction) of the right eye lens 110, the first direction may be inclined at a seventh angle θ7' with respect to the height direction (e.g., Y-axis direction) of the right eye lens 110.

The second virtual image IM2 may be reflected by the second reflecting sheet 620 disposed on the right side surface of the right eye lens 110 or the third reflecting sheet 630 disposed on the left side surface of the right eye lens 110 and travel to the lower side surface of the right eye lens 110. The second virtual image IM2 may be reflected by the first reflecting sheet 610 disposed on the lower side surface of the right eye lens 110 and travel to the second reflecting members 411. During the second period, the second virtual image IM2 may be reflected by the second reflecting members 412 and emitted to the exit surface of the right eye lens 110 where the user's right eye RE is disposed. Accordingly, the second virtual image IM2 may be focused on the retina of the user's right eye RE. Therefore, during the second period, the user can view the second virtual image IM2 together with the real image without moving the focus set on the real image.

The distance from the first display panel 211, from which the second virtual image IM2 is emitted, to the retina of the user's right eye RE, to which the second virtual image IM2 is provided, may be greater than the distance from the first display panel 211, from which the first virtual image IM1 is emitted, to the retina of the user's right eye RE, to which the first virtual image IM1 is provided. Accordingly, the depth D2 of the second virtual image IM2 viewed by the user may be greater than the depth D1 of the first virtual image IM1. For example, the user can view the first and second virtual images IM1 and IM2 having different depths.

In order to increase the optical path between the first display panel 211 and the user's right eye RE, the first optical path adjusting part 320 and the third convex lens 330 may be additionally disposed between the first display panel 211 and the first convex lens 310 as shown in FIGS. 10 and 11.

Similar to FIGS. 15 and 16, the user can view the first and second virtual images IM1 and IM2 having different depths through the left eye.

Figure 17:
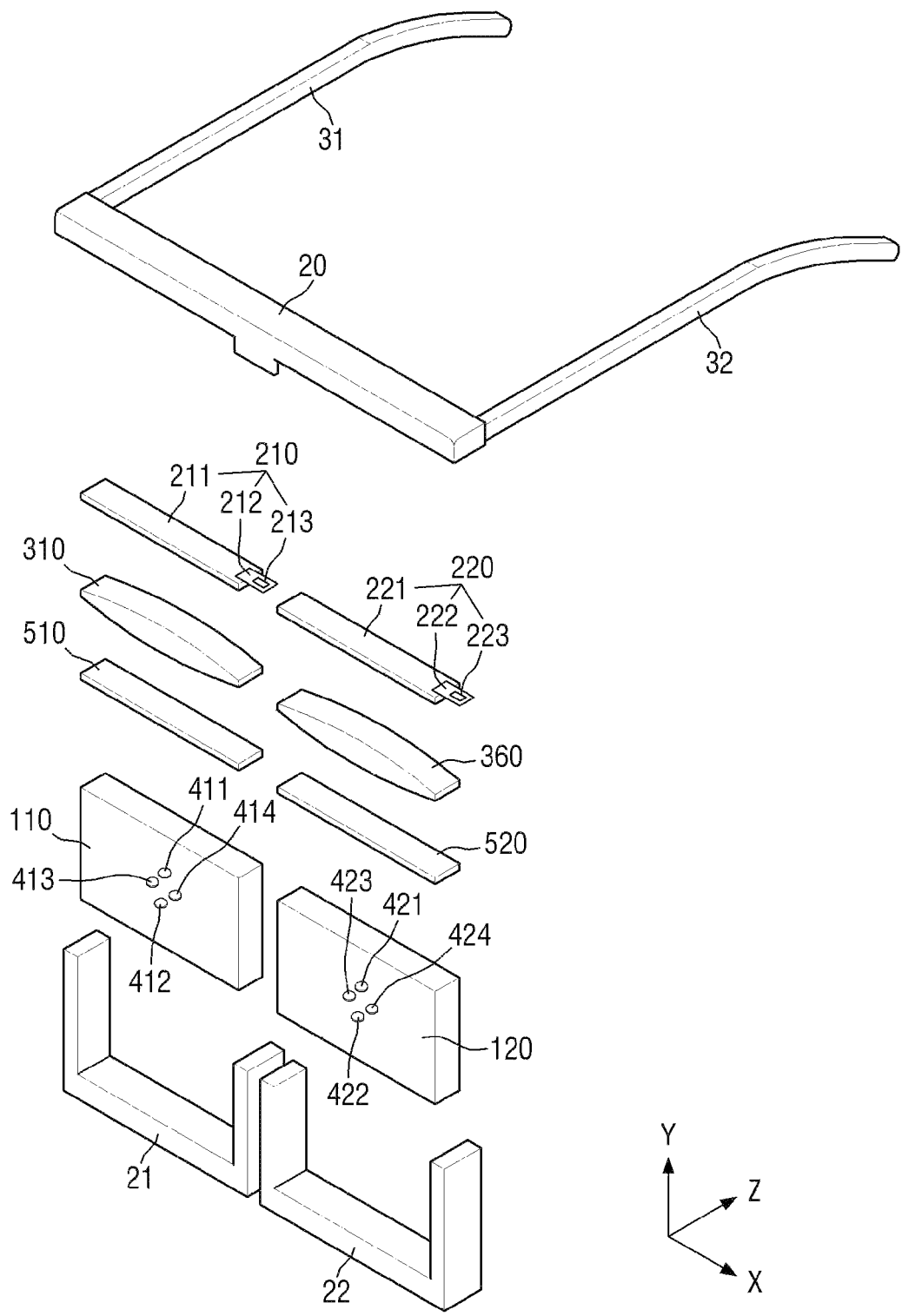
FIG. 17 is a schematic exploded perspective view illustrating an optical apparatus according to an embodiment.
Figure 18:
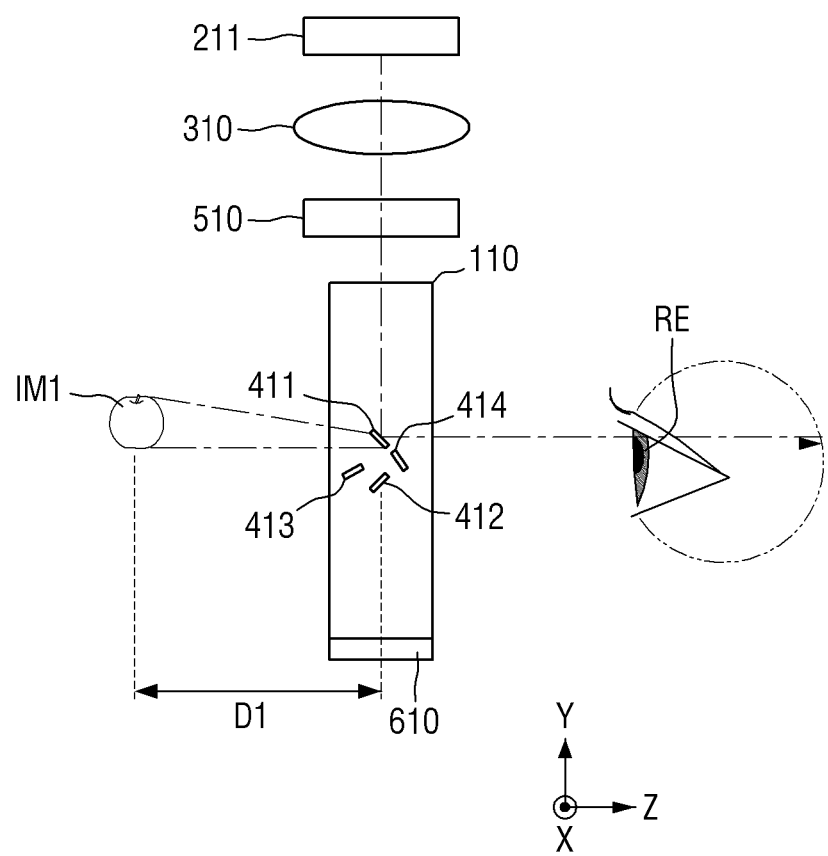
FIGS. 18 to 21 illustrate an example of a method for providing augmented reality using an optical apparatus according to an embodiment.
Figure 19:
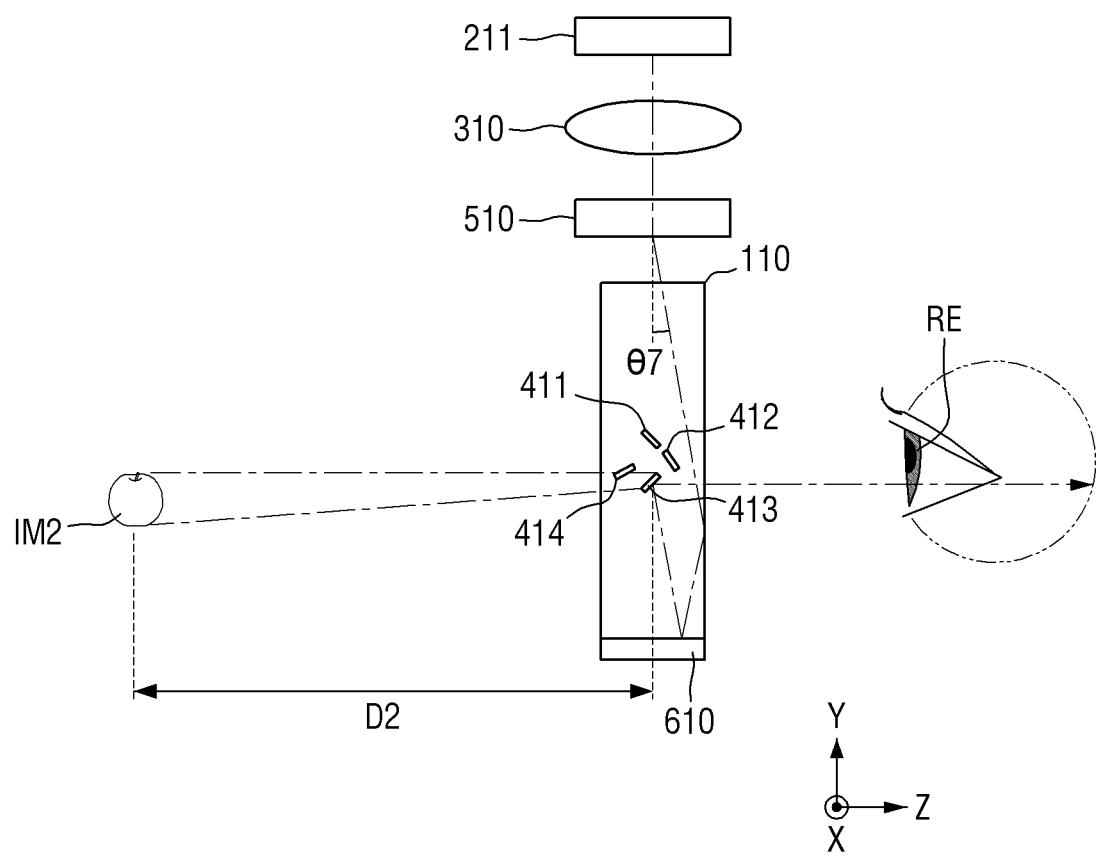
Figure 20:
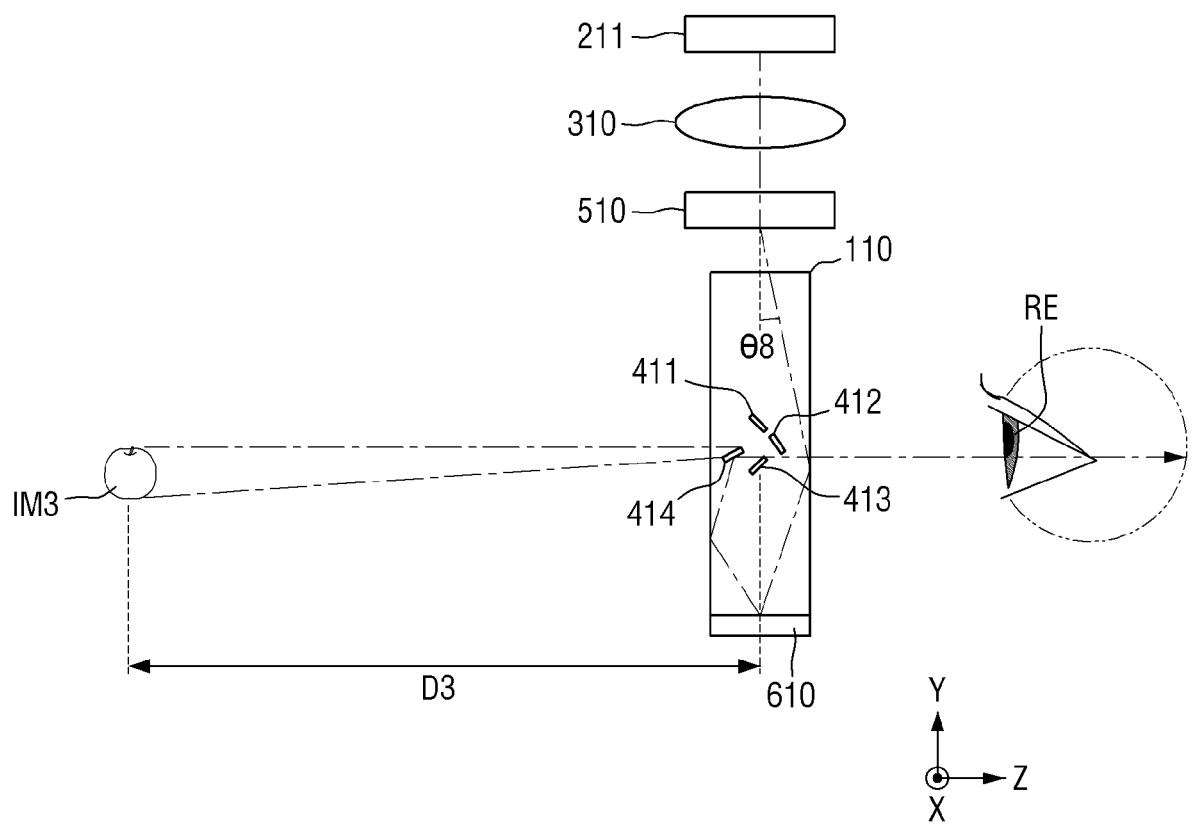
Figure 21:
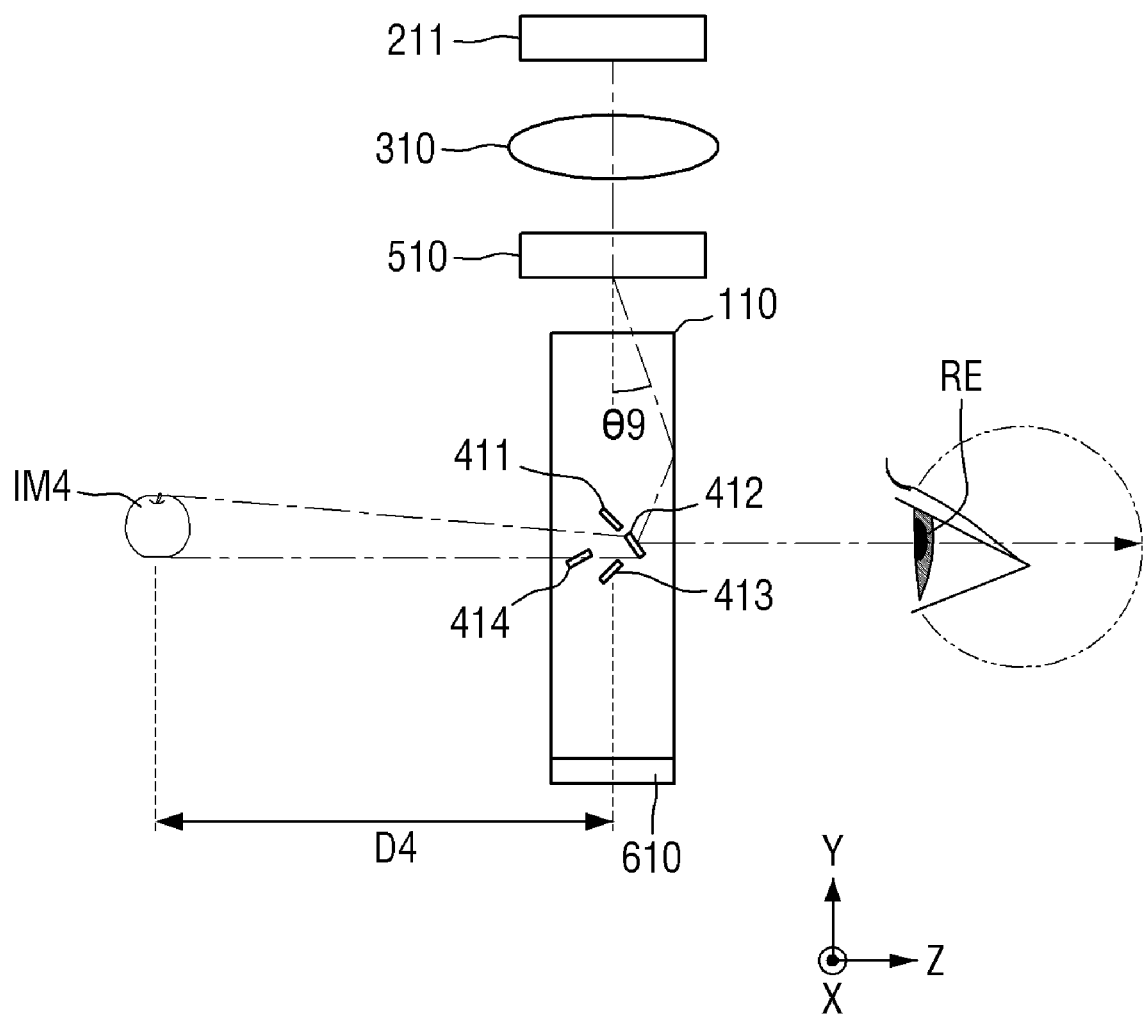

FIG. 17 is a schematic exploded perspective view illustrating an optical apparatus according to an embodiment. FIGS. 18 to 21 illustrate an example of a method for providing augmented reality using an optical apparatus according to an embodiment.

The embodiment illustrated in FIGS. 17 to 21 is different from the embodiment illustrated in FIGS. 12 to 15 at least in that a user can view a third virtual image IM3 and a fourth virtual image IM4 in addition to the first virtual image IM1 and the second virtual image IM2 displayed on the first display panel 211.

Referring to FIGS. 17 to 21, the first display panel 211 may display the first virtual image IM1 during the first period, display the second virtual image IM2 during the second period, display the third virtual image IM3 during a third period, and display the fourth virtual image IM4 during a fourth period. The first period, the second period, the third period, and the fourth period may be repeatedly arranged. The first virtual image IM1, the second virtual image IM2, the third virtual image IM3, and the fourth virtual image IM4 may be different from each other or may be the same.

The optical path of the first virtual image IM1 displayed on the first display panel 211 during the first period and the optical path of the second virtual image IM2 displayed on the first display panel 211 during the second period may be substantially the same as those described in conjunction with FIGS. 12 to 15. Therefore, the description of the optical path of the first virtual image IM1 displayed on the first display panel 211 during the first period and the optical path of the second virtual image IM2 displayed on the first display panel 211 during the second period will be omitted.

During the third period, the third virtual image IM3 displayed on the first display panel 211 is focused by the first convex lens 310 and incident on the first optical path control device 510. During the third period, the third virtual image IM3 displayed on the first display panel 211 may be outputted after the optical path is changed to the second direction by the first optical path control device 510. When it is assumed that the second virtual image IM2 is incident in the height direction (e.g., Y-axis direction) of the right eye lens 110, the second direction may be inclined at an eighth angle $\theta 8$ with respect to the height direction (e.g., Y-axis direction) of the right eye lens 110. The eighth angle $\theta 8$ may be greater than the seventh angle $\theta 7$.

During the third period, the third virtual image IM3 for which the optical path has been changed to the second direction by the first optical path control device 510 may be incident on the upper side surface of the right eye lens 110 and travel to the exit surface of the right eye lens 110. The third virtual image IM3 may be totally reflected by the exit surface of the right eye lens 110 and travel to the lower side surface of the right eye lens 110. The third virtual image IM3 may be reflected by the first reflecting sheet 610 disposed on the lower side surface of the right eye lens 110 and travel to a surface opposite to the exit surface of the right eye lens 110. The third virtual image IM3 may be totally reflected by the surface opposite to the exit surface of the right eye lens 110 and travel to a third reflecting member 413. During the third period, the third virtual image IM3 may be reflected by the third reflecting member 413 and emitted to the exit surface of the right eye lens 110 where the user's right eye RE is disposed. Accordingly, the third virtual image IM3 may be focused on the retina of the user's right eye RE. Therefore, during the third period, the user can view the third virtual image IM3 together with the real image without moving the focus set on the real image.

During the fourth period, the fourth virtual image IM4 displayed on the first display panel 211 is focused by the first convex lens 310 and incident on the first optical path control device 510. During the fourth period, the fourth virtual image IM4 displayed on the first display panel 211 may be outputted after the optical path is changed to the third direction by the first optical path control device 510. When it is assumed that the fourth virtual image IM4 is incident in the height direction (e.g., Y-axis direction) of the right eye lens 110, the third direction may be inclined at a ninth angle $\theta 9$ with respect to the height direction (e.g., Y-axis direction) of the right eye lens 110. The ninth angle $\theta 9$ may be greater than the eighth angle $\theta 9$.

During the fourth period, the fourth virtual image IM4 for which the optical path has been changed to the third direction by the first optical path control device 510 may be incident on the upper side surface of the right eye lens 110 and travel to the exit surface of the right eye lens 110. The fourth virtual image IM4 may be totally reflected by the exit surface of the right eye lens 110 and travel to a fourth reflecting member 414. During the fourth period, the fourth virtual image IM4 may be reflected by the fourth reflecting member 414 and emitted to the exit surface of the right eye lens 110 where the user's right eye RE is disposed. Accordingly, the fourth virtual image IM4 may be focused on the retina of the user's right eye RE. Therefore, during the fourth period, the user can view the fourth virtual image IM4 together with the real image without moving the focus set on the real image.

The distance from the first display panel 211, from which the second virtual image IM2 is emitted, to the retina of the user's right eye RE, to which the second virtual image IM2 is provided, may be greater than the distance from the first display panel 211, from which the first virtual image IM1 is emitted, to the retina of the user's right eye RE, to which the first virtual image IM1 is provided. Further, the distance from the first display panel 211, from which the third virtual image IM3 is emitted, to the retina of the user's right eye RE, to which the third virtual image IM3 is provided, may be greater than the distance from the first display panel 211, from which the second virtual image IM2 is emitted, to the retina of the user's right eye RE, to which the second virtual image IM2 is provided. Further, the distance from the first display panel 211, from which the fourth virtual image IM4 is emitted, to the retina of the user's right eye RE, to which the fourth virtual image IM4 is provided, may be smaller than the distance from the first display panel 211, from which the second virtual image IM2 is emitted, to the retina of the user's right eye RE, to which the second virtual image IM2 is provided. Further, the distance from the first display panel 211, from which the fourth virtual image IM4 is emitted, to the retina of the user's right eye RE, to which the fourth virtual image IM4 is provided, may be longer than the distance from the first display panel 211, from which the first virtual image IM1 is emitted, to the retina of the user's right eye RE, to which the first virtual image IM1 is provided.

Accordingly, a depth D3 of the third virtual image IM3 viewed by the user may be the greatest, the depth D2 of the second virtual image IM2 may be the second greatest, a depth D4 of the fourth virtual image IM4 may be the third greatest, and the depth D1 of the first virtual image IM1 may be the smallest. For example, the user can view the first and second virtual images IM1 and IM2 having different depths.

In order to increase the optical path between the first display panel 211 and the user's right eye RE, the first optical path adjusting part 320 and the third convex lens 330 may be additionally disposed between the first display panel 211 and the first convex lens 310 as shown in FIGS. 10 and 11.

Similar to FIGS. 18 to 21, the user can view the first and second virtual images IM1 and IM2 having different depths through the left eye.

Although FIGS. 17 to 21 illustrate only a first reflecting member 411, a second reflecting member 412, a third reflecting member 413, and a fourth reflecting member 414, the disclosure is not limited thereto. The first virtual image IM1 may be reflected by the first reflecting members 411 and emitted to the exit surface of the right eye lens 110. The second virtual image IM2 may be reflected by the second reflecting members 412 and emitted to the exit surface of the right eye lens 110. The third virtual image IM3 may be reflected by the third reflecting members 413 and emitted to the exit surface of the right eye lens 110. The fourth virtual image IM4 may be reflected by the fourth reflecting members 414 and emitted to the exit surface of the right eye lens 110.

FIGS. 22 to 25 illustrate an example of the first optical path control device of FIG. 17.

The embodiment illustrated in FIGS. 22 to 25 is different from the embodiment illustrated in FIGS. 8 and 9 at least in that the first optical path control device 510 further includes a second optical path control device 520. As illustrated in FIGS. 22 to 25, the differences from the embodiment shown in FIGS. 8 and 9 will be described.

Referring to FIGS. 22 to 25, the second optical path control device 520 may include a third substrate 521, a fourth substrate 522, a third electrode 523, a fourth electrode 524, a second alignment layer 525, a second liquid crystal layer 527, and a second single refractive index layer 528. The third substrate 521, the fourth substrate 522, the third electrode 523, the fourth electrode 524, the second alignment layer 525, the second liquid crystal layer 527, and the second single refractive index layer 528 of the second optical path control device 520 are similar to the first substrate 511, the second substrate 512, the first electrode 513, the second electrode 514, the first alignment layer 515, the first liquid crystal layer 517, and the first single refractive index layer 518 of the first optical path control device 510 shown in FIGS. 8 and 9. Therefore, the differences between the second optical path control device 520 shown in FIGS. 22 to 25 and the first optical path control device 510 shown in FIGS. 8 and 9 will be mainly described.

The boundary between the second liquid crystal layer 527 and the second single refractive index layer 528 may be formed in the form of a prism mountain as shown in FIGS. 22 to 25. The boundary between the second liquid crystal layer 527 and the second single refractive index layer 528 may be inclined at a sixth angle θ6 with respect to the horizontal direction (e.g., Z-axis direction). The sixth angle θ6 may be greater than the fifth angle θ5. Accordingly, the angle of the light L(↔) of the first display panel 211 refracted at the boundary between the second liquid crystal layer 527 and the second single refractive index layer 528 may be greater than the angle of the light L(↔) of the first display panel 211 refracted at the boundary between the first liquid crystal layer 517 and the first single refractive index layer 518. Further, a pitch Pit2 of the prism mountain formed by the boundary between the second liquid crystal layer 527 and the second single refractive index layer 528 may be smaller than a pitch Pit1 of the prism mountain formed by the boundary between the first liquid crystal layer 517 and the first single refractive index layer 518.

Figure 22:
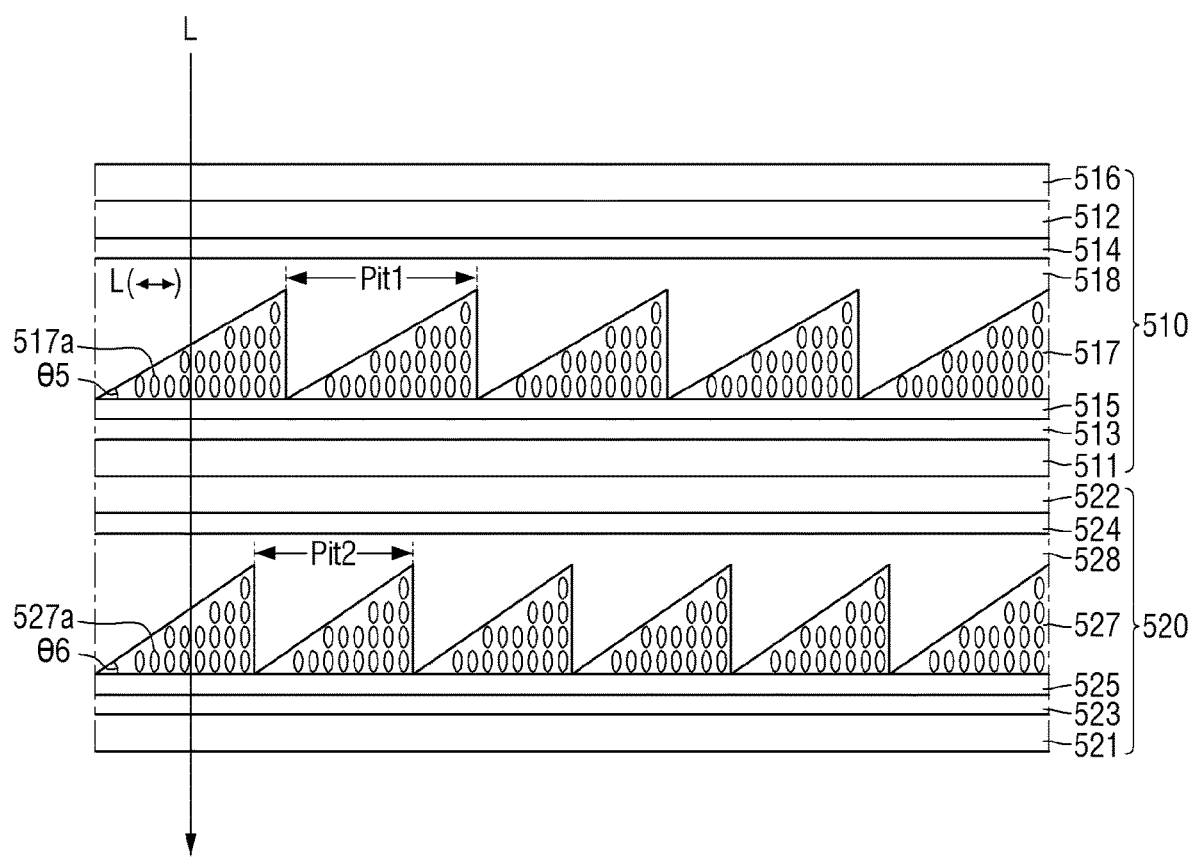
FIGS. 22 to 25 schematically illustrate an example of the first optical path control device of FIG. 17.

As shown in FIG. 22, in case that the liquid crystals 517a of the first liquid crystal layer 517 are arranged in the vertical direction (e.g., Y-axis direction), the liquid crystals 527a of the second liquid crystal layer 527 are arranged in the vertical direction (e.g., Y-axis direction), and the light L(↔) of the first display panel 211 vibrating in the horizontal direction (e.g., Z-axis direction) is incident thereon, the liquid crystals 517a of the first liquid crystal layer 517 and the liquid crystals 527a of the second liquid crystal layer 527 may have the ordinary refractive index $n_o$. In this case, the refractive index of the first single refractive index layer 518 and the refractive index of the liquid crystals 517a of the first liquid crystal layer 517 may be substantially the same. The refractive index of the second single refractive index layer 528 and the refractive index of the liquid crystals 527a of the second liquid crystal layer 527 may be substantially the same. Therefore, the light L(↔) of the first display panel 211 vibrating in the horizontal direction (e.g., Z-axis direction) may be outputted without being refracted at the boundary between the first single refractive index layer 518 and the first liquid crystal layer 517. Further, the light L(↔) of the first display panel 211 vibrating in the horizontal direction (e.g., Z-axis direction) may be outputted without being refracted at the boundary between the second single refractive index layer 528 and the second liquid crystal layer 527.

Figure 23:
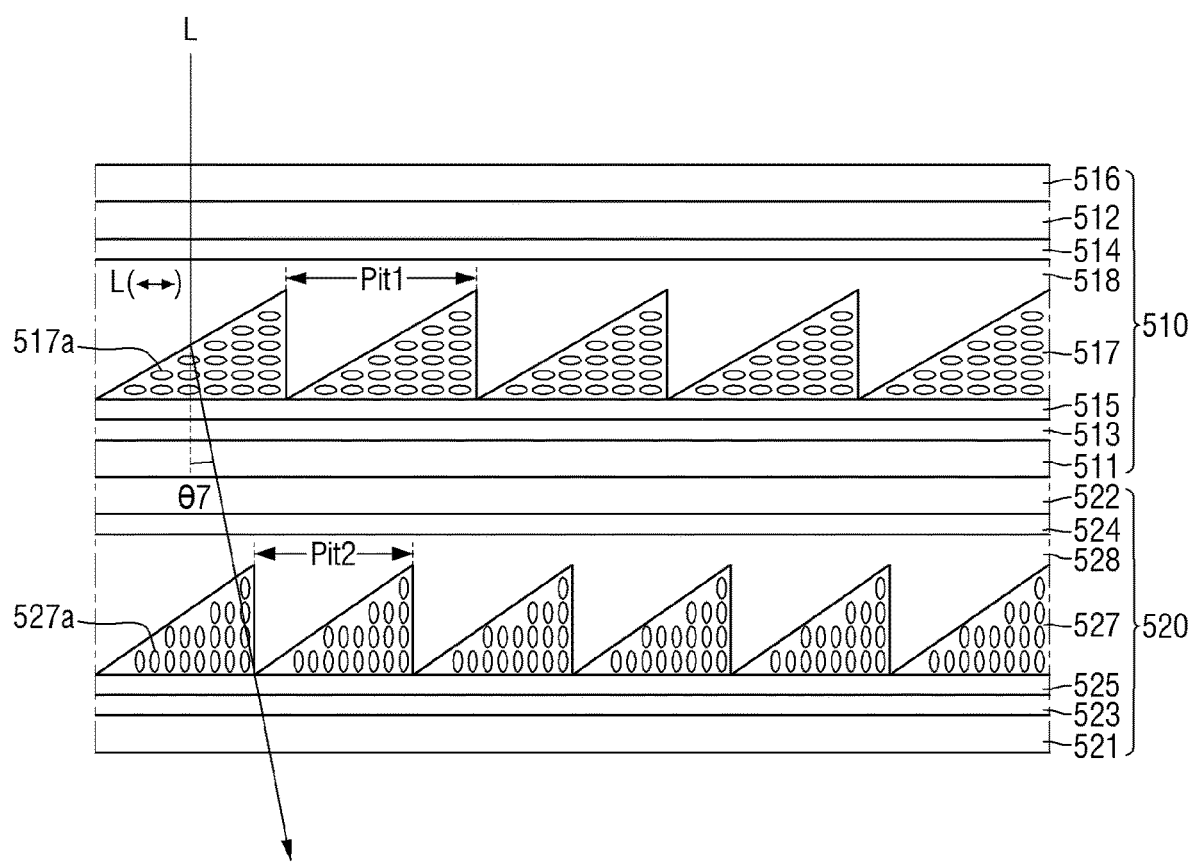

As shown in FIG. 23, in case that the liquid crystals 517a of the first liquid crystal layer 517 are arranged in the horizontal direction (e.g., Z-axis direction), the liquid crystals 527a of the second liquid crystal layer 527 are arranged in the vertical direction (e.g., Y-axis direction), and the light L(↔) of the first display panel 211 vibrating in the horizontal direction (e.g., Z-axis direction) is incident, the liquid crystals 517a of the first liquid crystal layer 517 may have the extraordinary refractive index $n_e$, and the liquid crystals 527a of the second liquid crystal layer 527 may have the ordinary refractive index $n_o$. In this case, the refractive index of the first single refractive index layer 518 and the refractive index of the liquid crystals 517a of the first liquid crystal layer 517 may be different. The refractive index of the second single refractive index layer 528 and the refractive index of the liquid crystals 527a of the second liquid crystal layer 527 may be substantially the same. Therefore, the light L(↔) of the first display panel 211 vibrating in the horizontal direction (e.g., Z-axis direction) may be refracted at the boundary between the first single refractive index layer 518 and the first liquid crystal layer 517. Further, the light L(↔) of the first display panel 211 vibrating in the horizontal direction (e.g., Z-axis direction) may be outputted without being refracted at the boundary between the second single refractive index layer 528 and the second liquid crystal layer 527. For example, the path of the light L(↔) of the first display panel 211 incident on the first optical path control device 510 may be changed. For example, the light L(↔) of the first display panel 211 incident in the vertical direction (e.g., Y-axis direction) may be refracted by the seventh angle θ7 with respect to the vertical direction (e.g., Y-axis direction).

Figure 24:
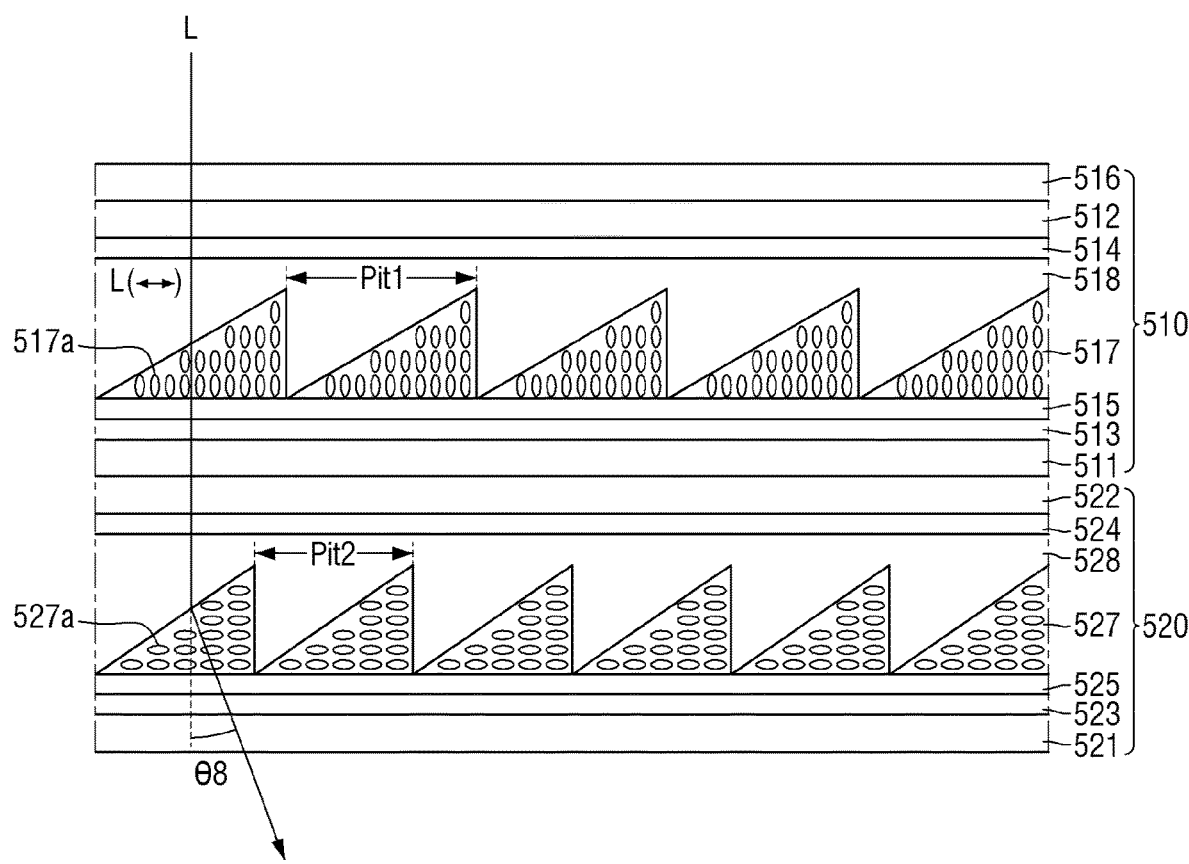

As shown in FIG. 24, in case that the liquid crystals 517a of the first liquid crystal layer 517 are arranged in the vertical direction (e.g., Y-axis direction), the liquid crystals 527a of the second liquid crystal layer 527 are arranged in the horizontal direction (e.g., Z-axis direction), and the light L(↔) of the first display panel 211 vibrating in the horizontal direction (e.g., Z-axis direction) is incident thereon, the liquid crystals 517a of the first liquid crystal layer 517 may have the ordinary refractive index $n_o$, and the liquid crystals 527a of the second liquid crystal layer 527 may have the extraordinary refractive index $n_e$. In this case, the refractive index of the first single refractive index layer 518 and the refractive index of the liquid crystals 517a of the first liquid crystal layer 517 may be substantially the same. The refractive index of the second single refractive index layer 528 and the refractive index of the liquid crystals 527a of the second liquid crystal layer 527 may be different from each other. Therefore, the light L(↔) of the first display panel 211 vibrating in the horizontal direction (e.g., Z-axis direction) may be outputted without being refracted at the boundary between the first single refractive index layer 518 and the first liquid crystal layer 517. Further, the light L(↔) of the first display panel 211 vibrating in the horizontal direction (e.g., Z-axis direction) may be refracted at the boundary between the second single refractive index layer 528 and the second liquid crystal layer 527. For example, the path of the light L(↔) of the first display panel 211 incident on the first optical path control device 510 may be changed. For example, the light L(↔) of the first display panel 211 incident in the vertical direction (e.g., Y-axis direction) may be refracted by the eighth angle θ8 with respect to the vertical direction (e.g., Y-axis direction).

Figure 25:
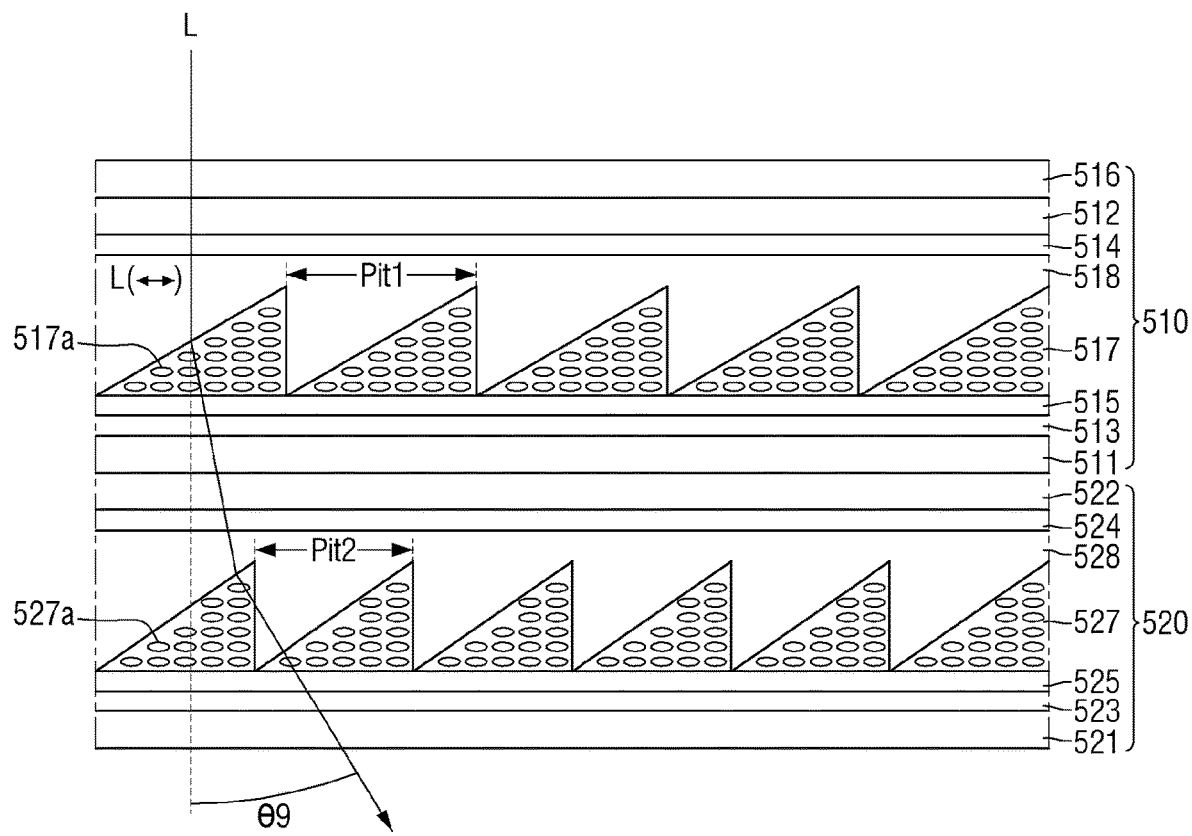

As shown in FIG. 25, in case that the liquid crystals 517a of the first liquid crystal layer 517 are arranged in the horizontal direction (e.g., Z-axis direction), the liquid crystals 527a of the second liquid crystal layer 527 are arranged in the horizontal direction (e.g., Z-axis direction), and the light L(↔) of the first display panel 211 vibrating in the horizontal direction (e.g., Z-axis direction) is incident thereon, the liquid crystals 517a of the first liquid crystal layer 517 may have the ordinary refractive indexes $n_o$, and the liquid crystals 527a of the second liquid crystal layer 527 may have the extraordinary refractive index $n_o$. In this case, the refractive index of the first single refractive index layer 518 and the refractive index of the liquid crystals 517a of the first liquid crystal layer 517 may be different. The refractive index of the second single refractive index layer 528 and the refractive index of the liquid crystals 527a of the second liquid crystal layer 527 may be different from each other. Therefore, the light L(↔) of the first display panel 211 vibrating in the horizontal direction (e.g., Z-axis direction) may be refracted at the boundary between the first single refractive index layer 518 and the first liquid crystal layer 517. Further, the light L(↔) of the first display panel 211 vibrating in the horizontal direction (e.g., Z-axis direction) may be refracted at the boundary between the second single refractive index layer 528 and the second liquid crystal layer 527. For example, the path of the light L(↔) of the first display panel 211 incident on the first optical path control device 510 may be changed. For example, the light L(↔) of the first display panel 211 incident in the vertical direction (e.g., Y-axis direction) may be refracted by the ninth angle θ9 with respect to the vertical direction (e.g., Y-axis direction).

In accordance with the embodiment shown in FIGS. 22 to 25, by controlling the liquid crystals 517a of the first liquid crystal layer 517 and the liquid crystals 527a of the second liquid crystal layer 527, it is possible to output the light incident on the first optical path control device 510 after the optical path thereof is selectively changed to one of four directions. For example, the path of the light outputted from the first display panel 211 may be selectively changed by the first optical path control device 510.

Figure 26:
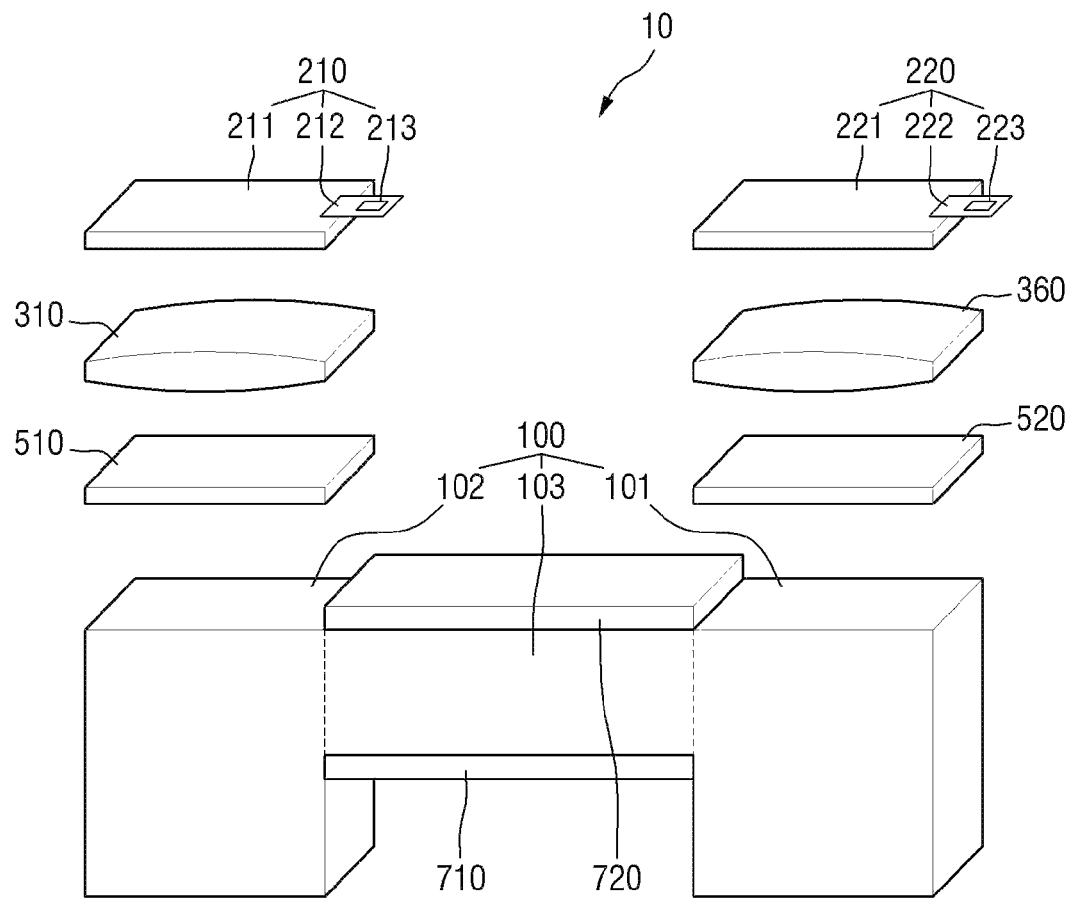
FIG. 26 is a schematic exploded perspective view illustrating an optical apparatus according to an embodiment.
Figure 27:
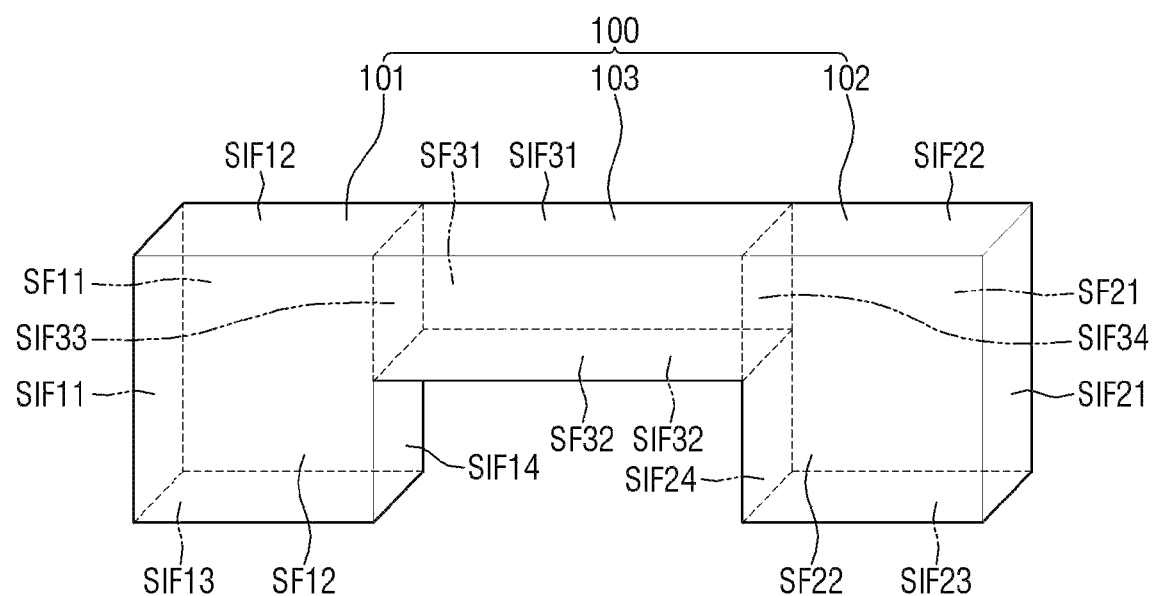
FIG. 27 is a schematic perspective view illustrating an example of the lens of FIG. 26.

FIG. 26 is a schematic exploded perspective view illustrating an optical apparatus according to an embodiment. FIG. 27 is a schematic perspective view illustrating an example of the lens of FIG. 26.

Referring to FIGS. 26 and 27, an augmented reality providing apparatus 10 according to an embodiment includes a lens 100, the first display device 210, the second display device 220, the first optical path control device 510, the second optical path control device 520, the first convex lens 310, the second convex lens 360, and the reflecting members 411, 412, 413, 414, 415, 416, 421, 422, 423, 424, 425, and 426.

The lens 100 may be formed of glass or plastic in a transparent or translucent manner. Therefore, the user can view the real image through the lens 100. The lens 100 may have a predetermined (or selected) refractive power in consideration of the visual acuity of the user.

As shown in FIG. 27, the lens 100 may include a first lens part 101, a second lens part 102, and a third lens part 103 disposed between the first lens part 101 and the second lens part 102. The first lens part 101 may be formed as a hexahedron having an exit surface SF11, a surface SF12 opposite to the exit surface SF11, and four side surfaces SIF11 to SIF14 which are quadrangular. The second lens part 102 may be formed as a hexahedron having an exit surface SF21, a surface SF22 opposite to the exit surface SF21, and four side surfaces SIF21 to SIF24 which are quadrangular. The third lens part 103 may be formed as a hexahedron having a first surface SF31, a second surface SF32, and four side surfaces SIF31 to SIF34 which are quadrangular.

The upper side surface SIF12 of the first lens part 101 may extend from a side of the right side surface SIF11, the lower side surface SIF13 thereof may extend from another side opposite to a side of the right side surface SIF11, and the left side surface SIF14 thereof may face the right side surface SIF11. The exit surface SF11 may be a top surface, and the surface SF12 opposite to the exit surface SF11 may be a bottom surface. The exit surface SF11 of the first lens part 101, which is a surface where the user's right eye RE is located, may be a surface from which light is emitted by the reflecting members 411, 412, 413, 414, 415, and 416, the surface SF12 opposite to the exit surface SF11 may be the outer surface of the lens 100.

The upper side surface SIF22 of the second lens part 102 may extend from a side of the left side surface SIF21, the lower side surface SIF23 thereof may extend from another side opposite to a side of the left side surface SIF21, and the right side surface SIF24 thereof may face the left side surface SIF21. The exit surface SF21 may be a top surface, and the surface SF22 opposite to the exit surface SF21 may be a bottom surface. The exit surface SF21, which is a surface where the user's left eye is located, may be a surface from which light is emitted by the reflecting members 421, 422, 423, 424, 425, and 426, and the surface SF22 opposite to the exit surface SF21 may be the outer surface of the lens 100.

The right side surface SIF33 of the third lens part 103 may extend from a side of the upper side surface SIF31, the left side surface SIF34 thereof may extend from another side opposite to a side of the upper side surface SIF31, and the lower side surface SIF32 thereof may face the upper side surface SIF31. The first surface SF31 may be a top surface, and the second surface SF32 may be a bottom surface.

The left side surface SIF14 of the first lens part 101 and the side surface SIF33 of the third lens part 103 may contact each other, and the right side surface SIF24 of the second lens part 102 and the left side surfaces SIF34 of the third lens part 103 may contact each other.

Although FIG. 27 illustrates that the first lens part 101, the second lens part 102, and the third lens part 103 of the lens 100 are formed as a hexahedron, the embodiments of the disclosure are not limited thereto. For example, each of the first lens part 101, the second lens part 102, and the third lens part 103 of the lens 100 may be formed as a polyhedron having a first surface, a second surface, and side surfaces which are polygonal. Further, in addition to the polyhedron, each of the first lens part 101, the second lens part 102, and the third lens part 103 of the lens 100 may be formed in other shapes such as a cylinder, an elliptic cylinder, a semicircular cylinder, a semi-elliptic cylinder, a distorted cylinder, or a distorted semicircular cylinder. The distorted cylinder and semicircular cylinder refer to a cylinder and a semicircular cylinder having a non-constant diameter.

The reflecting members 411, 412, 413, 414, 415, and 416 are disposed in the first lens part 101 of the lens 100. The reflecting members 421, 422, 423, 424, 425, and 426 are disposed in the second lens part 102 of the lens 100. The reflecting members 411, 412, 413, 414, 415, 416, 421, 422, 423, 424, 425, and 426 may be substantially the same as those described in conjunction with FIGS. 1 and 2.

The virtual image displayed on the first display device 210 or the virtual image displayed on the second display device 220 may be reflected by the reflecting members 411, 412, 413, 414, 415, and 416 and provided to the user's right eye RE. The virtual image displayed on the first display device 210 or the virtual image displayed on the second display device 220 may be reflected by reflecting members 421, 422, 423, 424, 425, and 426 and be provided to the user's left eye.

The first optical path control device 510 may be disposed on any of the side surfaces of the first lens part 101, and the second optical path control device 520 may be disposed on any of the side surfaces of the second lens part 102. For example, the first optical path control device 510 may be disposed on the side surface SIF12 of the first lens part 101, and the second optical path control device 520 may be disposed on the side surface SIF22 of the second lens part 102.

Each of the first optical path control device 510 and the second optical path control device 520 may selectively change the path of incident light. For example, each of the first optical path control device 510 and the second optical path control device 520 may output the incident light without changing the path of the incident light. Further, each of the first optical path control device 510 and the second optical path control device 520 may change the path of the incident light.

The first convex lens 310 may be disposed on the first optical path control device 510, and the second convex lens 360 may be disposed on the second optical path control device 520. Each of the first convex lens 310 and the second convex lens 360 may be formed as a planoconvex lens or a biconvex lens.

The first display device 210 may be disposed on the first convex lens 310, and the second display device 220 may be disposed on the second convex lens 360. The first display device 210 and the second display device 220 may be substantially the same as those described in conjunction with FIGS. 1 and 2.

FIGS. 28 to 33 illustrate an example of a method for providing augmented reality using an optical apparatus according to an embodiment.

Referring to FIGS. 28 to 33, the first display panel 211 may display the first virtual image IM1 during the first period, display the second virtual image IM2 during the second period, and display the third virtual image IM3 during the third period. The first display panel 211 may display the fourth virtual image IM4 during the fourth period, display a fifth virtual image IM5 during a fifth period, and display a sixth virtual image IM6 during a sixth period. The first period, the second period, the third period, the fourth period, the fifth period, and the sixth period may be repeatedly arranged. The first virtual image IM1, the second virtual image IM2, the third virtual image IM3, the fourth virtual image IM4, the fifth virtual image IM5, and the sixth virtual image IM6 may be different from each other or may be the same.

First, during the first period, the first virtual image IM1 displayed on the first display panel 211 is focused by the first convex lens 310 and incident on the first optical path control device 510. During the first period, the first virtual image IM1 displayed on the first display panel 211 may be outputted without a change in the optical path by the first optical path control device 510.

Figure 28:
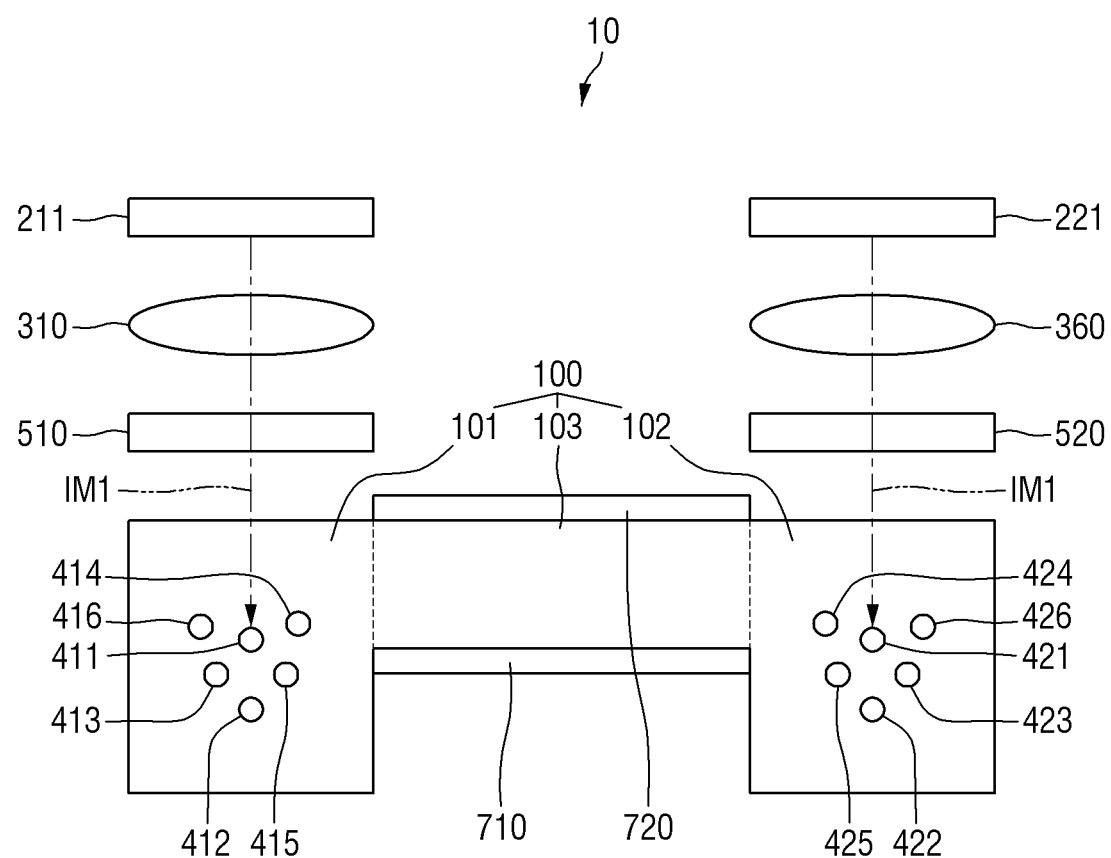
FIGS. 28 to 33 schematically illustrate an example of a method for providing augmented reality using an optical apparatus according to an embodiment.

As shown in FIG. 28, during the first period, the first virtual image IM1 outputted without a change in the optical path by the first optical path control device 510 may be incident on the upper side surface of the first lens part 101 and travel to the first reflecting member 411. During the first period, the first virtual image IM1 may be reflected by the first reflecting member 411 and emitted to the exit surface of the first lens part 101 where the user's right eye RE is disposed. Accordingly, the first virtual image IM1 may be focused on the retina of the user's right eye RE. Therefore, the user can view the first virtual image IM1 together with the real image without moving the focus set on the real image during the first period.

Second, during the second period, the second virtual image IM3 displayed on the first display panel 211 is focused by the first convex lens 310 and incident on the first optical path control device 510. During the second period, the second virtual image IM2 displayed on the first display panel 211 may be outputted after the optical path is changed to the first direction by the first optical path control device 510. When it is assumed that the second virtual image IM2 is incident in the height direction (e.g., Y-axis direction) of the first lens part 101, the first direction may be inclined by a tenth angle θ10 with respect to the height direction (e.g., Y-axis direction) of the first lens part 101.

Figure 29:
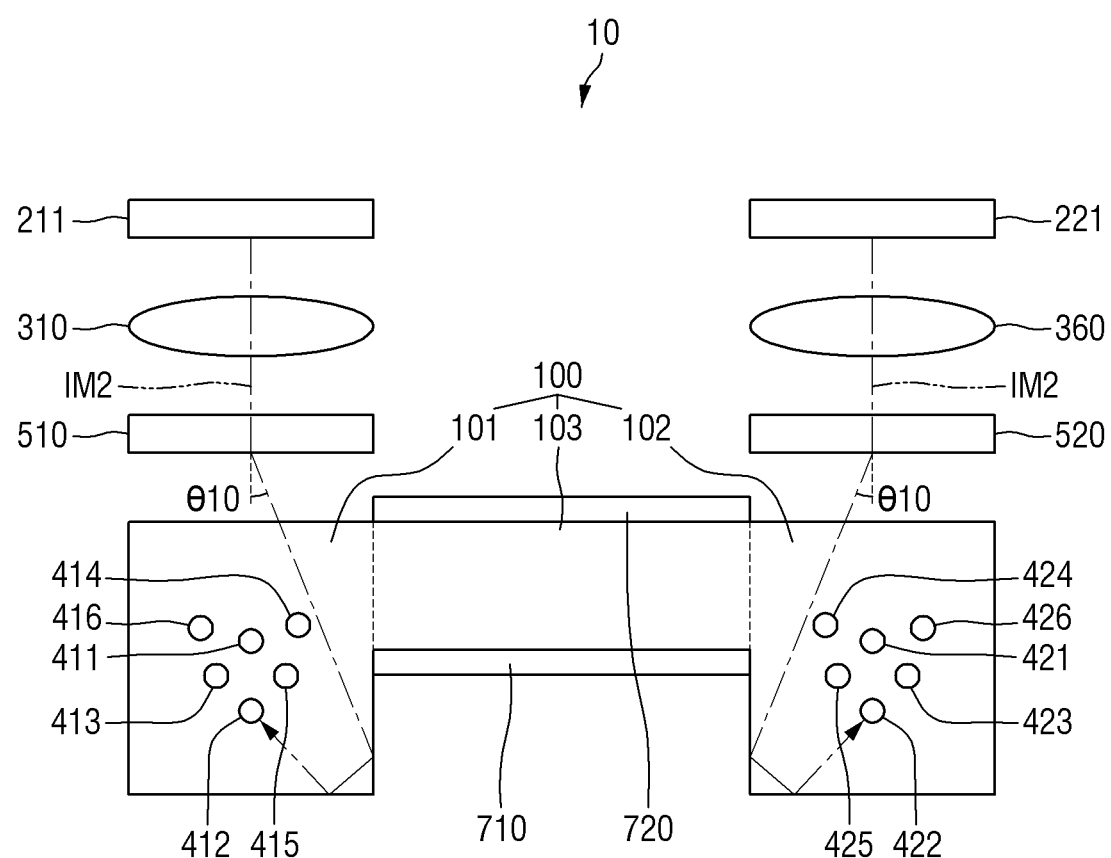

As shown in FIG. 29, during the second period, the second virtual image IM2 for which the optical path has been changed to the first direction by the first optical path control device 510 may be incident on the upper side surface of the first lens part 101 and travel to the left side surface of the first lens part 101. The second virtual image IM2 may be totally reflected by the left side surface of the first lens part 101 and travel to the lower side surface of the first lens part 101. The second virtual image IM2 may be reflected by the first reflecting sheet 610 disposed on the lower side surface of the first lens part 101 and travel to the second reflecting member 412. During the second period, the second virtual image IM2 may be reflected by the second reflecting member 412 and be emitted to the exit surface of the first lens part 101 where the user's right eye RE is disposed. Accordingly, the second virtual image IM2 may be focused on the retina of the user's right eye RE. Therefore, during the second period, the user can view the second virtual image IM2 together with the real image without moving the focus set on the real image.

Third, the third virtual image IM3 is focused by the first convex lens 310 and incident on the first optical path control device 510. During the third period, the third virtual image IM3 displayed on the first display panel 211 may be outputted after the optical path is changed to the second direction by the first optical path control device 510. When it is assumed that the second virtual image IM2 is incident in the height direction (e.g., Y-axis direction) of the first lens part 101, the second direction may be inclined at an eleventh angle θ11 with respect to the height direction (e.g., Y-axis direction) of the first lens part 101. The eleventh angle θ11 may be greater than the tenth angle θ10.

Figure 30:
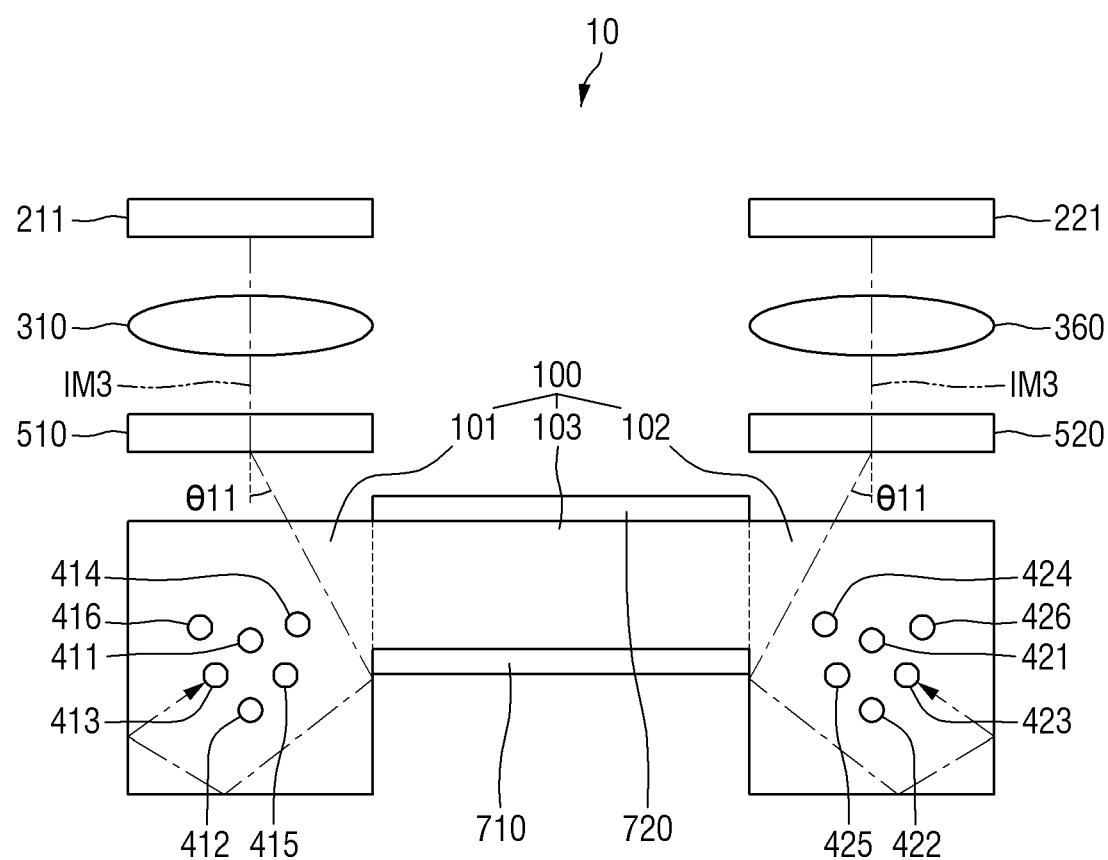

As shown in FIG. 30, during the third period, the third virtual image IM3 for which the optical path has been changed to the second direction by the first optical path control device 510 may be incident on the upper side surface of the first lens part 101 and travel to the left side surface of the first lens part 101. The third virtual image IM3 may be totally reflected by the left side surface of the first lens part 101 and travel to the lower side surface of the first lens part 101. The third virtual image IM3 may be reflected by the first reflecting sheet 610 disposed on the lower side surface of the first lens part 101 and travel to the right side surface of the first lens part 101. The third virtual image IM3 may be totally reflected by the right side surface of the first lens part 101 and travel to the third reflecting member 413. During the third period, the third virtual image IM3 may be reflected by the third reflecting member 413 and be emitted at the exit surface of the first lens part 101 where the user's right eye RE is disposed. Accordingly, the third virtual image IM3 may be focused on the retina of the user's right eye RE. Therefore, during the third period, the user can view the third virtual image IM3 together with the real image without moving the focus set on the real image.

Fourth, during the fourth period, the fourth virtual image IM4 displayed on the first display panel 211 is focused by the first convex lens 310 and incident on the first optical path control device 510. During the fourth period, the fourth virtual image IM4 displayed on the first display panel 211 may be outputted after the optical path is changed to the third direction by the first optical path control device 510. When it is assumed that the fourth virtual image IM4 is incident in the height direction (e.g., Y-axis direction) of the first lens part 101, the third direction may be inclined at a twelfth angle θ12 with respect to the height direction (e.g., Y-axis direction) of the first lens part 101. The twelfth angle θ12 may be greater than the eleventh angle θ11.

Figure 31:
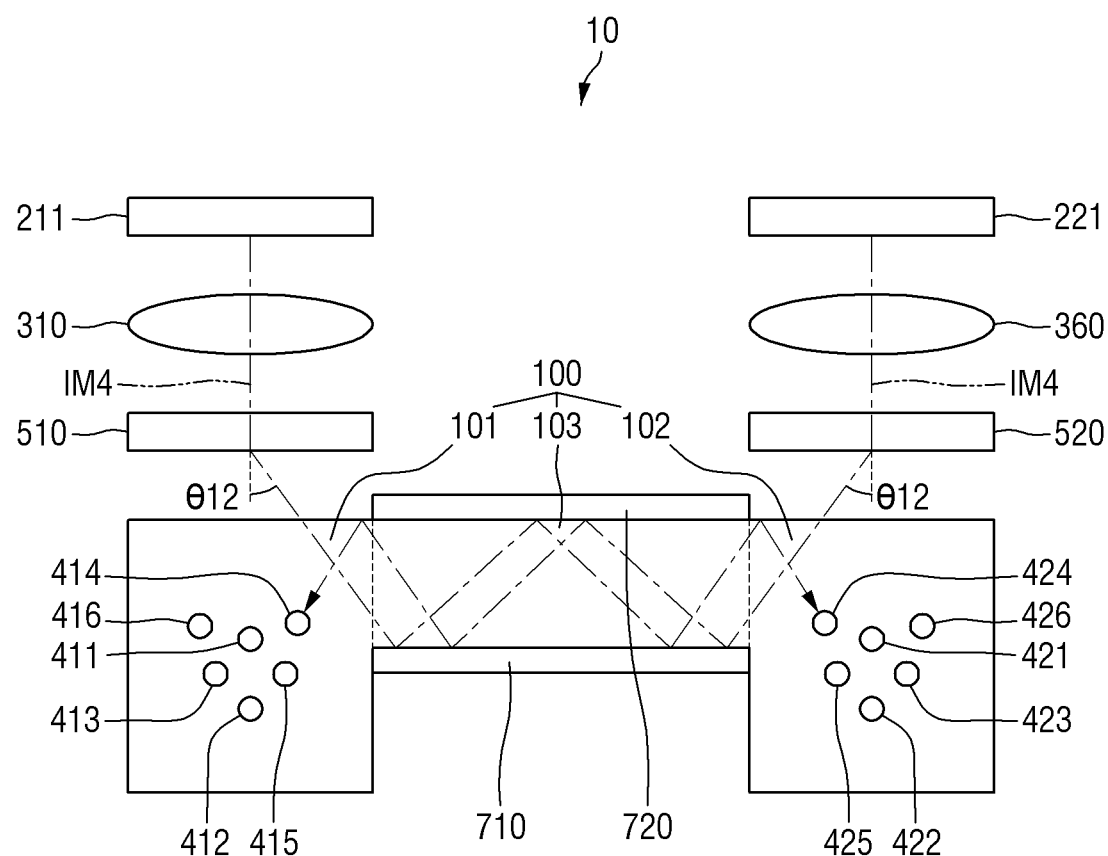

As shown in FIG. 31, during the fourth period, the fourth virtual image IM4 for which the optical path has been changed to the third direction by the first optical path control device 510 may be incident on the upper side surface of the first lens part 101 and travel to the lower side surface of the third lens part 103. The fourth virtual image IM4 may be reflected by a fourth reflecting sheet 710 disposed on the lower side surface of the third lens part 103 and travel to the upper side surface of the third lens part 103. The fourth virtual image IM4 may be reflected by a fifth reflecting sheet 720 disposed on the upper side surface of the third lens part 103 and travel to the lower side surface of the third lens part 103. The fourth virtual image IM4 may be totally reflected by the upper side surface of the second lens part 102 and travel to the fourth reflecting member 424 of the second lens part 102. During the fourth period, the fourth virtual image IM4 may be reflected by the fourth reflecting member 424 and emitted to the exit surface of the second lens part 102 where the user's left eye is disposed. Accordingly, the fourth virtual image IM4 may be focused on the retina of the user's left eye. Therefore, the user can view the fourth virtual image IM4 together with the real image without moving the focus set on the real image during the fourth period.

Fifth, during the fifth period, a fifth virtual image IM5 displayed on the first display panel 211 is focused by the first convex lens 310 and incident on the first optical path control device 510. During the fifth period, the fifth virtual image IM5 displayed on the first display panel 211 may be outputted after the optical path is changed to a fourth direction by the first optical path control device 510. When it is assumed that the fifth virtual image IM5 is incident in the height direction (e.g., Y-axis direction) of the first lens part 101, the fourth direction may be inclined at a thirteenth angle θ13 with respect to the height direction (e.g., Y-axis direction) of the first lens part 101. The thirteenth angle θ13 may be greater than the twelfth angle θ12.

Figure 32:
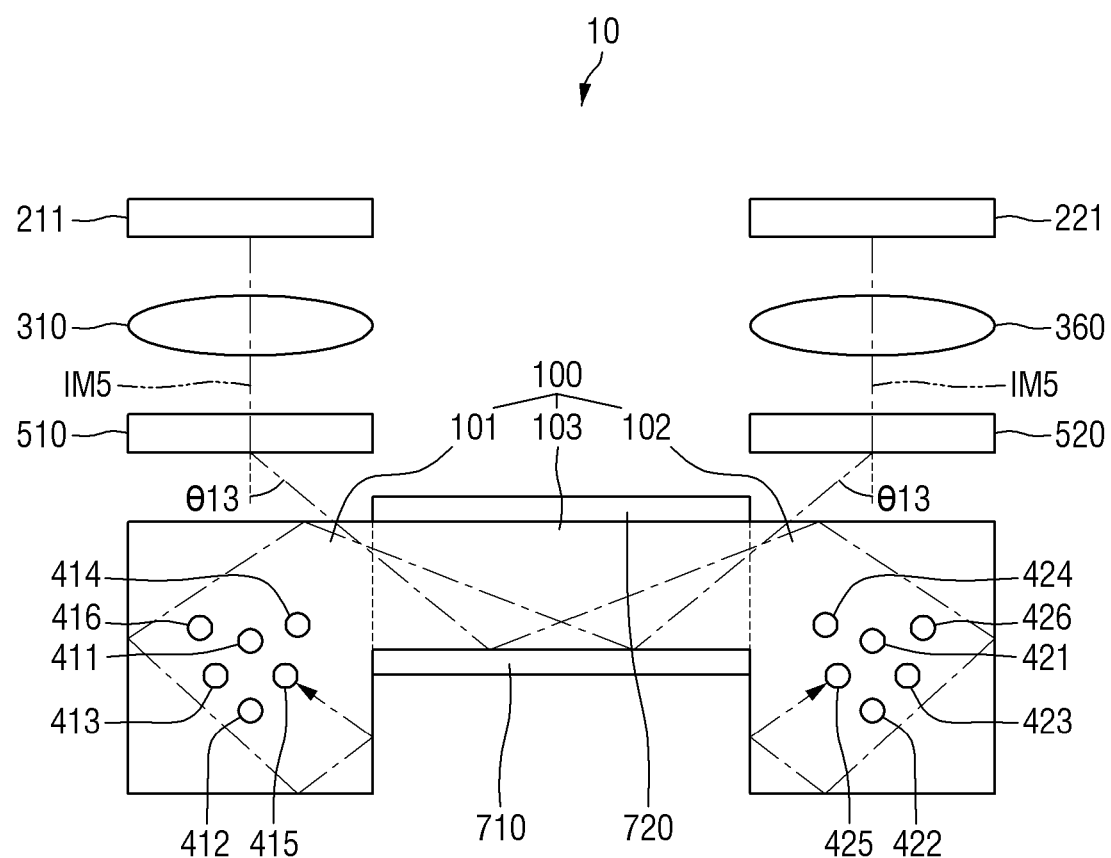

As shown in FIG. 32, during the fifth period, the fifth virtual image IM5 for which the optical path has been changed to the fourth direction by the first optical path control device 510 may be incident to the upper side surface of the first lens part 101 and travel to the lower side surface of the third lens part 103. The fifth virtual image IM5 may be reflected by the fourth reflecting sheet 710 disposed on the lower side surface of the third lens part 103 and travel to the upper side surface of the second lens part 102. The fifth virtual image IM5 may be totally reflected by the upper side surface of the second lens part 102 and travel to the left side surface of the second lens part 102. The fifth virtual image IM5 may be totally reflected by the left side surface of the second lens part 102 and travel to the lower side surface of the second lens part 102. The fifth virtual image IM5 may be reflected by the first reflecting sheet 610 disposed on the lower side surface of the second lens part 102 and travel to the right side surface of the second lens part 102. The fifth virtual image IM5 may be totally reflected by the right side surface of the second lens part 102 and travel to the fifth reflecting member 425 of the second lens part 102. During the fifth period, the fifth virtual image IM5 may be reflected by the fifth reflecting member 425 and emitted to the exit surface of the second lens part 102 where the user's left eye is disposed. Accordingly, the fifth virtual image IM5 may be focused on the retina of the user's left eye. Therefore, the user can view the fifth virtual image IM5 together with the real image without moving the focus set on the real image during the fifth period.

Sixth, during the sixth period, the sixth virtual image IM6 displayed on the first display panel 211 is focused by the first convex lens 310 and incident on the first optical path control device 510. During the sixth period, the sixth virtual image IM6 displayed on the first display panel 211 may be outputted after the optical path is changed to a fifth direction by the first optical path control device 510. When it is assumed that the sixth virtual image IM6 is incident in the height direction (e.g., Y-axis direction) of the first lens part 101, the fifth direction may be inclined at a fourteenth angle θ14 with respect to the height direction (e.g., Y-axis direction) of the first lens part 101. The fourteenth angle θ14 may be greater than the thirteenth angle θ13.

Figure 33:
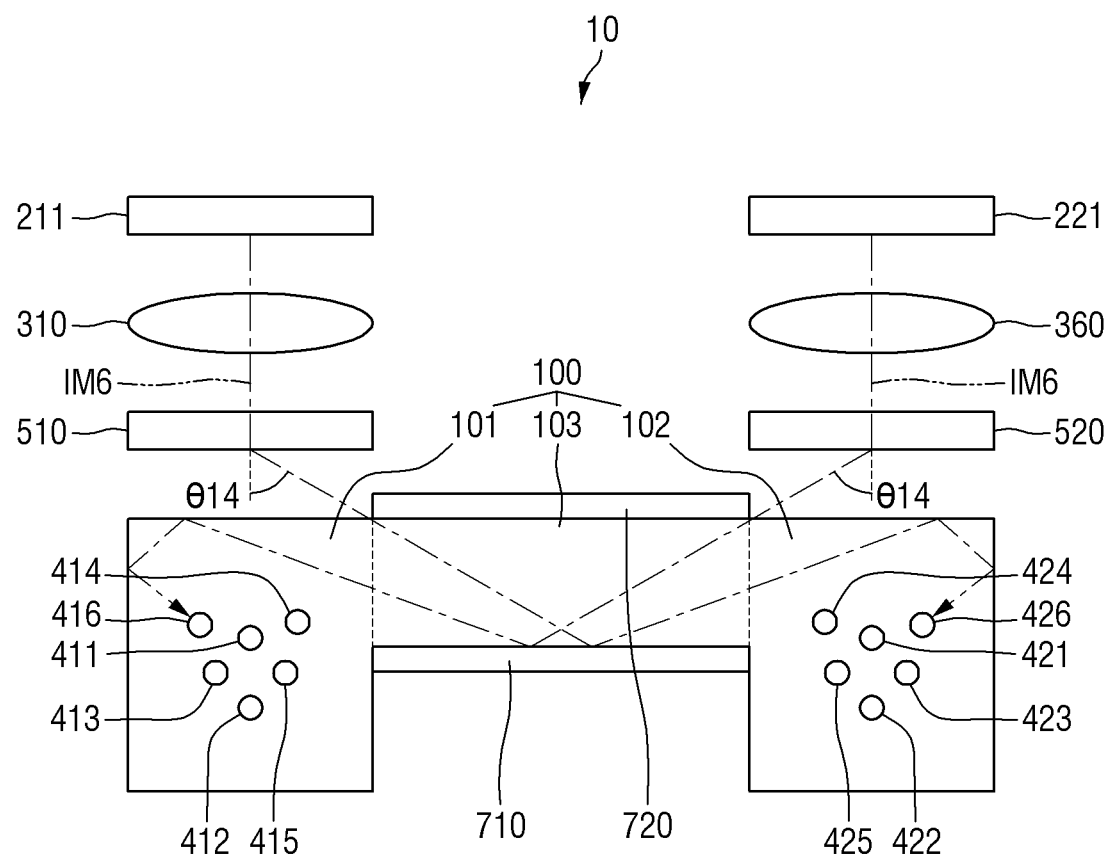

As shown in FIG. 33, during the sixth period, the sixth virtual image IM6 for which the optical path has been changed to the fifth direction by the first optical path control device 510 may be incident on the upper side surface of the first lens part 101 and travel to the lower side surface of the third lens part 103. The sixth virtual image IM6 may be reflected by the fourth reflecting sheet 710 disposed on the lower side surface of the third lens part 103 and travel to the upper side surface of the second lens part 102. The sixth virtual image IM6 may be totally reflected by the upper side surface of the second lens part 102 and travel to the left side surface of the second lens part 102. The sixth virtual image IM6 may be totally reflected by the left side surface of the second lens part 102 and travel to the sixth reflecting member 426. During the sixth period, the sixth virtual image IM6 may be reflected by the sixth reflecting member 426 and emitted to the exit surface of the second lens part 102 where the user's left eye is disposed. Accordingly, the sixth virtual image IM6 may be focused on the retina of the user's left eye. Therefore, during the sixth period, the user can view the sixth virtual image IM6 together with the real image without moving the focus set on the real image.

The distance from the first display panel 211, from which the second virtual image IM2 is emitted, to the retina of the user's right eye RE, to which the second virtual image IM2 is provided, may be greater than the distance from the first display panel 211, from which the first virtual image IM1 is emitted, to the retina of the user's right eye RE, to which the first virtual image IM1 is provided. Further, the distance from the first display panel 211, from which the third virtual image IM3, is emitted to the retina of the user's right eye RE, to which the third virtual image IM3 is provided, may be greater than the distance from the first display panel 211, from which the second virtual image IM2, is emitted to the retina of the user's right eye RE, to which the second virtual image IM2 is provided. Further, the distance from the first display panel 211, from which the sixth virtual image IM6 is emitted, to the retina of the user's left eye, to which the sixth virtual image IM6 is provided, may be greater than the distance from the first display panel 211, from which the third virtual image IM3 is emitted, to the retina of the user's right eye RE, to which the third virtual image IM3 is provided. Further, the distance from the first display panel 211, from which the fourth virtual image IM4 is emitted, to the retina of the user's left eye, to which the fourth virtual image IM4 is provided, may be greater than the distance from the first display panel 211, from which the sixth virtual image IM6 is emitted, to the retina of the user's left eye, to which the sixth virtual image IM6 is provided. Further, the distance from the first display panel 211, from which the fifth virtual image IM5 is emitted, to the retina of the user's left eye, to which the fifth virtual image IM5 is provided, may be greater than the distance from the first display panel 211, from which the fourth virtual image IM4 is emitted, to the retina of the user's left eye, to which the fourth virtual image IM4 is provided.

Accordingly, the depth of the fifth virtual image IM5 viewed by the user may be the greatest, and the depth of the fourth virtual image IM4 may be the second greatest. The depth of the sixth virtual image IM6 may be the third greatest, and the depth of the third virtual image IM3 may be the fourth greatest. The depth of the second virtual image IM2 may be the fifth greatest, and the depth of the first virtual image IM1 may be the smallest. For example, the user can view the virtual images IM1, IM2, IM3, IM4, IM5, and IM6 having different depths.

Further, since the optical paths of the first to sixth virtual images IM1, IM2, IM3, IM4, IM5, and IM6 displayed on the second display panel 221 are symmetrical to the optical paths of the first to sixth virtual images IM1, IM2, IM3, IM4, IM5, and IM6 displayed on the first display panel 211, descriptions thereof will be omitted.

Further, the first to third virtual images IM1, IM2, and IM3 displayed on the first display panel 211 may be reflected by the reflecting members 411, 412, and 413 of the first lens part 101 and provided to the user's right eye RE, whereas the fourth to sixth virtual images IM4, IM5, and IM6 displayed on the first display panel 211 may be reflected by the reflecting members 424, 425, and 426 of the second lens part 102 and provided to the user's left eye. Furthermore, the first to third virtual images IM1, IM2, and IM3 displayed on the second display panel 221 may be reflected by the reflecting members 421, 422, and 423 of the second lens part 101 and provided to the user's left eye, whereas the fourth to sixth virtual images IM4, IM5, and IM6 displayed on the second display panel 221 may be reflected by the reflecting members 414, 415, and 416 of the first lens part 101 and provided to the user's right eye RE.

In order to increase the optical path between the first display panel 211 and the user's right eye RE and left eye, the first optical path adjusting part 320 and the third convex lens 330 may be additionally disposed between the first display panel 211 and the first convex lens 310 as shown in FIGS. 10 and 11. Further, in order to increase the optical path between the second display panel 221 and the user's right eye RE and the left eye, the second optical path adjusting part 370 and the fourth convex lens 380 may be additionally disposed between the second display panel 221 and the second convex lens 360 as shown in FIGS. 10 and 11.

FIGS. 34 to 39 illustrate an example of the first optical path control device of FIG. 26.

The embodiment shown in FIGS. 34 to 39 is different from the embodiment shown in FIGS. 22 to 25 at least in that the first optical path control device 510 further includes a third optical path control device 530. With respect to FIGS. 34 to 39, the differences from the embodiment shown in FIGS. 22 to 25 will be mainly described.

Referring to FIGS. 34 to 39, the third optical path control device 530 may include a fifth substrate 531, a sixth substrate 532, a fifth electrode 533, a sixth electrode 534, a third alignment layer 535, a third liquid crystal layer 537, and a third single refractive index layer 538. The fifth substrate 531, the sixth substrate 532, the fifth electrode 533, the sixth electrode 534, the third alignment layer 535, the third liquid crystal layer 537, and the third single refractive index layer 538 of the third optical path control device 530 are similar to the third substrate 521, the fourth substrate 522, the third electrode 523, the fourth electrode 524, the second alignment layer 525, the second liquid crystal layer 527, and the second single refractive index layer 528 of the second optical path control device 520 shown in FIGS. 22 to 25. Therefore, the differences between the third optical path control device 530 shown in FIGS. 34 to 39 and the second optical path control device 520 shown in FIGS. 22 to 25 will be mainly described.

The boundary between the third liquid crystal layer 537 and the third single refractive index layer 538 may be formed in the form of a prism mountain as shown in FIGS. 34 to 39. The boundary between the third liquid crystal layer 537 and the third single refractive index layer 538 may be inclined at a fifteenth angle θ15 with respect to the horizontal direction (e.g., Z-axis direction). The fifteenth angle θ15 may be smaller than the fifth angle θ5. Accordingly, the angle of the light L(↔) of the first display panel 211 refracted at the boundary between the third liquid crystal layer 537 and the third single refractive index layer 538 may be smaller than the angle of the light L(↔) of the first display panel 211 refracted at the boundary between the first liquid crystal layer 517 and the first single refractive index layer 518. Further, a pitch Pit3 of the prism mountain formed by the boundary between the third liquid crystal layer 537 and the third single refractive index layer 538 may be greater than the pitch Pit1 of the prism mountain formed by the boundary between the first liquid crystal layer 517 and the first single refractive index layer 518.

Figure 34:
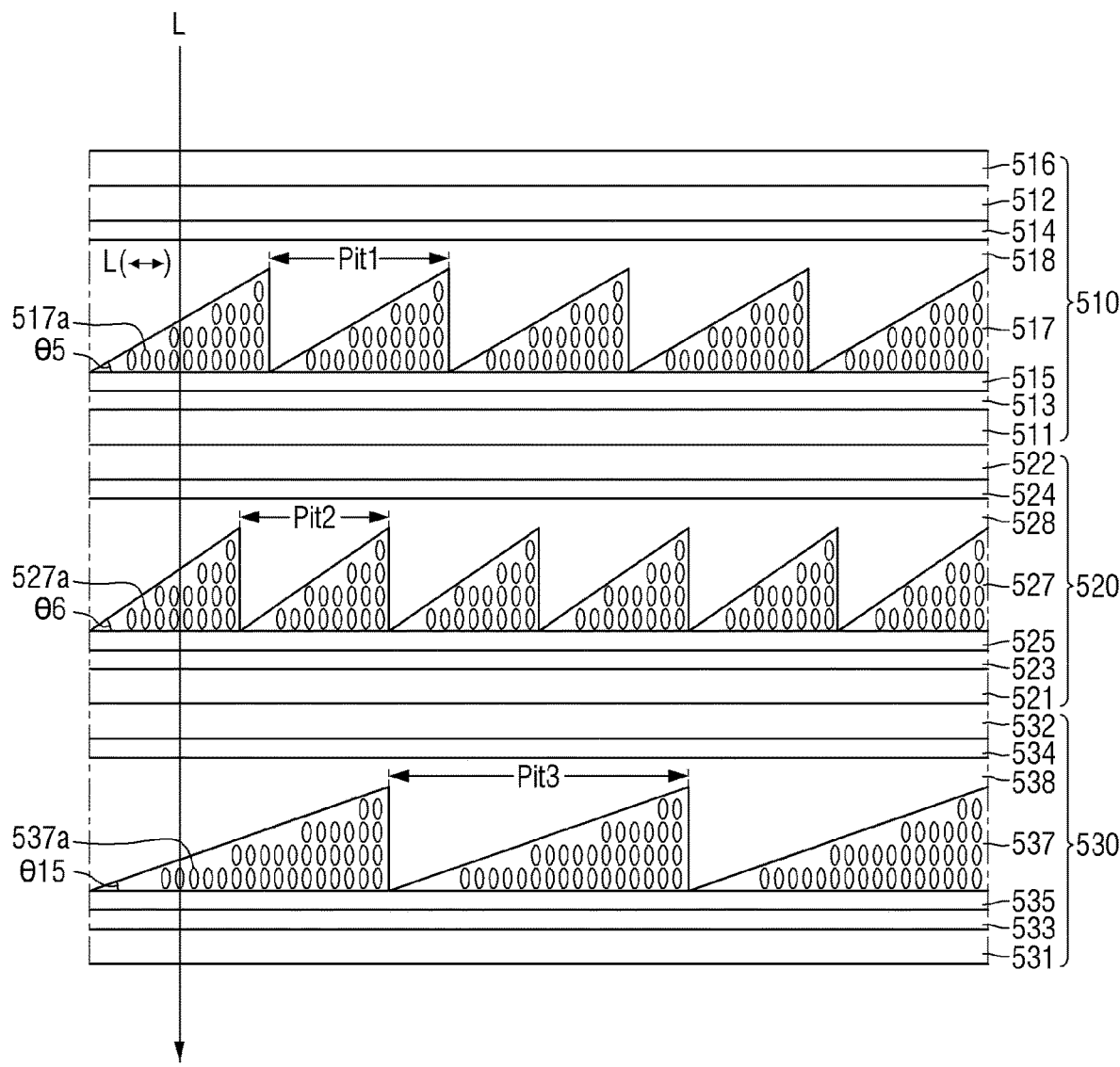
FIGS. 34 to 39 schematically illustrate an example of the first optical path control device of FIG. 26.

As shown in FIG. 34, in case that the liquid crystals 517a of the first liquid crystal layer 517 are arranged in the vertical direction (e.g., Y-axis direction), the liquid crystals 527a of the second liquid crystal layer 527 are arranged in the vertical direction (e.g., Y-axis direction), liquid crystals 537a of the third liquid crystal layer 537 are arranged in the vertical direction (e.g., Y-axis direction), and the light L(↔) of the first display panel 211 vibrating in the horizontal direction (e.g., Z-axis direction) is incident thereon, the liquid crystals 517a of the first liquid crystal layer 517, the liquid crystals 527a of the second liquid crystal layer 527, and the liquid crystals 537a of the third liquid crystal layer 537 may have the ordinary refractive index $n_o$. In this case, the refractive index of the first single refractive index layer 518 and the refractive index of the liquid crystals 517a of the first liquid crystal layer 517 may be substantially the same. The refractive index of the second single refractive index layer 528 and the refractive index of the liquid crystals 527a of the second liquid crystal layer 527 may be substantially the same. The refractive index of the third single refractive index layer 538 and the refractive index of the liquid crystals 537a of the third liquid crystal layer 537 may be substantially the same. Therefore, the light L(↔) of the first display panel 211 vibrating in the horizontal direction (e.g., Z-axis direction) may be outputted without being refracted at the boundary between the first single refractive index layer 518 and the first liquid crystal layer 517. Further, the light L(↔) of the first display panel 211 vibrating in the horizontal direction (e.g., Z-axis direction) may be outputted without being refracted at the boundary between the second single refractive index layer 528 and the second liquid crystal layer 527. Further, the light L(↔) of the first display panel 211 vibrating in the horizontal direction (e.g., Z-axis direction) may be outputted without being refracted at the boundary between the third single refractive index layer 538 and the third liquid crystal layer 537.

Figure 35:
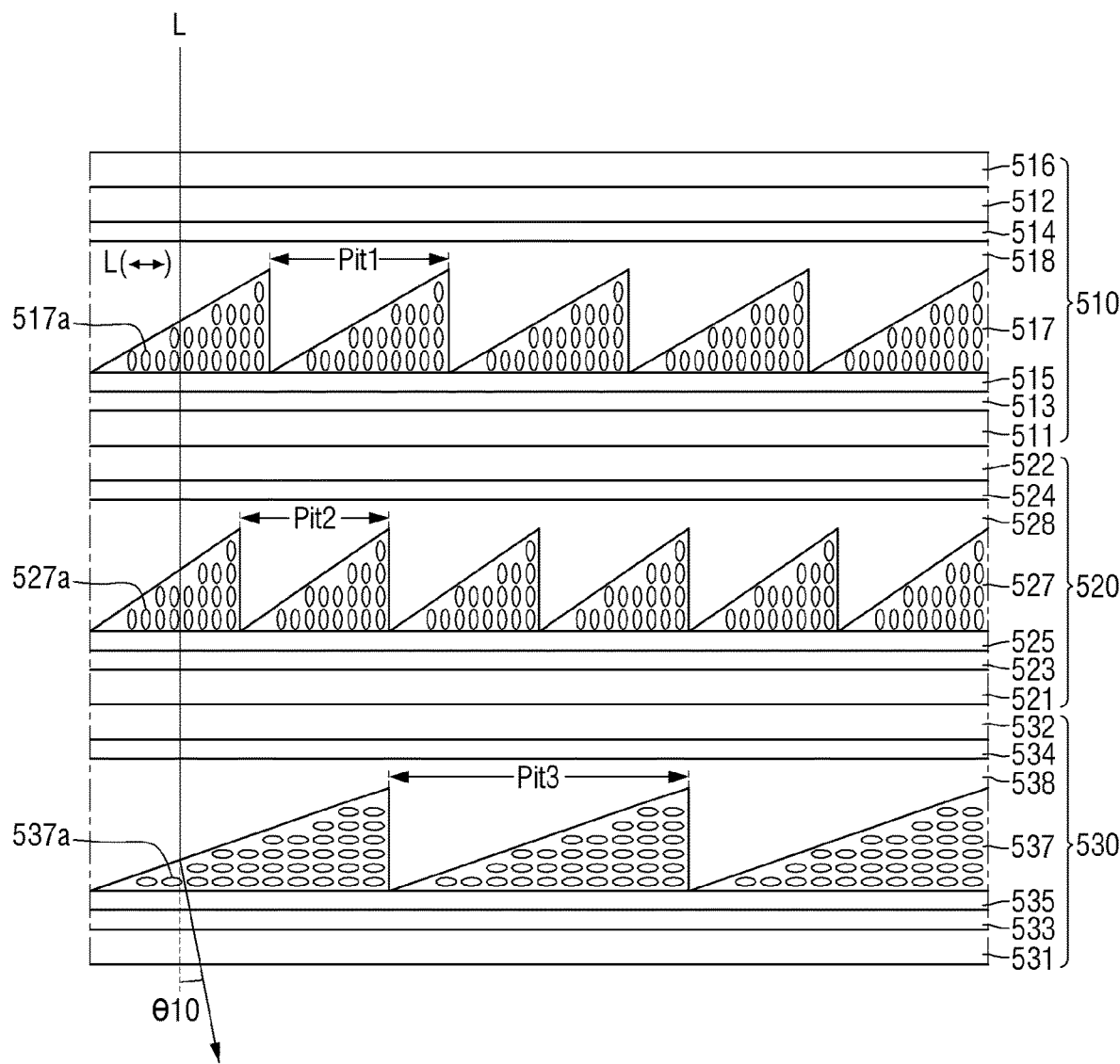

As shown in FIG. 35, in case that the liquid crystals 517a of the first liquid crystal layer 517 are arranged in the vertical direction (e.g., Y-axis direction), the liquid crystals 527a of the second liquid crystal layer 527 are arranged in the vertical direction (the Y-axis direction), the liquid crystals 537a of the third liquid crystal layer 537 are arranged in the horizontal direction (e.g., Z-axis direction), and the light L(↔) of the first display panel 211 vibrating in the horizontal direction (e.g., Z-axis direction) is incident thereon, the liquid crystals 517a of the first liquid crystal layer 517 and the liquid crystals 527a of the second liquid crystal layer 527 may have the ordinary refractive index $n_o$, and the liquid crystals 537a of the third liquid crystal layer 537 may have the extraordinary refractive index $n_e$. In this case, the refractive index of the first single refractive index layer 518 and the refractive index of the liquid crystals 517a of the first liquid crystal layer 517 may be substantially the same. The refractive index of the second single refractive index layer 528 and the refractive index of the liquid crystals 527a of the second liquid crystal layer 527 may be substantially the same. The refractive index of the third single refractive index layer 538 and the refractive index of the liquid crystals 537a of the third liquid crystal layer 537 may be different from each other. Therefore, the light L(↔) of the first display panel 211 vibrating in the horizontal direction (e.g., Z-axis direction) may be outputted without being refracted at the boundary between the first single refractive index layer 518 and the first liquid crystal layer 517. Further, the light L(↔) of the first display panel 211 vibrating in the horizontal direction (e.g., Z-axis direction) may be outputted without being refracted at the boundary between the second single refractive index layer 528 and the second liquid crystal layer 527. Further, the light L(↔) of the first display panel 211 vibrating in the horizontal direction (e.g., Z-axis direction) may be refracted at the boundary between the third single refractive index layer 538 and the third liquid crystal layer 537. For example, the path of the light L(↔) of the first display panel 211 incident on the first optical path control device 510 may be changed. For example, the light L(↔) of the first display panel 211 incident in the vertical direction (e.g., Y-axis direction) may be refracted by the tenth angle θ10 with respect to the vertical direction (e.g., Y-axis direction).

Figure 36:
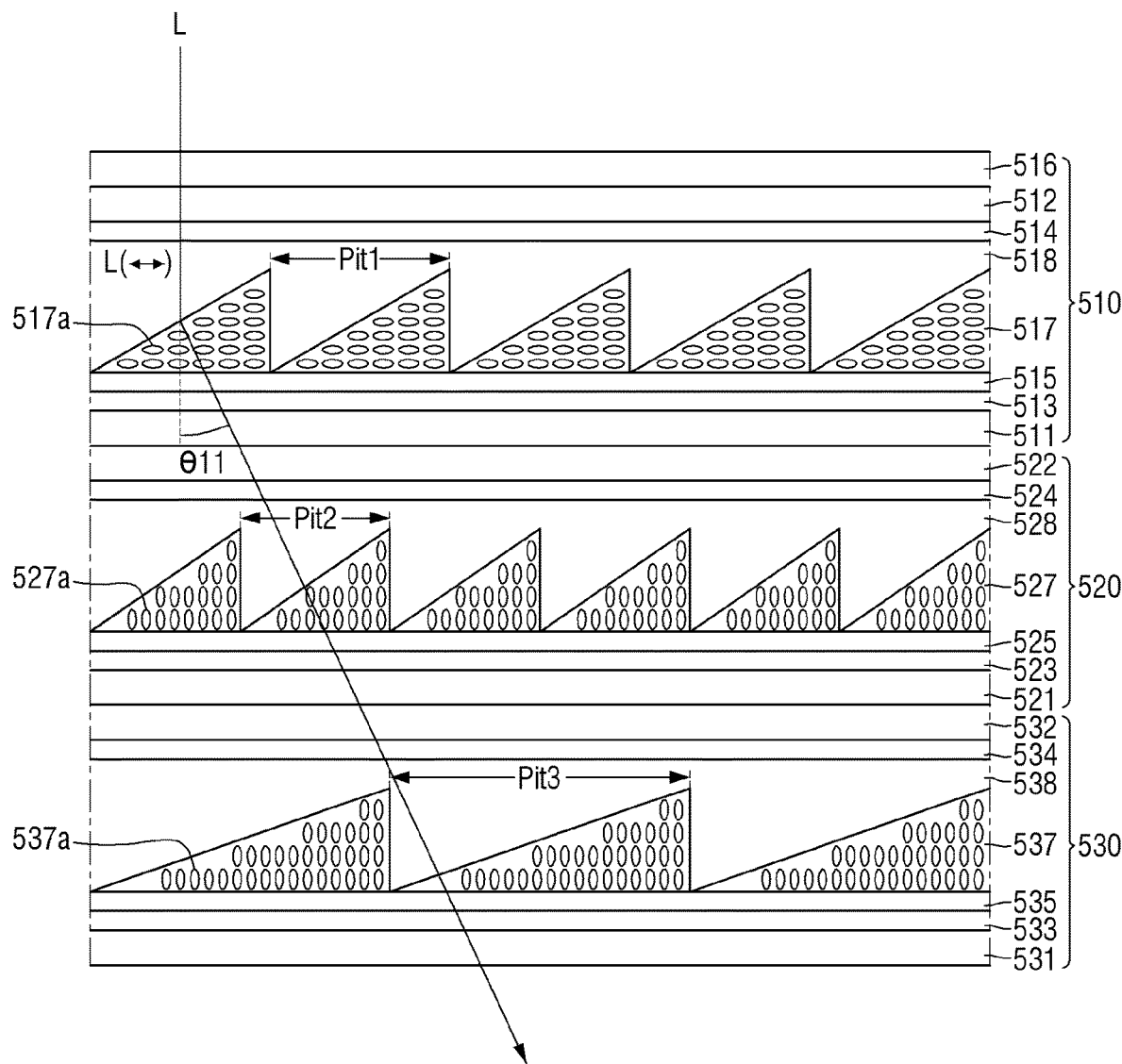

As shown in FIG. 36, in case that the liquid crystals 517a of the first liquid crystal layer 517 are arranged in the horizontal direction (e.g., Z-axis direction), the liquid crystals 527a of the second liquid crystal layer 527 are arranged in the vertical direction (e.g., Y-axis direction), the liquid crystals 537a of the third liquid crystal layer 537 are arranged in the vertical direction (e.g., Y-axis direction), and the light L(↔) of the first display panel 211 vibrating in the horizontal direction (e.g., Z-axis direction) is incident thereon, the liquid crystals 517a of the first liquid crystal layer 517 may have the extraordinary refractive index $n_e$, and the liquid crystals 527a of the second liquid crystal layer 527 and the liquid crystals 537a of the third liquid crystal layer 537 may have the ordinary refractive index $n_o$. In this case, the refractive index of the first single refractive index layer 518 and the refractive index of the liquid crystals 517a of the first liquid crystal layer 517 may be different. The refractive index of the second single refractive index layer 528 and the refractive index of the liquid crystals 527a of the second liquid crystal layer 527 may be substantially the same. The refractive index of the third single refractive index layer 538 and the refractive index of the liquid crystals 537a of the third liquid crystal layer 537 may be substantially the same. Therefore, the light L(↔) of the first display panel 211 vibrating in the horizontal direction (e.g., Z-axis direction) may be refracted at the boundary between the first single refractive index layer 518 and the first liquid crystal layer 517. Further, the light L(↔) of the first display panel 211 vibrating in the horizontal direction (e.g., Z-axis direction) may be outputted without being refracted at the boundary between the second single refractive index layer 528 and the second liquid crystal layer 527. Further, the light L(↔) of the first display panel 211 vibrating in the horizontal direction (e.g., Z-axis direction) may be outputted without being refracted at the boundary between the third single refractive index layer 538 and the third liquid crystal layer 537. For example, the path of the light L(↔) of the first display panel 211 incident on the first optical path control device 510 may be changed. For example, the light L(↔) of the first display panel 211 incident in the vertical direction (e.g., Y-axis direction) may be refracted by the eleventh angle θ11 with respect to the vertical direction (e.g., Y-axis direction).

Figure 37:
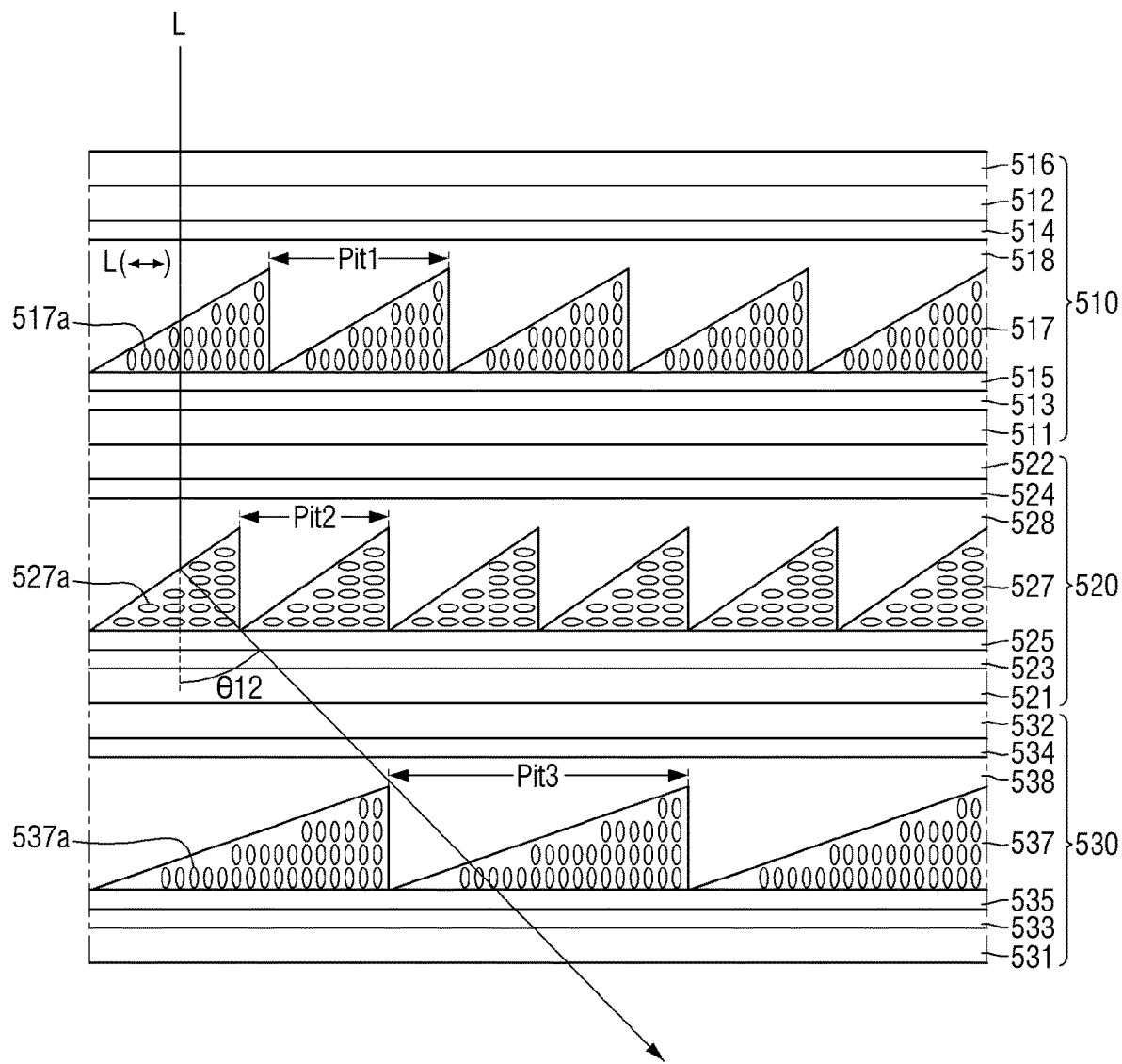

As shown in FIG. 37, in case that the liquid crystals 517a of the first liquid crystal layer 517 are arranged in the vertical direction (e.g., Y-axis direction), the liquid crystals 527a of the second liquid crystal layer 527 are arranged in the horizontal direction (e.g., Z-axis direction), the liquid crystals 537a of the third liquid crystal layer 537 are arranged in the vertical direction (e.g., Y-axis direction), and the light L(↔) of the first display panel 211 vibrating in the horizontal direction (e.g., Z-axis direction) is incident thereon, the liquid crystals 517a of the first liquid crystal layer 517 and the liquid crystals 537a of the third liquid crystal layer 537 may have the ordinary refractive index $n_o$, and the liquid crystals 527a of the second liquid crystal layer 527 may have the extraordinary refractive index $n_e$. In this case, the refractive index of the first single refractive index layer 518 and the refractive index of the liquid crystals 517a of the first liquid crystal layer 517 may be substantially the same. The refractive index of the second single refractive index layer 528 and the refractive index of the liquid crystals 527a of the second liquid crystal layer 527 may be different from each other. The refractive index of the third single refractive index layer 538 and the refractive index of the liquid crystals 537a of the third liquid crystal layer 537 may be substantially the same. Therefore, the light L(↔) of the first display panel 211 vibrating in the horizontal direction (e.g., Z-axis direction) may be outputted without being refracted at the boundary between the first single refractive index layer 518 and the first liquid crystal layer 517. Further, the light L(↔) of the first display panel 211 vibrating in the horizontal direction (e.g., Z-axis direction) may be refracted at the boundary between the second single refractive index layer 528 and the second liquid crystal layer 527. Further, the light L(↔) of the first display panel 211 vibrating in the horizontal direction (e.g., Z-axis direction) may be outputted without being refracted at the boundary between the third single refractive index layer 538 and the third liquid crystal layer 537. For example, the path of the light L(↔) of the first display panel 211 incident on the first optical path control device 510 may be changed. For example, the light L(↔) of the first display panel 211 incident in the vertical direction (e.g., Y-axis direction) may be refracted by the twelfth angle θ12 with respect to the vertical direction (e.g., Y-axis direction).

Figure 38:
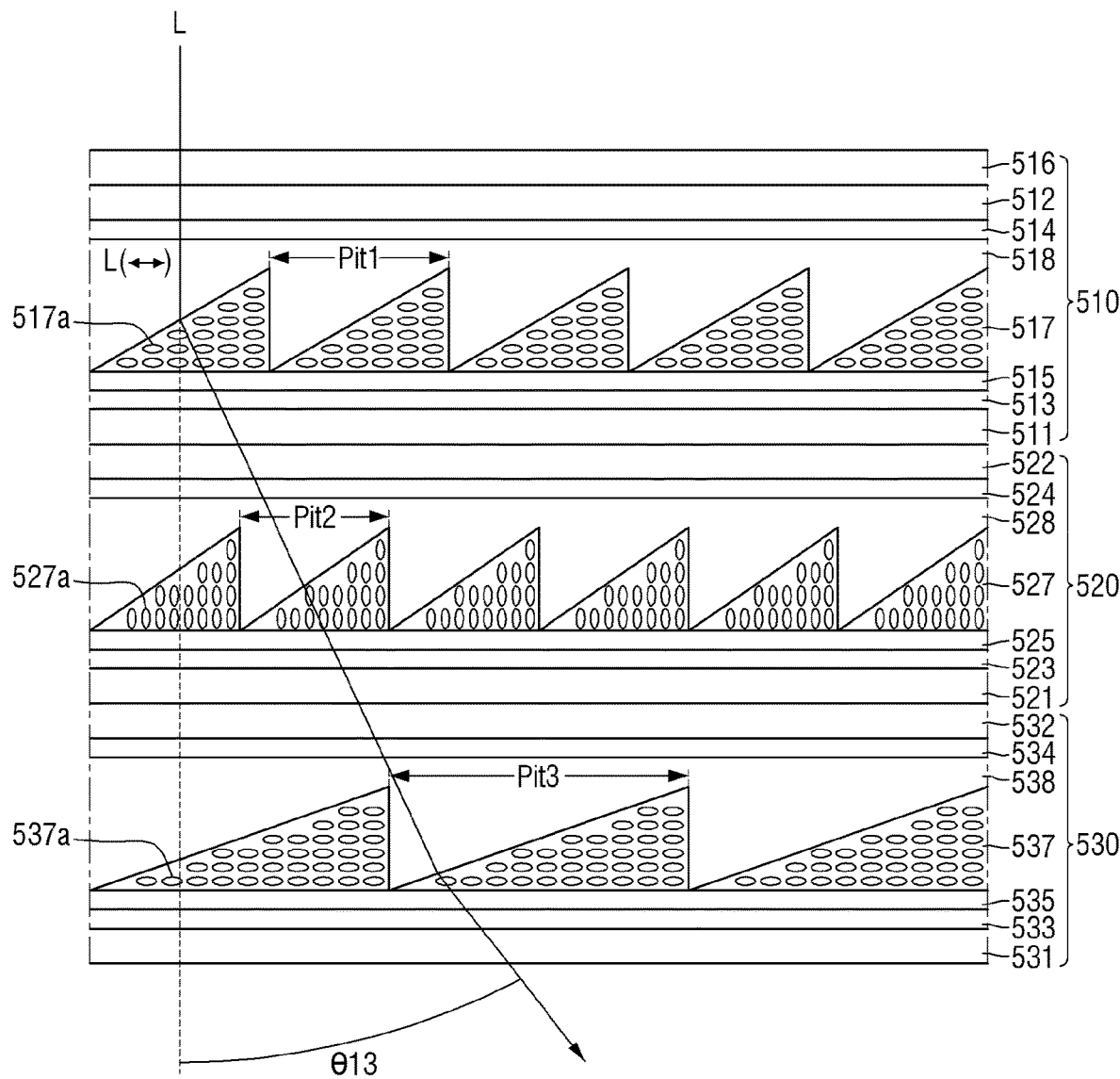

As shown in FIG. 38, in case that the liquid crystals 517a of the first liquid crystal layer 517 are arranged in the horizontal direction (e.g., Z-axis direction), the liquid crystals 527a of the second liquid crystal layer 527 are arranged in the vertical direction (e.g., Y-axis direction), the liquid crystals 537a of the third liquid crystal layer 537 are arranged in the horizontal direction (e.g., Z-axis direction), and the light L(↔) of the first display panel 211 vibrating in the horizontal direction (e.g., Z-axis direction) is incident thereon, the liquid crystals 517a of the first liquid crystal layer 517 and the liquid crystals 537a of the third liquid crystal layer 537 may have the extraordinary refractive index $n_e$, and the liquid crystals 527a of the second liquid crystal layer 527 may have the ordinary refractive index $n_o$. In this case, the refractive index of the first single refractive index layer 518 and the refractive index of the liquid crystals 517a of the first liquid crystal layer 517 may be different. The refractive index of the second single refractive index layer 528 and the refractive index of the liquid crystals 527a of the second liquid crystal layer 527 may be substantially the same. The refractive index of the third single refractive index layer 538 and the refractive index of the liquid crystals 537a of the third liquid crystal layer 537 may be different from each other. Therefore, the light L(↔) of the first display panel 211 vibrating in the horizontal direction (e.g., Z-axis direction) may be refracted at the boundary between the first single refractive index layer 518 and the first liquid crystal layer 517. Further, the light L(↔) of the first display panel 211 vibrating in the horizontal direction (e.g., Z-axis direction) may be outputted without being refracted at the boundary between the second single refractive index layer 528 and the second liquid crystal layer 527. Further, the light L(↔) of the first display panel 211 vibrating in the horizontal direction (e.g., Z-axis direction) may be refracted at the boundary between the third single refractive index layer 538 and the third liquid crystal layer 537. For example, the path of the light L(↔) of the first display panel 211 incident on the first optical path control device 510 may be changed. For example, the light L(↔) of the first display panel 211 incident in the vertical direction (e.g., Y-axis direction) may be refracted by the thirteenth angle θ13 with respect to the vertical direction (e.g., Y-axis direction).

Figure 39:
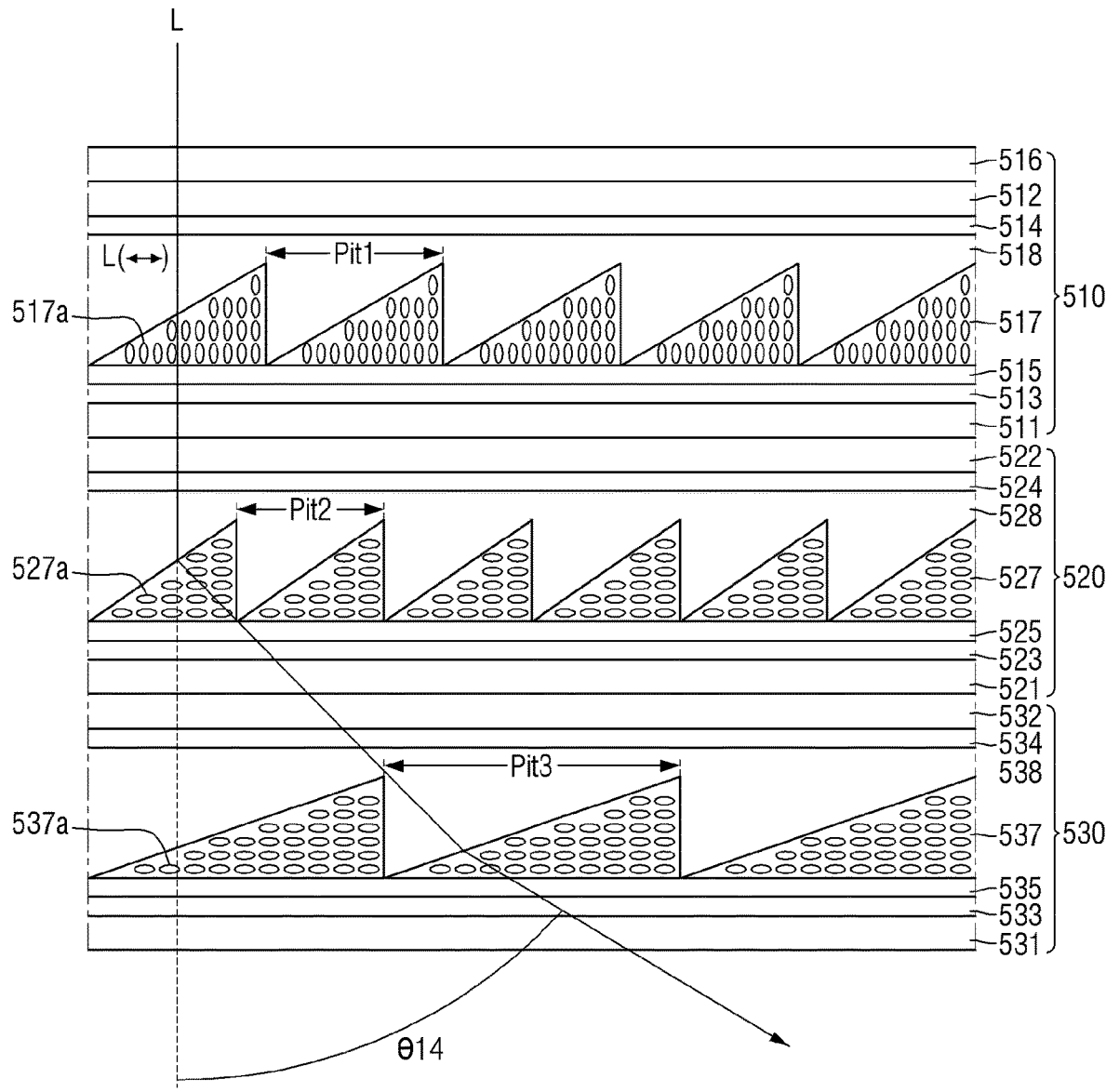

As shown in FIG. 39, in case that the liquid crystals 517a of the first liquid crystal layer 517 are arranged in the vertical direction (e.g., Y-axis direction), the liquid crystals 527a of the second liquid crystal layer 527 are arranged in the horizontal direction (e.g., Z-axis direction), the liquid crystals 537a of the third liquid crystal layer 537 are arranged in the horizontal direction (e.g., Z-axis direction), and the light (L(↔) of the first display panel 211 vibrating in the horizontal direction (e.g., Z-axis direction) is incident thereon, the liquid crystals 527a of the second liquid crystal layer 527 and the liquid crystals 537a of the third liquid crystal layer 537 may have the extraordinary refractive index $n_e$, and the liquid crystals 517a of the first liquid crystal layer 517 may have the ordinary refractive index $n_o$. In this case, the refractive index of the first single refractive index layer 518 and the refractive index of the liquid crystals 517a of the first liquid crystal layer 517 may be substantially the same. The refractive index of the second single refractive index layer 528 and the refractive index of the liquid crystals 527a of the second liquid crystal layer 527 may be different from each other. The refractive index of the third single refractive index layer 538 and the refractive index of the liquid crystals 537a of the third liquid crystal layer 537 may be different from each other. Therefore, the light L(↔) of the first display panel 211 vibrating in the horizontal direction (e.g., Z-axis direction) may be outputted without being refracted at the boundary between the first single refractive index layer 518 and the first liquid crystal layer 517. Further, the light L(↔) of the first display panel 211 vibrating in the horizontal direction (e.g., Z-axis direction) may be refracted at the boundary between the second single refractive index layer 528 and the second liquid crystal layer 527. Further, the light L(↔) of the first display panel 211 vibrating in the horizontal direction (e.g., Z-axis direction) may be refracted at the boundary between the third single refractive index layer 538 and the third liquid crystal layer 537. For example, the path of the light L(↔) of the first display panel 211 incident on the first optical path control device 510 may be changed. For example, the light L(↔) of the first display panel 211 incident in the vertical direction (e.g., Y-axis direction) may be refracted by the fourteenth angle θ14 with respect to the vertical direction (e.g., Y-axis direction).

In accordance with the embodiment shown in FIGS. 34 to 39, by controlling the liquid crystals 517a of the first liquid crystal layer 517, the liquid crystals 527a of the second liquid crystal layer 527, and the liquid crystals 537a of the third liquid crystal layer 537, it is possible to output light incident on the first optical path control device 510 after the optical path thereof is selectively changed to any one of six directions. For example, the path of the light outputted from the first display panel 211 may be selectively changed by the first optical path control device 510.

Although the embodiments of the disclosure have been described above with reference to the accompanying drawings, those of ordinary skill in the art to which the disclosure pertains may be embodied in other specific forms without changing the technical spirit or essential features of the disclosure. you will be able to understand Therefore, it should be understood that the embodiments described above are illustrative in all respects and not restrictive.

What is claimed is:

1. An optical apparatus comprising:
   a lens including a first surface and a plurality of side surfaces;
   a display device disposed on a first side surface among the plurality of side surfaces of the lens and providing light to the first side surface of the lens;
   an optical path control device disposed between the first side surface of the lens and the display device and selectively changing an optical path of a virtual image of the display device;
   a plurality of reflecting members disposed in the lens and reflecting light of the display device to the first surface; and
   a convex lens disposed between the display device and the optical path control device.

2. The optical apparatus of claim 1, wherein
   the optical path control device outputs a first virtual image of the display device without a change in its optical path during a first period, and
   the optical path control device outputs an optical path of a second virtual image of the display device in a first direction during a second period.

3. The optical apparatus of claim 2, wherein the plurality of reflecting members include:
   a first reflecting member reflecting the first virtual image to the first surface during the first period; and
   a second reflecting member reflecting the second virtual image to the first surface during the second period.

4. The optical apparatus of claim 3, wherein
   the optical path control device outputs a third virtual image of the display device in a second direction during a third period, and
   the optical path control device outputs a fourth virtual image of the display device in a third direction during a fourth period.

5. The optical apparatus of claim 4, wherein the plurality of reflecting members include:
   a third reflecting member reflecting the third virtual image to the first surface during the third period; and
   a fourth reflecting member reflecting the fourth virtual image to the first surface during the fourth period.

6. The optical apparatus of claim 5, wherein
   the third reflecting member reflects the third virtual image reflected from the first surface to the first surface, and
   the fourth reflecting member reflects the fourth virtual image from a second surface opposite to the first surface to the first surface.

7. The optical apparatus of claim 5, wherein
   the third fourth virtual image is reflected from the first surface of the lens and travels to a second side surface of the lens among the plurality of side surfaces, and
   the fourth virtual image is reflected from the second side surface and travels to a second surface opposite to the first surface.

8. The optical apparatus of claim 2, wherein the second reflecting member reflects the second virtual image reflected from a second side surface among the plurality of side surfaces to the first surface.

9. The optical apparatus of claim 8, wherein the first side surface and the second side surface face each other.

10. The optical apparatus of claim 8, further comprising:
    a first reflecting sheet disposed on the second side surface of the lens.

11. The optical apparatus of claim 8, wherein the second virtual image is reflected from the first surface of the lens or a second surface opposite to the first surface and travels to the second side surface.

12. The optical apparatus of claim 8, wherein the second virtual image is reflected from a third side surface among the plurality of side surfaces and travels to the second side surface.

13. The optical apparatus of claim 12, further comprising:
    a second reflecting sheet disposed on the third side surface of the lens.

14. The optical apparatus of claim 1, wherein the optical path control device includes:
    a first optical path control device having a first electrode disposed on a first substrate;
    a second electrode disposed on a second substrate facing the first substrate;
    a first liquid crystal layer disposed between the first electrode and the second electrode; and
    a first single refractive index layer disposed on the first liquid crystal layer.

15. The optical apparatus of claim 14, wherein a boundary between the first liquid crystal layer and the first single refractive index layer is inclined at a first angle with respect to a thickness direction of the lens.

16. The optical apparatus of claim 14, wherein a boundary between the first liquid crystal layer and the first single refractive index layer has a prism mountain shape.

17. The optical apparatus of claim 14, further comprising:
    a polarizer plate disposed on the second substrate of the first optical path control device and transmitting light vibrating in a horizontal direction.

18. The optical apparatus of claim 17, wherein
    in case that a first driving voltage is applied to the first electrode and a second driving voltage is applied to the second electrode, liquid crystals of the first liquid crystal layer are arranged in a vertical direction, and
    in case that the first driving voltage is not applied to the first electrode and the second driving voltage is not applied to the second electrode, the liquid crystals of the first liquid crystal layer are arranged in a horizontal direction.

19. The optical apparatus of claim 17, wherein a refractive index of the first single refractive index layer is equal to an extraordinary refractive index of the liquid crystals of the first liquid crystal layer.

20. The optical apparatus of claim 14, wherein the optical path control device includes:
    a second optical path control device having a third electrode disposed on a third substrate;
    a fourth electrode disposed on a fourth substrate facing the third substrate;

a second liquid crystal layer disposed between the third electrode and the fourth electrode; and a second single refractive index layer disposed on the second liquid crystal layer.

21. The optical apparatus of claim 20, wherein a boundary between the second liquid crystal layer and the second single refractive index layer is inclined at a second angle different from the first angle with respect to a thickness direction of the lens.

22. The optical apparatus of claim 20, wherein a boundary between the first liquid crystal layer and the first single refractive index layer has a first prism mountain shape, a boundary between the second liquid crystal layer and the second single refractive index layer has a second prism mountain shape, and a pitch of the first prism mountain and a pitch of the second prism mountain are different.

23. An optical apparatus comprising:

a lens including:
  a first lens part;
  a second lens part; and
  a third lens part disposed between the first lens part and the second lens part;

a first display device disposed on a first side surface of the first lens part and providing a virtual image to the first side surface of the first lens part;

a second display device disposed on a first side surface of the second lens part and providing the virtual image to the first side surface of the second lens part;

a first optical path control device disposed between the first side surface of the first lens part and the first display device and selectively changing an optical path of the virtual image from the first display device;

a second optical path control device disposed between the first side surface of the second lens part and the second display device and selectively changing an optical path of the virtual image from the second display device; and reflecting members disposed in the first lens part, wherein one of the reflecting members of the first lens part reflects and outputs the virtual image from the first display device to a first surface of the first lens part, and another one of the reflective members of the first lens part reflects and outputs the virtual image from the second display device to the first surface of the first lens part.

24. The optical apparatus of claim 23, further comprising:

reflecting members disposed in the second lens part, wherein one of the reflecting members of the second lens part reflects and outputs the virtual image from the second display device to a first surface of the second lens part, and another one of the reflective members of the second lens part reflects and outputs the virtual image from the first display device to the first surface of the second lens part.

* * * * *